United States Patent
Goel et al.

(10) Patent No.: US 10,904,367 B2
(45) Date of Patent: *Jan. 26, 2021

(54) NETWORK ACCESS NODE VIRTUAL FABRICS CONFIGURED DYNAMICALLY OVER AN UNDERLAY NETWORK

(71) Applicant: Fungible, Inc., Santa Clara, CA (US)

(72) Inventors: Deepak Goel, San Jose, CA (US); Narendra Jayawant Gathoo, San Jose, CA (US); Phillip A. Thomas, San Jose, CA (US); Srihari Raju Vegesna, San Jose, CA (US); Pradeep Sindhu, Los Altos Hills, CA (US); Wael Noureddine, Santa Clara, CA (US); Robert William Bowdidge, San Jose, CA (US); Ayaskant Pani, Fremont, CA (US); Gopesh Goyal, Cupertino, CA (US)

(73) Assignee: Fungible, Inc., Santa Clara, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/147,099

(22) Filed: Sep. 28, 2018

(65) Prior Publication Data

US 2019/0104207 A1 Apr. 4, 2019

Related U.S. Application Data

(60) Provisional application No. 62/566,060, filed on Sep. 29, 2017, provisional application No. 62/638,788, filed on Mar. 5, 2018.

(51) Int. Cl.
*H04L 12/715* (2013.01)
*H04L 12/717* (2013.01)
(Continued)

(52) U.S. Cl.
CPC .......... *H04L 69/26* (2013.01); *H04L 12/4633* (2013.01); *H04L 45/16* (2013.01);
(Continued)

(58) Field of Classification Search
CPC ..... H04L 69/26; H04L 12/4633; H04L 45/16; H04L 45/42; H04L 45/64; H04L 47/15;
(Continued)

(56) References Cited

U.S. PATENT DOCUMENTS

| 4,872,157 A | 10/1989 | Hemmady et al. |
| 4,872,159 A | 10/1989 | Hemmady et al. |

(Continued)

FOREIGN PATENT DOCUMENTS

| CN | 104052618 A | 9/2014 |
| CN | 104954251 A | 9/2015 |

(Continued)

OTHER PUBLICATIONS

Alizadeh et al., "CONGA: Distributed Congestion-Aware Load Balancing for Datacenters," SIGCOMM '14 Proceedings of the 2014 ACM Conference on SIGCOMM, Aug. 17-22, 2014, pp. 503-514.

(Continued)

*Primary Examiner* — Huy D Vu
*Assistant Examiner* — Bailor C. Hsu
(74) *Attorney, Agent, or Firm* — Shumaker & Sieffert, P.A.

(57) ABSTRACT

Network access node virtual fabrics configured dynamically over an underlay network are described. A centralized controller, such as a software-defined networking (SDN) controller, of a packet switched network is configured to establish one or more virtual fabrics as overlay networks on top of the physical underlay network of the packet switched network. For example, the SDN controller may define (Continued)

multiple sets of two of more access nodes connected to the packet switched network, and the access nodes of a given one of the sets may use a new data transmission protocol, referred to generally herein as a fabric control protocol (FCP), to dynamically setup tunnels as a virtual fabric over the packet switched network. The FCP tunnels may include all or a subset of the parallel data paths through the packet switched network between the access nodes for a given virtual fabric.

21 Claims, 21 Drawing Sheets

(51) Int. Cl.
| | | |
|---|---|---|
| H04L 12/761 | (2013.01) | |
| H04L 12/801 | (2013.01) | |
| H04L 29/06 | (2006.01) | |
| H04L 29/08 | (2006.01) | |
| H04L 12/46 | (2006.01) | |
| H04L 12/947 | (2013.01) | |
| H04L 12/873 | (2013.01) | |

(52) U.S. Cl.
CPC .............. *H04L 45/42* (2013.01); *H04L 45/64* (2013.01); *H04L 47/15* (2013.01); *H04L 47/18* (2013.01); *H04L 47/52* (2013.01); *H04L 49/25* (2013.01); *H04L 69/324* (2013.01)

(58) Field of Classification Search
CPC ......... H04L 47/18; H04L 47/52; H04L 49/25; H04L 69/324
See application file for complete search history.

(56) References Cited

U.S. PATENT DOCUMENTS

| | | | |
|---|---|---|---|
| 5,812,549 A | 9/1998 | Sethu | |
| 6,055,579 A | 4/2000 | Goyal et al. | |
| 7,342,887 B1 | 3/2008 | Sindhu | |
| 7,480,304 B2* | 1/2009 | Yeh | H04L 49/254 370/235 |
| 7,664,110 B1 | 2/2010 | Lovett et al. | |
| 7,733,781 B2 | 6/2010 | Petersen | |
| 7,843,907 B1 | 11/2010 | Abou-Emara et al. | |
| 7,965,624 B2 | 6/2011 | Ripa et al. | |
| 8,582,440 B2* | 11/2013 | Ofelt | H04L 49/505 370/236 |
| 8,599,863 B2 | 12/2013 | Davis | |
| 8,625,427 B1 | 1/2014 | Terry et al. | |
| 8,737,410 B2 | 5/2014 | Davis et al. | |
| 8,798,077 B2 | 8/2014 | Mehra et al. | |
| 8,918,631 B1 | 12/2014 | Kumar et al. | |
| 9,118,984 B2 | 8/2015 | DeCusatis et al. | |
| 9,154,376 B2* | 10/2015 | Aziz | H04L 41/0803 |
| 9,262,225 B2 | 2/2016 | Davis et al. | |
| 9,282,384 B1 | 3/2016 | Graves | |
| 9,294,304 B2 | 3/2016 | Sindhu | |
| 9,294,398 B2 | 5/2016 | DeCusatis et al. | |
| 9,369,408 B1 | 6/2016 | Raghavan et al. | |
| 9,405,550 B2 | 8/2016 | Biran et al. | |
| 9,800,495 B2* | 10/2017 | Lu | G06F 11/1415 |
| 9,853,901 B2 | 12/2017 | Kampmann et al. | |
| 9,866,427 B2 | 1/2018 | Yadav et al. | |
| 9,876,735 B2 | 1/2018 | Davis et al. | |
| 10,003,552 B2 | 6/2018 | Kumar et al. | |
| 10,135,731 B2 | 11/2018 | Davis et al. | |
| 10,140,245 B2 | 11/2018 | Davis et al. | |
| 10,304,154 B2 | 5/2019 | Appu et al. | |
| 10,565,112 B2 | 2/2020 | Noureddine et al. | |
| 10,659,254 B2 | 5/2020 | Sindhu et al. | |
| 2002/0015387 A1 | 2/2002 | Houh | |
| 2002/0049859 A1 | 4/2002 | Bruckert et al. | |
| 2002/0075862 A1 | 6/2002 | Mayes | |
| 2002/0094151 A1 | 7/2002 | Li et al. | |
| 2002/0118415 A1 | 8/2002 | Dasylva et al. | |
| 2002/0126634 A1 | 9/2002 | Mansharamani et al. | |
| 2002/0126671 A1 | 9/2002 | Ellis et al. | |
| 2003/0091271 A1 | 5/2003 | Dragone | |
| 2003/0229839 A1 | 12/2003 | Wang et al. | |
| 2004/0236912 A1 | 11/2004 | Glasco | |
| 2006/0029323 A1 | 2/2006 | Nikonov et al. | |
| 2006/0056406 A1 | 3/2006 | Bouchard et al. | |
| 2006/0277421 A1 | 12/2006 | Balestriere | |
| 2007/0073966 A1 | 3/2007 | Corbin | |
| 2007/0172235 A1 | 7/2007 | Snider et al. | |
| 2007/0192545 A1 | 8/2007 | Gara et al. | |
| 2007/0255906 A1 | 11/2007 | Handgen et al. | |
| 2008/0002702 A1 | 1/2008 | Bajic | |
| 2008/0138067 A1 | 6/2008 | Beshai | |
| 2009/0024836 A1 | 1/2009 | Shen et al. | |
| 2009/0135832 A1 | 5/2009 | Fan et al. | |
| 2009/0228890 A1 | 9/2009 | Vaitovirta et al. | |
| 2009/0285228 A1 | 11/2009 | Bagepalli et al. | |
| 2009/0303880 A1 | 12/2009 | Maltz et al. | |
| 2010/0061391 A1 | 3/2010 | Sindhu et al. | |
| 2011/0289179 A1 | 1/2011 | Pekcan et al. | |
| 2011/0055827 A1 | 3/2011 | Lin et al. | |
| 2011/0170553 A1 | 7/2011 | Beecroft et al. | |
| 2011/0202658 A1 | 8/2011 | Okuno et al. | |
| 2011/0225594 A1 | 9/2011 | Iyengar et al. | |
| 2011/0228783 A1 | 9/2011 | Flynn et al. | |
| 2011/0289180 A1 | 11/2011 | Sonnier et al. | |
| 2011/0289279 A1 | 11/2011 | Sonnier et al. | |
| 2012/0096211 A1 | 4/2012 | Davis et al. | |
| 2012/0207165 A1 | 8/2012 | Davis | |
| 2012/0254587 A1 | 10/2012 | Biran et al. | |
| 2013/0003725 A1 | 1/2013 | Hendel et al. | |
| 2013/0088971 A1 | 4/2013 | Anantharam et al. | |
| 2013/0145375 A1 | 6/2013 | Kang | |
| 2013/0191443 A1 | 7/2013 | Gan et al. | |
| 2013/0258912 A1 | 10/2013 | Zimmerman et al. | |
| 2013/0330076 A1 | 12/2013 | Liboiron-Ladouceur et al. | |
| 2014/0023080 A1 | 1/2014 | Zhang et al. | |
| 2014/0040909 A1 | 2/2014 | Winser et al. | |
| 2014/0059537 A1 | 2/2014 | Kamble et al. | |
| 2014/0161450 A1 | 6/2014 | Graves et al. | |
| 2014/0258479 A1 | 9/2014 | Tenginakai et al. | |
| 2014/0269351 A1 | 9/2014 | Graves et al. | |
| 2014/0359044 A1 | 12/2014 | Davis et al. | |
| 2015/0019702 A1 | 1/2015 | Kancherla | |
| 2015/0037032 A1 | 2/2015 | Xu et al. | |
| 2015/0117860 A1 | 4/2015 | Braun | |
| 2015/0143073 A1 | 5/2015 | Winser et al. | |
| 2015/0163171 A1 | 6/2015 | Sindhu et al. | |
| 2015/0180603 A1 | 6/2015 | Darling et al. | |
| 2015/0186313 A1 | 7/2015 | Sodhi et al. | |
| 2015/0222533 A1 | 8/2015 | Birrittella et al. | |
| 2015/0244617 A1 | 8/2015 | Nakil et al. | |
| 2015/0256405 A1 | 9/2015 | Janardhanan et al. | |
| 2015/0278148 A1 | 10/2015 | Sindhu | |
| 2015/0278984 A1 | 10/2015 | Koker et al. | |
| 2015/0280939 A1 | 10/2015 | Sindhu | |
| 2015/0281128 A1 | 10/2015 | Sindhu | |
| 2015/0324205 A1 | 11/2015 | Eisen et al. | |
| 2015/0334034 A1 | 11/2015 | Smedley et al. | |
| 2015/0334202 A1 | 11/2015 | Frydman et al. | |
| 2015/0381528 A9 | 12/2015 | Davis et al. | |
| 2016/0056911 A1 | 2/2016 | Ye et al. | |
| 2016/0164625 A1 | 6/2016 | Gronvall et al. | |
| 2016/0239415 A1 | 8/2016 | Davis et al. | |
| 2016/0241430 A1 | 8/2016 | Yadav et al. | |
| 2016/0337723 A1 | 11/2016 | Graves | |
| 2016/0380885 A1 | 12/2016 | Jani et al. | |
| 2017/0031719 A1 | 2/2017 | Clark et al. | |
| 2017/0032011 A1 | 2/2017 | Song et al. | |
| 2017/0061566 A1 | 3/2017 | Min et al. | |
| 2017/0068639 A1 | 3/2017 | Davis et al. | |
| 2017/0265220 A1 | 9/2017 | Andreoli-Fang et al. | |
| 2017/0286157 A1 | 10/2017 | Hasting et al. | |
| 2017/0346766 A1 | 11/2017 | Dutta | |
| 2018/0024771 A1 | 1/2018 | Miller et al. | |

(56) References Cited

U.S. PATENT DOCUMENTS

| | | | |
|---|---|---|---|
| 2018/0115494 | A1 | 4/2018 | Bhatia et al. |
| 2018/0152317 | A1 | 5/2018 | Chang et al. |
| 2018/0239702 | A1 | 8/2018 | Farmahani Farahani et al. |
| 2018/0287818 | A1 | 10/2018 | Goel et al. |
| 2018/0287965 | A1 | 10/2018 | Sindhu et al. |
| 2018/0288505 | A1 | 10/2018 | Sindhu et al. |
| 2018/0293168 | A1 | 10/2018 | Noureddine et al. |
| 2018/0300928 | A1 | 10/2018 | Koker et al. |
| 2018/0307494 | A1 | 10/2018 | Ould-Ahmed-Vall et al. |
| 2018/0307535 | A1 | 10/2018 | Suzuki et al. |
| 2018/0322386 | A1 | 11/2018 | Sridharan et al. |
| 2018/0357169 | A1 | 12/2018 | Lai |
| 2019/0005176 | A1 | 1/2019 | Illikkal et al. |
| 2019/0012278 | A1 | 1/2019 | Sindhu et al. |
| 2019/0012350 | A1 | 1/2019 | Sindhu et al. |
| 2019/0013965 | A1 | 1/2019 | Sindhu et al. |
| 2019/0018806 | A1 | 1/2019 | Koufaty et al. |
| 2019/0042292 | A1 | 2/2019 | Palermo et al. |
| 2019/0042518 | A1 | 2/2019 | Marolia et al. |
| 2019/0102311 | A1 | 4/2019 | Gupta et al. |
| 2019/0104057 | A1 | 4/2019 | Goel et al. |
| 2019/0104206 | A1 | 4/2019 | Goel et al. |
| 2019/0104207 | A1 | 4/2019 | Goel et al. |
| 2019/0158428 | A1 | 5/2019 | Gray et al. |
| 2019/0188079 | A1 | 6/2019 | Kohli |
| 2019/0243765 | A1 | 8/2019 | Sindhu et al. |
| 2019/0363989 | A1 | 11/2019 | Shalev et al. |
| 2020/0021898 | A1 | 1/2020 | Sindhu et al. |
| 2020/0169513 | A1 | 5/2020 | Goel et al. |

FOREIGN PATENT DOCUMENTS

| | | | |
|---|---|---|---|
| EP | 1079571 | A2 | 2/2001 |
| EP | 1489796 | A2 | 12/2004 |
| EP | 1501246 | A2 | 1/2005 |
| EP | 2289206 | A2 | 3/2011 |
| EP | 2928134 | A2 | 10/2015 |
| WO | 2009114554 | A2 | 9/2009 |
| WO | 2013184846 | A1 | 12/2013 |
| WO | 2016037262 | A1 | 3/2016 |
| WO | 2019014268 | A1 | 1/2019 |

OTHER PUBLICATIONS

Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.

Ford et al., "TCP Extensions for Multipath Operation with Multiple Addresses," Internet Engineering Task Force (IETF), RFC 6824, Jan. 2013, 64 pp.

International Search Report and Written Opinion of International Application No. PCT/US2018/053586, dated Jan. 17, 2019, 16 pp.

Response to Written Opinion dated Jan. 17, 2019, from International Application No. PCT/US2018/053586, filed Jul. 29, 2019, 5 pp.

Benson et al., "Network Traffic Characteristics of Data Centers in the Wild," IMC '10 Proceedings of the 10th ACM SIGCOMM Conference on Internet Measurement, Nov. 1-30, 2010, pp. 267-280.

Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.

Benson et al., "MicroTE: Fine Grained Traffic Engineering for Data Centers," CoNEXT '11 Proceedings of the Seventh Conference on emerging Networking EXperiments and Technologies Article No. 8, Dec. 6-9, 2011, 12 pp.

Kandula et al., "Dynamic Load Balancing Without Packet Reordering," SIGCOMM Computer Communication Review, vol. 37, No. 2, Apr. 2007, pp. 53-62.

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.

Amendment in Response to Office Action dated Dec. 31, 2019, from U.S. Appl. No. 16/147,070, filed Mar. 31, 2020, 15 pp.

"QFX10000 Switches System Architecture," White Paper, Juniper Networks, Apr. 2015, 15 pp.

Adya et al., "Cooperative Task Management without Manual Stack Management," Proceedigns of the 2002 Usenix Annual Technical Conference, Jun. 2002, 14 pp.

Bakkum et al., "Accelerating SQL Database Operations on a GPU with CUDA," Proceedings of the 3rd Workshop on Genral-Purpose Computation on Graphics Processing Units, Mar. 14, 2010, 10 pp.

Banga et al., "Better operating system features for faster network servers," ACM Sigmetrics Performance Evaluation Review, vol. 26, Issue 3, Dec. 1998, 11 pp.

Barroso et al., "Attack of the killer Microseconds," Communications of the ACM, vol. 60, No. 4, Apr. 2017, 7 pp.

Friedman et al., "Programming with Continuations," Technical Report 151, Nov. 1983, 14 pp.

Gay et al., "The nesC Language: A Holistic Approach to Networked Embedded Systems," accessed from http://nescc.sourceforge.net, last updated Dec. 14, 2004, 11 pp.

Halbwachs et al., "The Synchronous Data Flow Programming Language LUSTRE," Proceedings of the IEEE, vol. 79, No. 9, Sep. 1991, 16 pp.

Haynes et al., "Continuations and Coroutines," Technical Report No. 158, Jun. 1984, 19 pp.

Hewitt, "Viewing Control Structures as Patterns of Passing Messages," Massachusetts Institute of Technology, Artificial Intelligence Laboratory, Dec. 1976, 61 pp.

Hseush et al., Data Path Debugging: Data-Oriented Debugging for a Concurrent Programming Language, PADD 88 Proceedings of the 1988 ACM SIGPLAN and SIGOPS workshop on Parallel and distributed debugging, May 5-6, 1988, 12 pp.

Huang et al., "Erasure Coding in Windows Azure Storage," 2012 USENIX Annual Technical Conference, Jun. 13-15, 2012, 12 pp.

Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.

Kahn et al., "Actors as a Special Case of Concurrent Constraint Programming," ECOOP/OOPSLA '90 Proceedings, Oct. 21-25, 1990, 10 pp.

Kaminow, "Optical Integrated Circuits: A Personal Perspective," Journal of Lightwave Technology, vol. 26, No. 9, May 1, 2008, pp. 994-1004.

Kelly et al., A Block Diagram Compiler, The Bell System Technical Journal, Dec. 7, 1960, 10 pp.

Kounavis et al., "Programming the data path in network processor-based routers," Software—Practice and Experience, Oct. 21, 2003, 38 pp.

Larus et al., "Using Cohort Scheduling to Enhance Server Performance," Usenix Annual Technical Conference, Jun. 2002, 12 pp.

Levis et al., "Tiny OS: An Operating System for Sensor Networks," Ambient Intelligence, Jan. 2005, 34 pp.

Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.

Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.

Schroeder et al., "Flash Reliability in Production: The Expected and the Unexpected," 14th USENIX Conference on File and Storage Technologies (Fast '16), Feb. 22-25, 2016, 15 pp.

Varela et al., "The Salsa Programming Language 2.0.0alpha Release Tutorial," Tensselaer Polytechnic Institute, Nov. 2009, 52 pp.

Von Behren et al., "Why Events Are a Bad Idea (for high-concurrency servers)," Proceedings of HotOS IX, May 2003, 6 pp.

(56) References Cited

OTHER PUBLICATIONS

Welsh et al., "SEDA: An Architecture for Well-Conditioned, Scalable Internet Services," Eighteenth Symposium on Operating Systems Principles, Oct. 21-24, 2001, 14 pp.
Second Written Opinion of International Application No. PCT/US2018/053586, dated Sep. 6, 2019, 34 pp.
Response to Second Written Opinion dated Sep. 6, 2019, from International Application No. PCT/US2018/053586, dated Nov. 6, 2019, 8 pp.
Office Action from U.S. Appl. No. 16/147,070, dated Dec. 31, 2019, 17 pp.
International Preliminary Report on Patentability from International Application No. PCT/US2018/053586, dated Dec. 18, 2019, 10 pp.
Office Action from U.S. Appl. No. 16/147,070, dated Jul. 21, 2020, 24 pp.
Response to Office Action dated Jul. 20, 2020, from U.S. Appl. No. 16/147,070, filed Sep. 18, 2020, 6 pp.
Advisory Action from U.S. Appl. No. 16/147,070, dated Oct. 26, 2020, 6 pp.
Notice of Appeal and Pre-Appeal Brief Request for Review for U.S. Appl. No. 16/147,070, filed Nov. 25, 2020, 6 pp.

\* cited by examiner

NETWORK ACCESS NODE VIRTUAL FABRICS CONFIGURED DYNAMICALLY OVER AN UNDERLAY NETWORK

This application claims the benefit of U.S. Provisional Appl. No. 62/566,060, filed Sep. 29, 2017, and U.S. Provisional Appl. No. 62/638,788, filed Mar. 5, 2018, the entire content of each of which is incorporated herein by reference.

TECHNICAL FIELD

The invention relates to computer networks and, more particularly, data center networks.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are always forwarded from the source to the destination along a single path through the routers and switches comprising the switching fabric.

SUMMARY

In general, this disclosure describes network access node virtual fabrics configured dynamically over an underlay network. According to the disclosed techniques, a centralized controller, such as a software-defined networking (SDN) controller, of a packet switched network is configured to establish one or more virtual fabrics as overlay networks on top of the physical underlay network of the packet switched network. For example, the SDN controller may define multiple sets of two of more access nodes connected to the packet switched network, and the access nodes of a given one of the sets may use a new data transmission protocol, referred to generally herein as a fabric control protocol (FCP), to dynamically setup tunnels as a virtual fabric over the packet switched network. The FCP tunnels may utilize all or a subset of the paths through the packet switched network between the access nodes for a given virtual fabric.

Once the FCP tunnels are setup as one or more virtual fabrics over the packet switched network, the FCP also enables any of the access nodes for a given virtual fabric to communicate packet data for a given packet flow (e.g., packets having the same tuple or five tuple of a packet header prior to tunnel encapsulation) to any other of the access nodes for the same virtual fabric using any of the parallel data paths through the packet switched network. As further described herein, example implementations of the FCP enable spraying of individual packets for the packet flow across some or all of the multiple parallel data paths through the packet switched network and reordering of the packets for delivery to a destination.

Example implementations of the fabric control protocol are described for use within a data center or other computing environment. As one example, the fabric control protocol may provide certain advantages in environments in which a switch fabric provides full mesh interconnectivity such that any of the servers may communicate packet data for a given packet flow to any other of the servers using any of a number of parallel data paths within the data center switch fabric. As further described herein, example implementations of the fabric control protocol enable spraying of individual packets for a given packet flow across some or all of the multiple parallel data paths in the data center switch fabric and, optionally, reordering of the packets for delivery to the destination. In some examples, the fabric control protocol packet structure is carried over an underlying protocol, such as the User Datagram Protocol (UDP).

The techniques described herein may provide certain advantages. For example, the fabric control protocol may provide end-to-end bandwidth scaling and flow fairness within a single tunnel based on endpoint-controlled requests and grants for flows. In addition, the fabric control protocol may delay packet segmentation for flows until a grant is received, provide fault tolerant and hardware-based adaptive rate control of requests and grants, provide adaptive request window scaling, encrypt and authenticate requests and grants, and improve explicit congestion notification (ECN) marking support.

In some examples, the fabric control protocol includes end-to-end admission control mechanisms in which a sender explicitly requests a receiver with the intention to transfer a certain number of bytes of payload data. In response, the receiver issues a grant based on its buffer resources, quality of service (QoS), and/or a measure of fabric congestion. For example, the fabric control protocol includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth. In addition, instead of the flow-based switching and equal cost multi-path (ECMP) forwarding used to send all packets of a transmission control protocol (TCP) flow on the same path to avoid packet reordering, the fabric control protocol enables packets of an individual packet flow to be sprayed across all available paths between a source node and a destination node. The source node assigns a packet sequence number to each packet of the flow, and the destination node may use the packet sequence numbers to put the incoming packets of the same flow in order.

In one example, this disclosure is directed to a network system comprising a plurality of servers; a packet switched network comprising a centralized controller; and a plurality of access nodes, each of the access nodes coupled to a subset of the servers and coupled to the packet switched network. The centralized controller is configured to establish one or more virtual fabrics, wherein each of the virtual fabrics includes two or more of the access nodes. When communicating a packet flow of packets between a source server and a destination server coupled to the access nodes for one of the virtual fabrics, a first one of the access nodes coupled to the source server is configured to spray the packets of the packet flow across a plurality of parallel data paths through the packet switched network to a second one of the access nodes coupled to the destination server, and the second one of the access nodes is configured to deliver the packets to the destination server.

In another example, this disclosure is directed to a method comprising interconnecting a plurality of servers by a packet switched network and a plurality of access nodes, each of the access nodes coupled to a subset of the servers and coupled to the packet switched network; establishing, by a centralized controller of the packet switched network, one or more virtual fabrics, wherein each of the virtual fabrics includes two or more of the access nodes; and communicating a packet flow of packets between a source server and a destination server coupled to the access nodes for one of the virtual fabrics including spraying, by a first one of the access nodes coupled to the source server, packets of the packet flow across a plurality of parallel data paths through the packet switched network to a second one of the access nodes coupled to the destination server, and delivering, by the second one of the access nodes, the packets to the destination server.

The details of one or more examples are set forth in the accompanying drawings and the description below. Other features, objects, and advantages of the invention will be apparent from the description and drawings, and from the claims.

DETAILED DESCRIPTION

Figure 1:
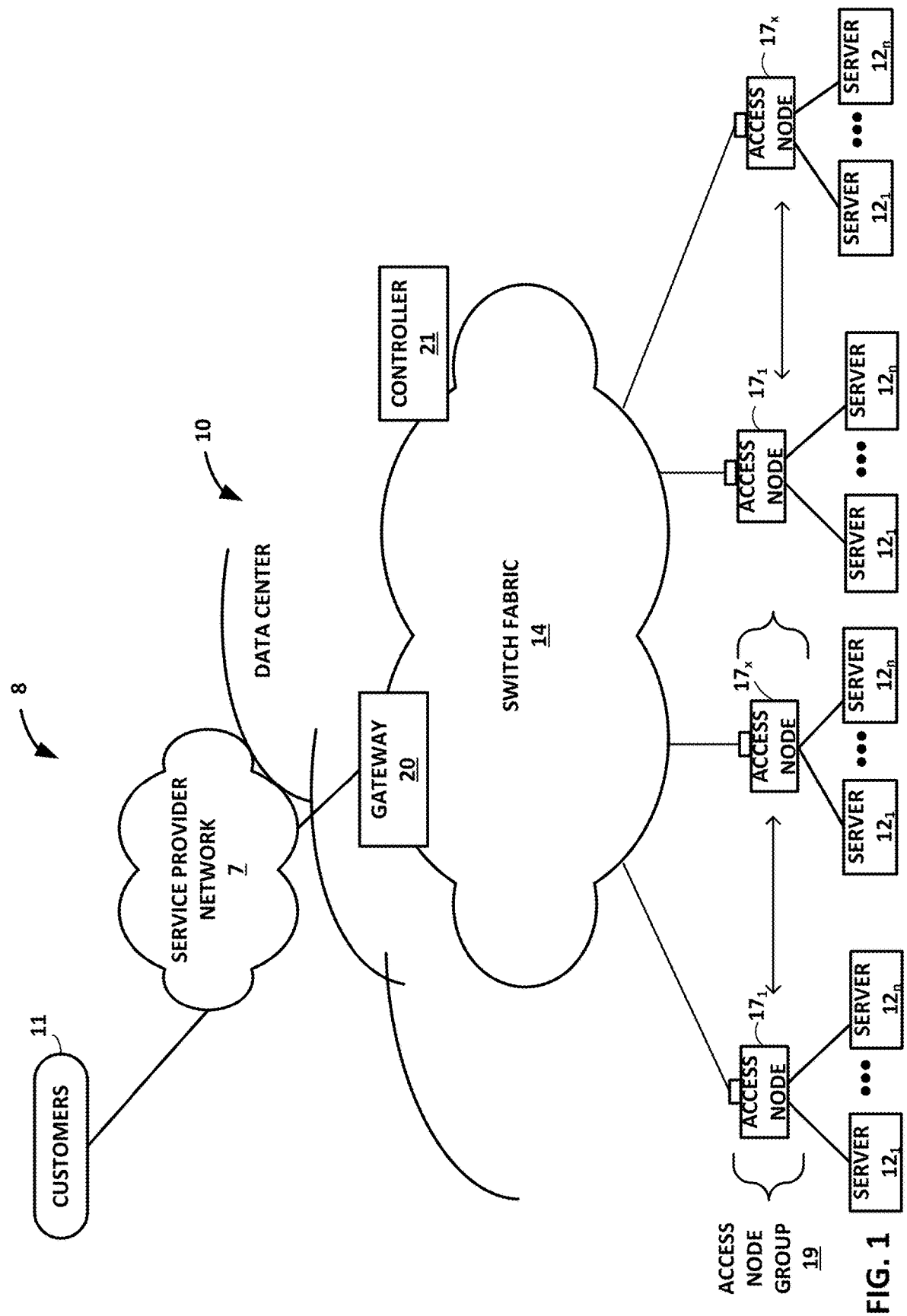
FIG. 1 is a block diagram illustrating an example network having a data center in which examples of the techniques described herein may be implemented.

Today's large-scale data center networks can connect over 100,000 two-socket servers and are often designed to operate at close to 25% of the bisection throughput. Most of the data centers therefore need to provide large bisection bandwidth as the demand for capacity grows. The data centers must also support ever increasing variety of applications from big-data analytics to financial services. They also must be agile and allow the applications to be deployed to any server to be efficient and cost effective.

Data centers utilize various flow scheduling techniques to attempt to balance utilization of the underlying interconnection fabric of the network. For example, traditionally, the traffic flows between the endpoints (servers) relies on ECMP (equal cost multi-path) based load balancing. ECMP, however, often results in poor load-balancing as it randomly hashes packet flows to network paths. With hash collisions, and a few large flows, the fabric of the data center often becomes severely imbalanced. ECMP coupled with flowlet switching may somewhat improve the load balancing as a new path is chosen every time flowlet switching takes place. ECMP, however, uses local decisions to split traffic among equal cost path without any feedback about any possible congestion or link failure in the downstream for any of the chosen paths. As a result, a failure can significantly reduce the effective throughput even though the network may have built-in redundancy.

Another flow scheduling technique, referred to as Hedera, attempts to provide dynamic flow scheduling for data center networks. Hedera collects flow information from constituent switches, computes non-conflicting paths for flows and instructs the switches to reroute traffic accordingly. By taking a high-level view of routing and traffic demands, Hedera attempts to enable the scheduling system to see the bottlenecks that the load switching elements cannot. However, Hedera is too slow for traffic volatility of today's data centers as it requires monitoring a flow for some time and its estimated ideal demand before making a redistribution decision.

MPTCP (multi-path transmission control protocol) is another example flow scheduling technique. MPTCP splits the large TCP flow into multiple TCP flows and the payload is striped across the MPTCP flows so that each MPTCP flow is small enough that it does not run into ECMP bottlenecks due to hash collisions. The MPTCP, however, does require changes in the end-host network stack that is usually not controlled by network operators. Even if a network operator does have a control over the network stack, some of the high bandwidth low latency applications, such as storage traffic, may bypass the kernel and implement their own transport. Further the MPTCP adds complexity to already complex transport layer burdened by low latency and burst absorption requirements of today's datacenters.

As another example, CONGA (distributed congestion-aware load balancing for data centers) splits TCP flows into flowlets, estimates real time congestion in the fabric paths, and allocates flowlets to paths based on feedback from remote switches. The feedback from remote switches enables CONGA to seamlessly handle asymmetry, without requiring any TCP modifications. The CONGA, however, has to be implemented in custom ASICs as part of a new network fabric to be able to react to the congestion in microseconds.

Some of the issues that are apparent in the today's data centers are summarized as follows:
  Fabric under-utilization due to load imbalance in spite of built-in redundancy.
  Fabric not being reactive to traffic pattern changes, and component/link failures leading to even more inefficiency
  TCP congestion avoidance uses AIMD (Additive Increase/Multiplicative Decrease) mechanism with multitude of congestion management algorithms cause the traffic flows to fluctuate throughput whenever the network experiences congestion.
  Lack of admission control at the end hosts require a TCP slow start between the hosts to prevent over-subscription at the end point and the network resources at the expense of latency.
  Sophisticated algorithms such as ECN (explicit congestion notification) react to local traffic congestion seen by the local switch element and depending upon the traffic profile and network topology cause unfairness among sources for TCP incast at the cost of congestion control.

This disclosure describes a new data transmission protocol, referred to herein as fabric control protocol (FCP), designed to address some of the issues in today's data centers. In various example implementations, FCP can improve the network throughput dramatically, such as 90% or more. The proposed protocol and techniques described herein have many example differences from existing protocols, as described in turn below. The following examples may be used in any combination and subcombination to provide various implementations of the techniques described herein. Moreover, FCP may be used in place of or in combination with other transmission protocols.

As a first example, FCP, as described herein, may provide fabric admission control. A source node maintains a queue for each destination node and traffic class. Before transmitting a packet on the fabric, the source node asks permission by sending a request message to the destination node requesting a certain number of bytes to be transferred. The destination node sends a grant message to the source after reserving egress bandwidth. The source node then transmits the packets until it sends the granted number of bytes to the destination stopping at the packet boundary.

Second, if desired, FCP enables spray of packets of the same packet flow to all available paths between a source and a destination node. For example, a data center network has many paths from a source node to reach a destination node through a typical leaf/spine topology. Traditionally, to maintain packet order of a TCP flow, switching elements determine a path for the flow through 5-tuple hash and ECMP forwarding algorithm. All packets of the flow (based on hash bucket) travel on the same path to avoid packet reordering. Paths to connect multiple layers of switches in the network use low bandwidth links. Low bandwidth links limit the maximum bandwidth carried by a TCP flow. FCP allows packets to be sprayed to all available links between a source node and a destination node lifting a limitation on size of TCP flow. The source node assigns a packet sequence number to every packet. The destination node may use the packet sequence numbers to put incoming packets in order before delivering them to higher layers such as TCP.

Third, example implementation of FCP may be used to provide resilience against request/grant packet loss, and out of order delivery. The request and grant messages are not required to be reordered by the end nodes and do not carry packet sequence numbers. The request/grant messages use sliding window based markers to communicate the size information making the underlying transport for request/grant messages to be resilient against loss/drops or out of order delivery. As stated above, the data packets carrying payload are explicitly re-ordered by the destination node using packet sequence numbers. Data packet loss is handled through reorder timeouts and the loss is recovered by higher levels such as TCP through retransmission.

Fourth, FCP enables an adaptive and low latency fabric implementation. The source/destination nodes use adaptive bandwidth control techniques through outgoing request and grant messages that react to long term fabric congestion caused by fabric failures. By adaptively controlling the request and grant rates, the amount of data entering/leaving the fabric is controlled. By operating the destination node throughput slightly below the maximum supported throughput via grant rate limiting, the FCP maintains a congestion free fabric operation and thereby achieves a predictable latency for packets traversing through the fabric.

Fifth, in some examples, FCP provides fault recovery, adaptive to network switch/link failures to support minimal impact. The FCP adopts to any fabric failures that are detected by hardware within the round trip time (RTT) to minimize the packet loss.

Sixth, in some examples, FCP has reduced or minimal protocol overhead cost. The FCP involves explicit request/grant message exchange for every segment of payload to be transferred between nodes. To facilitate the protocol operation, the payload packet is encapsulated over UDP+FCP header. The FCP provides various advantages listed here at the cost of latency and certain amount of bandwidth. The latency impact is minimized to small flows via unsolicited transmission of the packets without an explicit request grant handshake.

Seventh, in some examples, FCP provides support for unsolicited packet transfer. The FCP allows a limited fabric bandwidth to be used for sending unsolicited packets (without explicit request-grant handshake) from a sender to the receiver. At the receiver, a small amount of credit can be configured to allow a small amount of bandwidth to be used for unsolicited transfers. Unsolicited traffic is only allowed from the queues that are very shallow (based on threshold). The request/grant rate limiters adjust for the unsolicited and non-FCP traffic so as to not cause sustained fabric congestion.

Eighth, in some examples, FCP provides support for FCP capable/incapable nodes to coexist. The FCP allows FCP incapable nodes (non-FCP) to coexist in the same network as the FCP capable nodes. The non-FCP nodes may use ECMP or any other mode of packet transport and load balancing.

Ninth, in some examples, FCP provides flow-aware fair bandwidth distribution. The traffic is governed through a flow-aware admission control scheduler at the destination node. The request/grant mechanism uses a "pull" model (via grants), and it ensures flow-aware fair bandwidth distribution among incast flows.

Tenth, in some examples, FCP provides transmit buffer management through adaptive request window scaling. The destination node provides a scale factor based on a global view of active incast flows. The source node adjusts the outstanding request window based on the scale factor and thereby limits the total transmit buffer in use for every FCP queue based on its drain rate. The transmit buffer is thus efficiently used for various large vs. small flows based on their respective drain rates.

Eleventh, in some examples, FCP enables receive buffer occupancy based grant management. The FCP controls the grant generation through an explicit grant pacing algorithm. The grant generation reacts to receive buffer occupancy, number of granted blocks in the fabric, and number of blocks in reorder buffer.

Twelfth, in some examples, FCP supports improved end-to-end QoS. The FCP provides improved end-to-end QoS through the grant scheduler at the destination. The destination views the incoming requests from multiple sources grouped based on priority and schedules the grants based on the desired QoS behavior across the priority groups. Assuming that the FCP achieves a low latency fabric operation due to admission control, the QoS aware grant scheduling removes any dependency of QoS behavior from underlying fabric.

Thirteenth, in some examples, FCP supports security through encryption and end-to-end authentication. The FCP supports end-to-end privacy through encryption and also supports authentication for FCP packets protecting all the FCP specific protocol handshake.

Fourteenth, in some examples, FCP enables improved ECN marking support. The FCP grant scheduler provides a unique view of total load based on the sum total of all pending requests seen at the grant scheduler. The ECN marking based on a global load seen by the destination endpoint provides a major improvement over ECN marking based on local congestion seen by individual switches/paths through the fabric. With data center TCP implementations relying on extensive use of ECN to manage congestion, the ECN marking based on global view of output egress queue at the grant scheduler is a significant improvement compared to disjoint and localized view of some of the paths through the fabric and provides better congestion management at TCP level.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator.

In some examples, SDN controller 21 operates to configure access nodes 17 to logically establish one or more virtual fabrics as overlay networks dynamically configured on top of the physical underlay network provided by switch fabric 14, in accordance with the techniques described herein. Virtual fabrics and the operation of access nodes to establish virtual fabrics are described below with respect to FIG. 20.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 18 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

Access nodes 17 may also be referred to as data processing units (DPUs), or devices including DPUs. In other words, the term access node may be used herein interchangeably with the term DPU. Additional example details of various example DPUs are described in U.S. patent application Ser. No. 16/031,921, filed Jul. 10, 2018, entitled "Data Processing Unit for Compute Nodes and Storage Nodes," and U.S. patent application Ser. No. 16/031,945, filed Jul. 10, 2018, entitled "Data Processing Unit for Stream Processing,", the entire content of each of which is incorporated herein by reference.

In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_x$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

According to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. Example network architectures and techniques are described in which access nodes, in example implementations, spray individual packets for packet flows between the access nodes and across some or all of the multiple parallel data paths in the data center switch fabric 14 and, optionally, reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end-to-end QoS, security through encryption and end-to-end authentication and/or improved ECN marking support.

The techniques may provide certain advantages. For example, the techniques may increase significantly the bandwidth utilization of the underlying switch fabric 14. Moreover, in example implementations, the techniques may provide full mesh interconnectivity between the servers of the data center and may nevertheless be non-blocking and drop-free. More specifically, based on the end-to-end admission control mechanisms of FCP and packet spraying in proportion to available bandwidth, switch fabric 14 may comprise a drop-free fabric at high efficiency without use of link level flow control.

Although access nodes 17 are described in FIG. 1 with respect to switch fabric 14 of data center 10, in other examples, access nodes may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and, optionally, reorder the packets for delivery to the destinations so as to provide full mesh connectivity.

Figure 2:
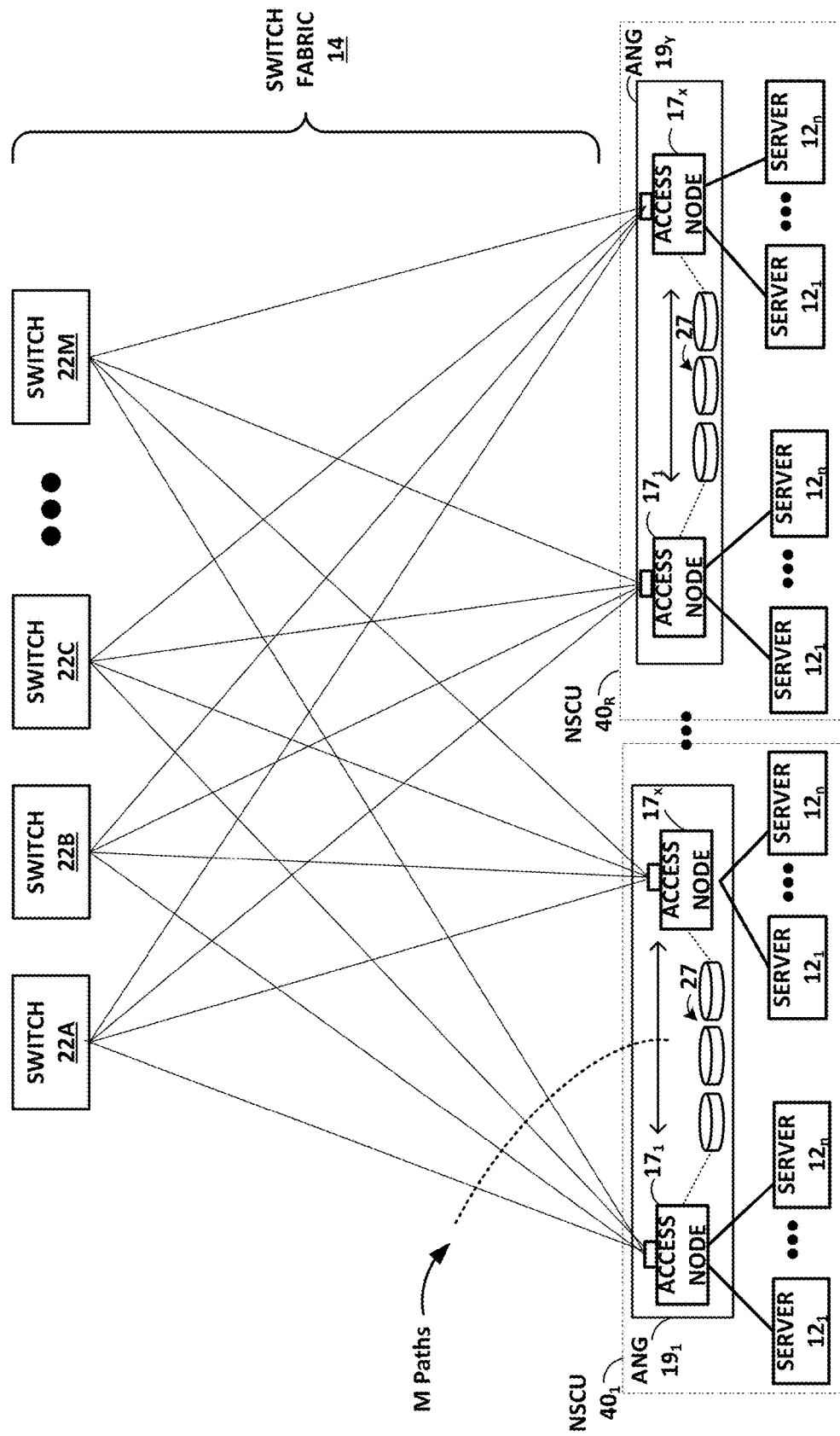
FIG. 2 is a block diagram illustrating in further detail the logical interconnectivity provided by access nodes and switch fabric within a data center.

FIG. 2 is a block diagram illustrating in further detail the logical interconnectivity provided by access nodes 17 and switch fabric 14 within the data center. As shown in this example, access nodes 17 and switch fabric 14 may be configured to provide full mesh interconnectivity such that access nodes 17 may communicate packet data for any of servers 12 to any other of the servers 12 using any of a number of M parallel data paths to any of core switches 22A-22M (collectively "core switches 22"). Moreover, according to the techniques described herein, access nodes 17 and switch fabric 14 may be configured and arranged in a way such that the M parallel data paths in switch fabric 14 provide reduced L2/L3 hops and full mesh interconnections (e.g., bipartite graph) between servers 12, even in massive data centers having tens of thousands of servers. Note that in this example, switches 22 are not connected to each other, which makes it much more likely that any failure of one or more of the switches will be independent of each other. In other examples, the switch fabric itself may be implemented using multiple layers of interconnected switches as in a CLOS network.

In some example implementations, each access node 17 may, therefore, have multiple parallel data paths for reaching any given other access node 17 and the servers 12 reachable through those access nodes. In some examples, rather than being limited to sending all of the packets of a given flow along a single path in the switch fabric, switch fabric 14 may be configured such that access nodes 17 may, for any given packet flow between servers 12, spray the packets of the packet flow across all or a subset of the M parallel data paths of switch fabric 14 by which a given destination access node 17 for a destination server 12 can be reached.

According to the disclosed techniques, access nodes 17 may spray the packets of individual packet flows across the M paths end-to-end forming a virtual tunnel between a source access node and a destination access node. In this way, the number of layers included in switch fabric 14 or the number of hops along the M parallel data paths, may not matter for implementation of the packet spraying techniques described in this disclosure.

The technique of spraying packets of individual packet flows across all or a subset of the M parallel data paths of switch fabric 14, however, enables the number of layers of network devices within switch fabric 14 to be reduced, e.g., to a bare minimum of one. Further, it enables fabric architectures in which the switches are not connected to each other, reducing the likelihood of failure dependence between two switches and thereby increasing the reliability of the switch fabric. Flattening switch fabric 14 may reduce cost by eliminating layers of network devices that require power and reduce latency by eliminating layers of network devices that perform packet switching. In one example, the flattened topology of switch fabric 14 may result in a core layer that includes only one level of spine switches, e.g., core switches 22, that may not communicate directly with one another but form a single hop along the M parallel data paths. In this example, any access node 17 sourcing traffic into switch fabric 14 may reach any other access node 17 by a single, one-hop L3 lookup by one of core switches 22.

An access node 17 sourcing a packet flow for a source server 12 may use any technique for spraying the packets across the available parallel data paths, such as available bandwidth, random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (five tuple) sourced by a server 12 to traverse different paths of switch fabric 14 between access nodes 17 coupled to the source and destinations servers. In some examples, the respective destination access node 17 associated with the destination server 12 may be configured to reorder the variable length IP packets of the packet flow into the original sequence in which they were sent and deliver the reordered packets to the destination server.

In other examples, the respective destination access node 17 associated with the destination server 12 may not reorder the packets of the packet flows prior to delivering the packets to the destination server. In these examples, the destination access node 17 may instead deliver the packets to the destination server in the order in which the packets arrive at the destination access node 17. For example, packets that comprise storage access requests or responses to a destination storage appliance may not need to be reordered into the original sequence in which they were sent. Instead, such storage access requests and responses may be delivered to the destination storage appliance in the order in which they arrive.

In some example implementations, each access node 17 implements at least four different operational networking components or functions: (1) a source component operable to receive traffic from server 12, (2) a source switching component operable to switch source traffic to other source switching components of different access nodes 17 (possibly of different access node groups) or to core switches 22, (3) a destination switching component operable to switch inbound traffic received from other source switching components or from cores switches 22 and (4) a destination component operable to reorder packet flows and provide the packet flows to destination servers 12.

In this example, servers 12 are connected to source components of the access nodes 17 to inject traffic into the switch fabric 14, and servers 12 are similarly coupled to the destination components within the access nodes 17 to receive traffic therefrom. Because of the full-mesh, parallel data paths provided by switch fabric 14, each source switching component and destination switching component within a given access node 17 need not perform L2/L3 switching. Instead, access nodes 17 may apply spraying algorithms to spray packets of a packet flow, e.g., based on available bandwidth, randomly, round-robin, quality of service (QoS)/scheduling or otherwise, to efficiently forward packets without requiring packet analysis and lookup operations.

Destination switching components of access nodes 17 may provide a limited lookup necessary only to select the proper output port for forwarding packets to local servers 12. As such, with respect to full routing tables for the data center, only core switches 22 may need to perform full lookup operations. Thus, switch fabric 14 provides a highly-scalable, flat, high-speed interconnect in which servers 12 are, in some embodiments, effectively one L2/L3 hop from any other server 12 within the data center.

Access nodes 17 may need to connect to a fair number of core switches 22 in order to communicate packet data to any other of access nodes 17 and the servers 12 accessible through those access nodes. In some cases, to provide a link multiplier effect, access nodes 17 may connect to core switches 22 via top of rack (TOR) Ethernet switches, electrical permutation devices, or optical permutation (OP) devices (not shown in FIG. 2). To provide an additional link multiplier effect, source components of the access nodes 17 may be configured to spray packets of individual packet flows of the traffic received from server 12 across a set of the other access nodes 17 included in one or more access node groups 19. In one example, access node 17 may achieve an 8× multiplier effect from inter-access node spraying, and an additional 8× multiplier effect from OP devices to connect to up to sixty-four core switches 22.

Flow-based routing and switching over Equal Cost Multi-Path (ECMP) paths through a network may be susceptible to highly variable load-dependent latency. For example, the network may include many small bandwidth flows and a few large bandwidth flows. In the case of routing and switching over ECMP paths, the source access node may select the same path for two of the large bandwidth flows leading to large latencies over that path. In order to avoid this issue and keep latency low across the network, an administrator may be forced to keep the utilization of the network below 25-30%, for example. The techniques described in this disclosure of configuring access nodes 17 to spray packets of individual packet flows across all available paths enables higher network utilization, e.g., 85-90%, while maintaining bounded or limited latencies. The packet spraying techniques enable a source access node 17 to fairly distribute packets of a given flow across all the available paths while taking link failures into account. In this way, regardless of the bandwidth size of the given flow, the load can be fairly spread across the available paths through the network to avoid over utilization of a particular path. The disclosed techniques enable the same amount of networking devices to pass three times the amount of data traffic through the network while maintaining low latency characteristics and reducing a number of layers of network devices that consume energy.

As shown in the example of FIG. 2, in some example implementations, access nodes 17 may be arranged into multiple different access node groups $19_1$-$19_Y$ (ANGs in FIG. 2), each including any number of access nodes 17 up to, for example, x access nodes $17_1$-$17_x$. As such, multiple access nodes 17 may be grouped and arranged (e.g., within a single electronic device or network appliance), referred to herein as an access node group (ANG) 19, for providing services to a group of servers supported by the set of access nodes internal to the device.

As described, each access node group 19 may be configured as standalone network device, and may be implemented as a device configured for installation within a compute rack, a storage rack or a converged rack. In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as high-speed solid-state hard drives, configured to provide network accessible storage for use by applications executing on the servers. Each access node group 19 including its set of access nodes 17, storage devices 27, and the set of servers 12 supported by the access nodes 17 of that access node group may be referred to herein as a network storage compute unit (NSCU) 40.

Figure 3:
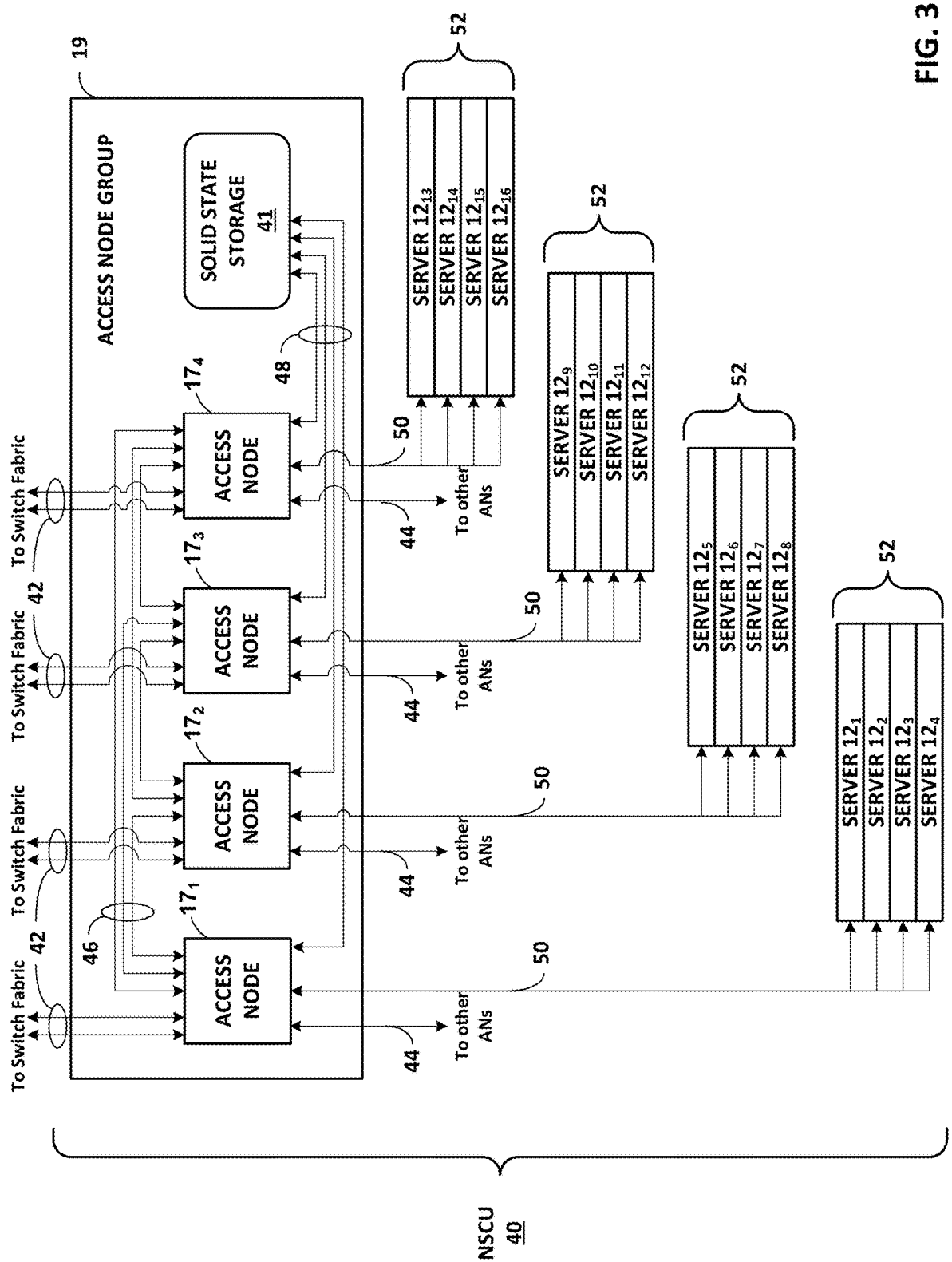
FIG. 3 is a block diagram illustrating one example of network storage compute unit (NSCU) 40 including an access node group and its supported servers.

FIG. 3 is a block diagram illustrating one example of network storage compute unit (NSCU) 40 including an access node group 19 and its supported servers 52. Access node group 19 may be configured to operate as a high-performance I/O hub designed to aggregate and process network and storage I/O to multiple servers 52. In the particular example of FIG. 3, access node group 19 includes four access nodes $17_1$-$17_4$ (collectively, "access nodes 17") connected to a pool of local solid state storage 41. In the illustrated example, access node group 19 supports a total of sixteen server nodes $12_1$-$12_{16}$ (collectively, "server nodes 12") with each of the four access nodes 17 within access node group 19 supporting four of server nodes 12. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 3 as including four access nodes 17 that are all connected to a single pool of solid state storage 41, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

In one example implementation, access nodes 17 within access node group 19 connect to servers 52 and solid state storage 41 using Peripheral Component Interconnect express (PCIe) links 48, 50, and connect to other access nodes and the datacenter switch fabric 14 using Ethernet links 42, 44, 46. For example, each of access nodes 17 may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8×100 GE externally-available ports to connect to the switch fabric 14.

Within access node group 19, connections 42 may be copper, i.e., electrical, links arranged as 8×25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19 and supports an 8-way mesh of eight access nodes 17 for those AGNs. In this particular example, connections 46 would provide full-mesh connectivity between the four access nodes 17 within the same access node group 19, and connections 44 would provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2×25 GE links. Each of connections 44 between the four access nodes 17 and the four access nodes in the other access node group may include four 50 GE links. In some examples, each of the four 50 GE links may be arranged as 2×25 GE links such that each of connections 44 includes 8×25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12×25 GE links.

As shown in FIG. 3, each of access nodes 17 within an access node group 19 may also support a set of high-speed PCIe connections 48, 50, e.g., PCIe Gen 3.0 or PCIe Gen 4.0 connections, for communication with solid state storage 41 within access node group 19 and communication with servers 52 within NSCU 40. Each of servers 52 includes four server nodes 12 supported by one of access nodes 17 within access node group 19. Solid state storage 41 may be a pool of Non-Volatile Memory express (NVMe)-based solid state drive (SSD) storage devices accessible by each of access nodes 17 via connections 48.

In one example, solid state storage 41 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. As described in more detail below, in some cases, a physical rack may include four access node groups 19 and their supported servers 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

In one example, each of access nodes 17 supports a total of 96 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×16-lane PCIe Gen 3.0 connection. In this example, access node group 19 has a total of 256 external facing PCIe links that interface with servers 52. In some scenarios, access nodes 17 may support redundant server connectivity such that each of access nodes 17 connects to eight server nodes 12 within two different servers 52 using an 8×8-lane PCIe Gen 3.0 connection.

In another example, each of access nodes 17 supports a total of 64 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×8-lane PCIe Gen 4.0 connection. In this example, access node group 19 has a total of 128 external facing PCIe links that interface with servers 52.

Figure 4:
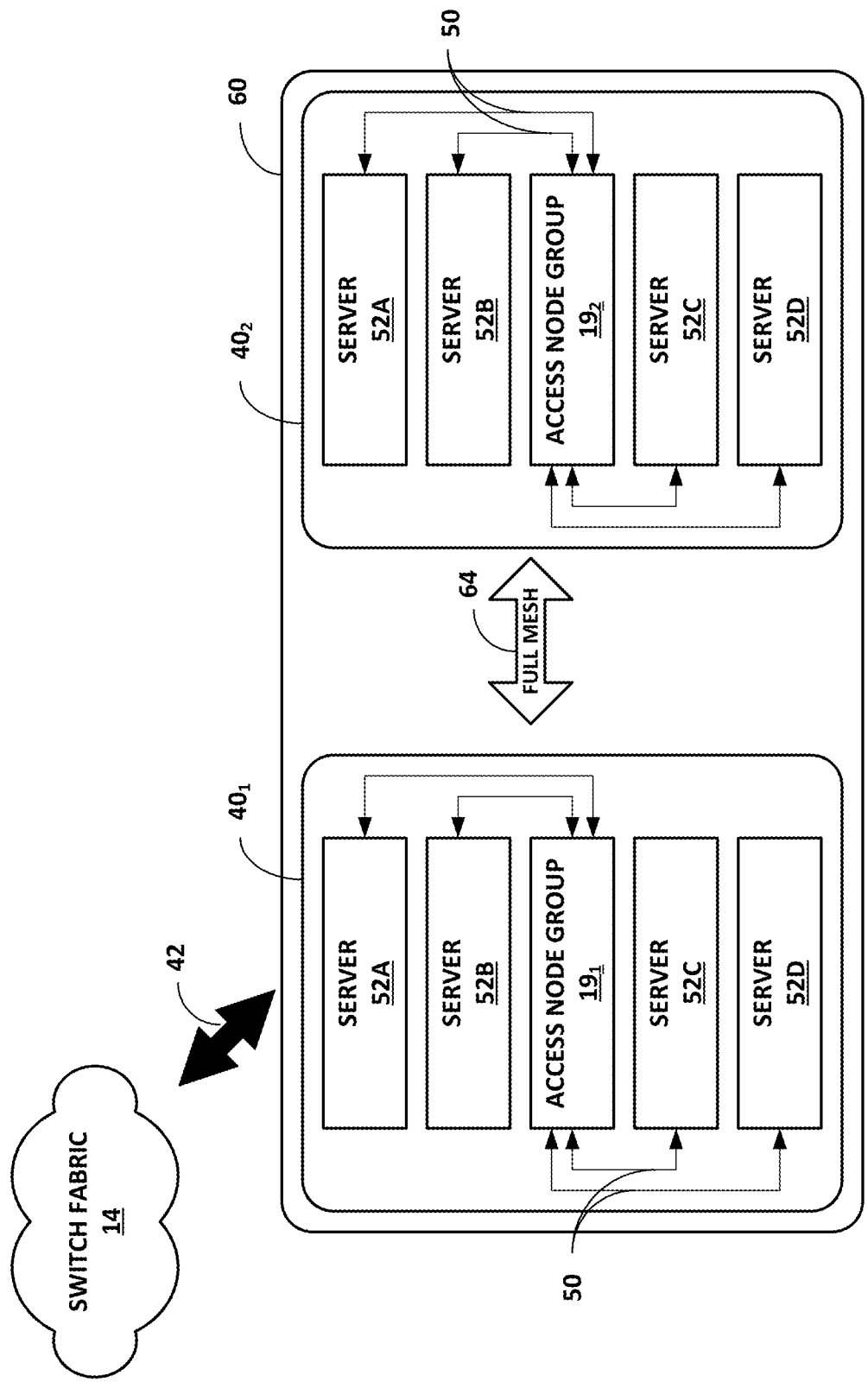
FIG. 4 is a block diagram illustrating an example logical rack arrangement including two NSCUs from FIG. 3.

FIG. 4 is a block diagram illustrating an example logical rack arrangement 60 including two NSCUs 40₁ and 40₂ from FIG. 3. In some examples, each of NSCUs 40 may be referred to as a "compute sandwich" based on the structural arrangement of access node group 19 "sandwiched" between two servers 52 on the top and two servers 52 on the bottom. For example, server 52A may be referred to as a top second server, server 52B may be referred to as a top server, server 52C may be referred to as a bottom server, and server 52D may be referred to as a bottom second server. Each of servers 52 may include four server nodes, and each server node may be a dual-socket or dual-processor server sled.

Each of access node groups 19 connects to servers 52 using PCIe links 50, and to switch fabric 14 using Ethernet links 42. Access node groups $19_1$ and $19_2$ may each include four access nodes connected to each other using Ethernet links and local solid state storage connected to the access nodes using PCIe links as described above with respect to FIG. 3. The access nodes within access node groups $19_1$ and $19_2$ are connected to each other in a full mesh 64, which is described in more detail with respect to FIG. 5.

In addition, each of access node groups 19 supports PCIe connections 50 to servers 52. In one example, each of connections 50 may be a 4×16-lane PCIe Gen 3.0 connection such that access node group 19 has a total of 256 externally-available PCIe links that interface with servers 52. In another example, each of connections 50 may be a 4×8-lane PCIe Gen 4.0 connection for communication between access nodes within access node group 19 and server nodes within servers 52. In either example, connections 50 may provide a raw throughput of 512 Gigabits per access node 19 or approximately 128 Gigabits of bandwidth per server node without accounting for any overhead bandwidth costs.

As discussed above with respect to FIG. 3, each of NSCUs 40 supports 8×100 GE links 42 from access node group 19 to switch fabric 14. Each of NSCUs 40 thus provides support for up to sixteen server nodes in four servers 52, local solid state storage, and 800 Gbps of full duplex (i.e., bidirectional) network bandwidth. Each of access node groups 19 may, therefore, provide true hyperconvergence of compute, storage, networking and security of servers 52. Logical rack 60, including two NSCUs 40, therefore, provides support for up to thirty-two server nodes in eight servers 52, local solid state storage at access node groups 19, and 16×100 GE links 42 to switch fabric 14, which results in 1.6 Terabits per second (Tbps) of full duplex network bandwidth.

Figure 5:
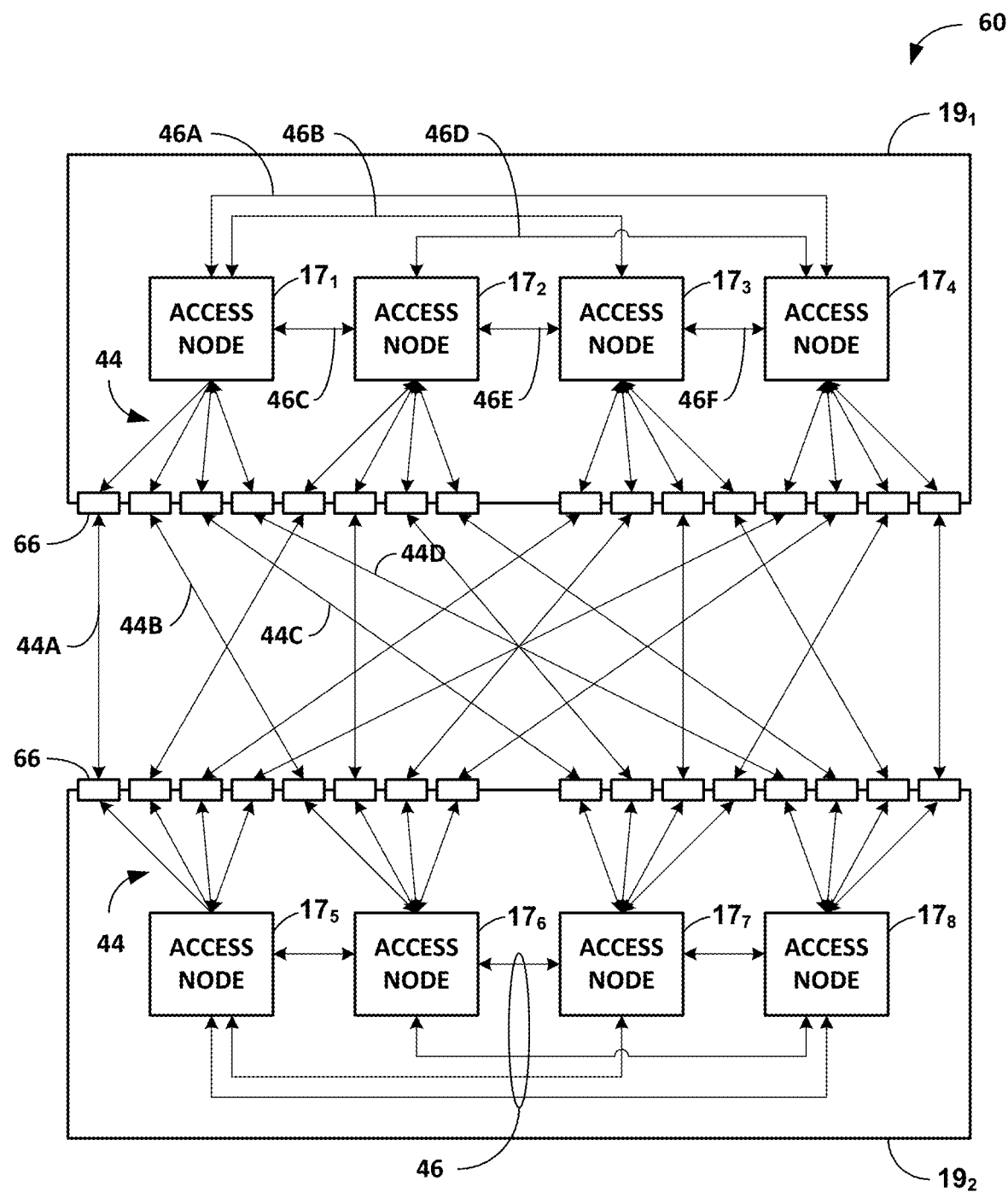
FIG. 5 is a block diagram illustrating an example of full mesh connectivity between two access node groups within a logical rack.

FIG. 5 is a block diagram illustrating an example of full mesh connectivity between two access node groups $19_1$, $19_2$ within a logical rack 60. As illustrated in FIG. 5, access node group $19_1$ includes four access nodes $17_1$-$17_4$ and access node group $19_2$ also include four access nodes $17_5$-$17_8$. Each of access nodes 17 connects to the other access nodes within the logical rack in a mesh fabric topology. The eight access nodes 17 included in the mesh topology may be referred to as an access node "cluster." In this way, each of access nodes 17 is able to spray incoming packets to each of the other access nodes in the cluster.

In the illustrated configuration of an 8-way mesh interconnecting two access node groups 19, each access node 17 connects via full mesh connectivity to each of the other seven access nodes in the cluster. The mesh topology between access nodes 17 includes intra-access node group links 46 between the four access nodes included in the same access node group 19, and inter-access node group links 44 between access nodes $17_1$-$17_4$ in access node group $19_1$ and access nodes $17_5$-$17_8$ in access node group $19_2$. Although illustrated as a single connection between each of access nodes 17, each of connections 44, 46 are bidirectional such that each access node connects to each other access node in the cluster via a separate link.

Each of access nodes $17_1$-$17_4$ within first access node group $19_1$ has three intra-access node group connections 46 to the other access nodes in first access node group $19_1$. As illustrated in first access node group $19_1$, access node $17_1$ supports connection 46A to access node $17_4$, connection 46B to access node $17_3$, and connection 46C to access node $17_2$. Access node $17_2$ supports connection 46A to access node $17_1$, connection 46D to access node $17_4$, and connection 46E to access node $17_3$. Access node $17_3$ supports connection 46B to access node $17_1$, connection 46E to access node $17_2$, and connection 46F to access node $17_4$. Access node $17_4$ supports connection 46A to access node $17_1$, connection 46D to access node $17_2$, and connection 46F to access node $17_3$. The access nodes $17_5$-$17_8$ are similarly connected within second access node group $19_2$.

Each of access nodes $17_1$-$17_4$ within first access node group $19_1$ also has four inter-access node group connections 44 to the access nodes $17_5$-$17_8$ in second access node group $19_2$. As illustrated in FIG. 5, first access node group $19_1$ and second access node group $19_2$ each has sixteen externally-available ports 66 to connect to each other. For example, access node $17_1$ supports connections 44A, 44B, 44C, and 44D through four external facing ports 66 of first access node group $19_1$ to four externally-available ports 66 of second access node group $19_2$ to reach access nodes $17_5$-$17_8$. Specifically, access node $17_1$ supports connection 44A to access node $17_5$ within second access node group $19_2$, connection 44B to access node $17_6$ within second access node group $19_2$, connection 44C to access node $17_7$ within second access node group $19_2$, and connection 44D to access node $17_8$ within second access node group $19_2$. The remaining access nodes $17_2$-$17_4$ within first access node group $19_1$ are similarly connected to access nodes $17_5$-$17_8$ within second access node group $19_2$. In addition, in the reverse direction, the access nodes $17_5$-$17_8$ are similarly connected to access nodes $17_1$-$17_4$ within first access node group $19_1$.

Each of access nodes 17 may be configured to support up to 400 Gigabits of bandwidth to connect to other access nodes in the cluster. In the illustrated example, each of access nodes 17 may support up to eight 50 GE links to the other access nodes. In this example, since each of access nodes 17 only connects to seven other access nodes, 50 Gigabits of bandwidth may be leftover and used for managing the access node. In some examples, each of connections 44, 46 may be single 50 GE connections. In other examples, each of connections 44, 46 may be 2×25 GE connections. In still other examples, each of intra-access node group connections 46 may be 2×25 GE connections, and each of inter-access node group connections 44 may be single 50 GE connections to reduce a number of inter-box cables. For example, from each access node $17_1$-$17_4$ within first access node group $19_1$, 4×50 GE links go off box to connect to access nodes $17_5$-$17_8$ in second access node group $19_2$. In some examples, the 4×50 GE links may be taken out from each of the access nodes 17 using DAC cables.

Figure 6:
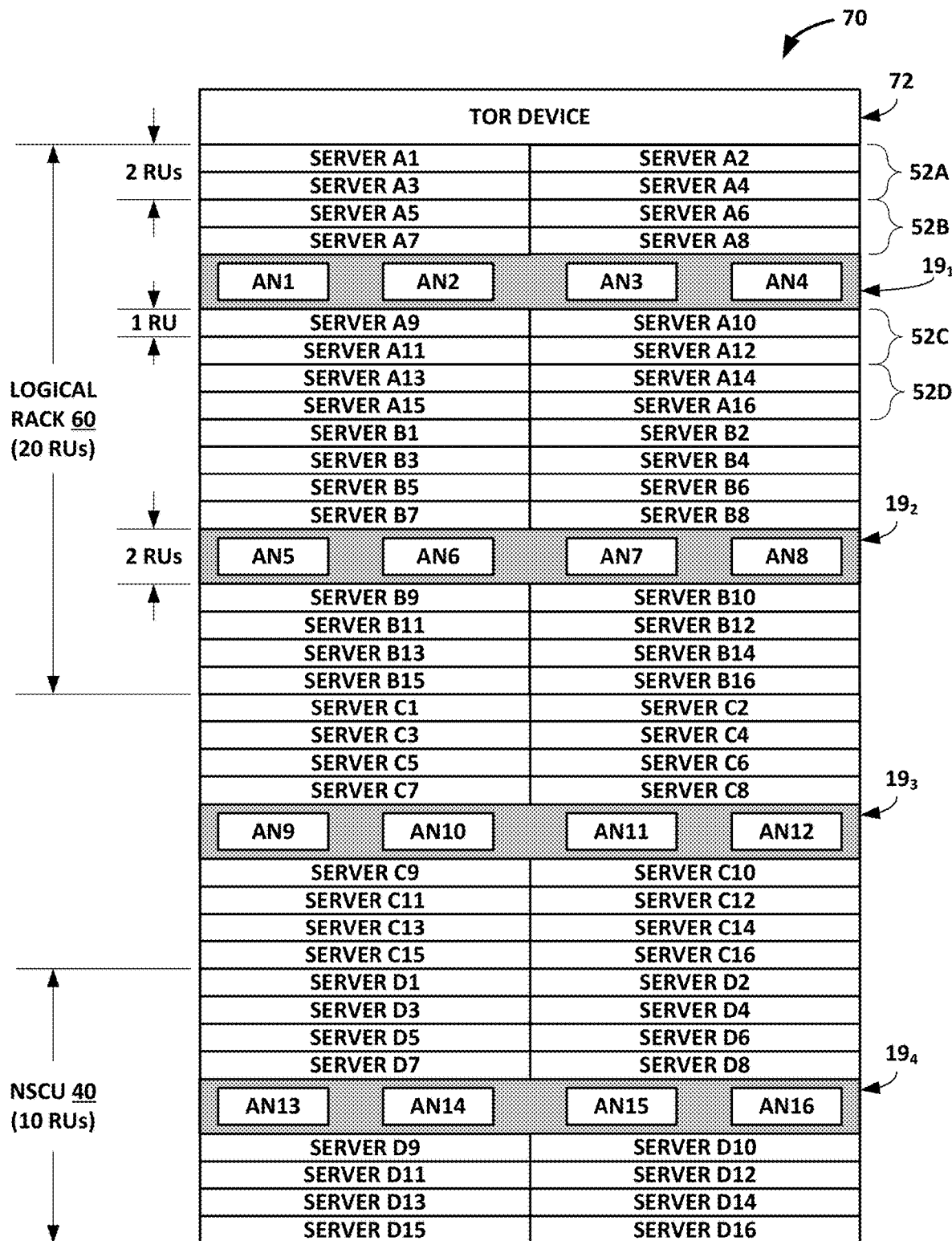
FIG. 6 is a block diagram illustrating an example arrangement of a full physical rack including two logical racks from FIG. 4.

FIG. 6 is a block diagram illustrating an example arrangement of a full physical rack 70 including two logical racks 60 from FIG. 4. In the illustrated example of FIG. 6, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor. In some examples, rack 70 may not include an additional TOR device 72 and instead have the typical 40 rack units.

In the illustrated example, rack 70 includes four access node groups $19_1$-$19_4$ that are each separate network appliances 2RU in height. Each of the access node groups 19 includes four access nodes and may be configured as shown in the example of FIG. 3. For example, access node group $19_1$ includes access nodes AN1-AN4, access node group $19_2$ includes access nodes AN5-AN8, access node group $19_3$ includes access nodes AN9-AN12, and access node group $19_4$ includes access nodes AN13-AN16. Access nodes AN1-AN16 may be substantially similar to access nodes 17 described above.

In this example, each of the access node groups 19 supports sixteen server nodes. For example, access node group $19_1$ supports server nodes A1-A16, access node group $19_2$ supports server nodes B1-B16, access node group $19_3$ supports server nodes C1-C16, and access node group $19_4$ supports server nodes D1-D16. A server node may be a dual-socket or dual-processor server sled that is ½Rack in width and 1RU in height. As described with respect to FIG. 3, four of the server nodes may be arranged into a server 52 that is 2RU in height. For example, server 52A includes server nodes A1-A4, server 52B includes server nodes A5-A8, server 52C includes server nodes A9-A12, and server 52D includes server nodes A13-A16. Server nodes B1-B16, C1-C16, and D1-D16 may be similarly arranged into servers 52.

Access node groups 19 and servers 52 are arranged into NSCUs 40 from FIGS. 3-4. NSCUs 40 are 10RU in height and each include one 2RU access node group 19 and four 2RU servers 52. As illustrated in FIG. 6, access node groups 19 and servers 52 may be structured as a compute sandwich, in which each access node group 19 is "sandwiched" between two servers 52 on the top and two servers 52 on the bottom. For example, with respect to access node group $19_1$, server 52A may be referred to as a top second server, server 52B may be referred to as a top server, server 52C may be referred to as a bottom server, and server 52D may be referred to as a bottom second server. In the illustrated structural arrangement, access node groups 19 are separated by eight rack units to accommodate the bottom two 2RU servers 52 supported by one access node group and the top two 2RU servers 52 supported by another access node group.

NSCUs 40 may be arranged into logical racks 60, i.e., half physical racks, from FIG. 5. Logical racks 60 are 20RU in height and each include two NSCUs 40 having full mesh connectivity. In the illustrated example of FIG. 6, access node group $19_1$ and access node group $19_2$ are included in the same logical rack 60 along with their respective supported server nodes A1-A16 and B1-B16. As described in more detail above with respect to FIG. 5, access nodes AN1-AN8 included the same logical rack 60 are connected to each other in an 8-way mesh. Access nodes AN9-AN16 may be similarly connected in an 8-way mesh within another logical rack 60 includes access nodes groups $19_3$ and $19_4$ along with their respective server nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between access nodes 17 and core switches 22 and that is configured such that optical communications are "permuted" based on wavelength so as to provide full-mesh connectivity between the upstream and downstream ports without any optical interference.

In the illustrated example, each of the access node groups 19 may connect to TOR device 72 via one or more of the 8×100 GE links supported by the access node group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four server nodes and the four access node groups. For example, each of the access node groups 19 may use approximately 1 kW of power resulting in approximately 4 kW of power for access node groups. In addition, each of the server nodes may use approximately 200 W of power resulting in around 12.8 kW of power for servers 52. In this example, the 40RU arrangement of access node groups 19 and servers 52, therefore, uses around 16.8 kW of power.

Figure 7A:
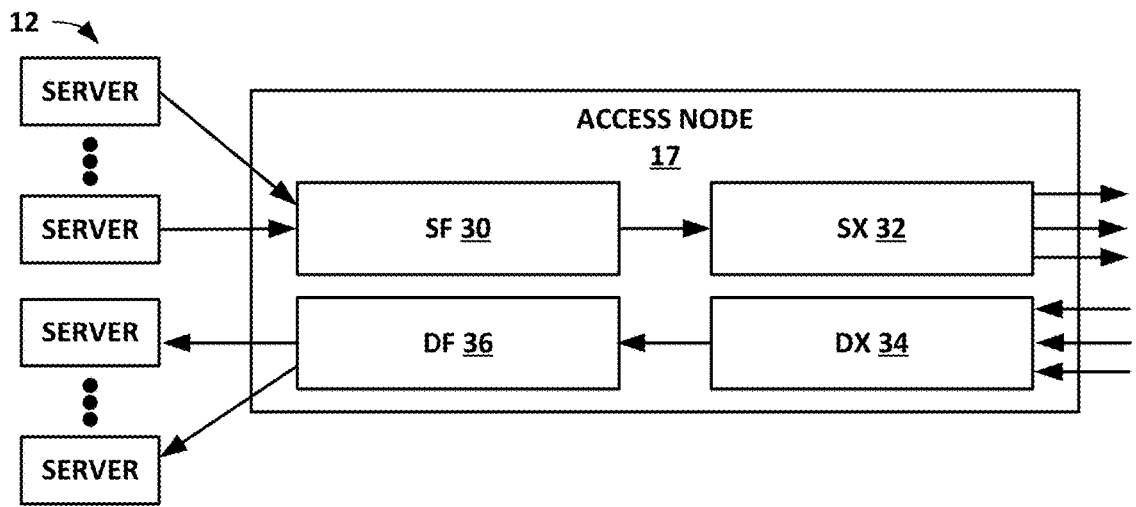
FIG. 7A is a block diagram showing a logical view of the networking data paths and operations within an access node.

FIG. 7A is a block diagram showing a logical view of the networking data paths and operations within an access node 17. As shown in the example of FIG. 7A, in some example implementations, each access node 17 implements at least four different operational networking components or functions: (1) a source (SF) component 30 operable to receive traffic from a set of servers 12 supported by the access node, (2) a source switching (SX) component 32 operable to switch source traffic to other source switching components of different access nodes 17 (possibly of different access node groups) or to core switches 22, (3) a destination switching (DX) component 34 operable to switch inbound traffic received from other source switching components or from cores switches 22 and (4) a destination (DF) component 36 operable to reorder packet flows and provide the packet flows to destination servers 12.

In some examples, the different operational networking components of access node 17 may perform flow-based switching and ECMP based load balancing for Transmission Control Protocol (TCP) packet flows. Typically, however, ECMP load balances poorly as it randomly hashes the flows to paths such that a few large flows may be assigned to the same path and severely imbalance the fabric. In addition, ECMP relies on local path decisions and does not use any feedback about possible congestion or link failure downstream for any of the chosen paths.

The techniques described in this disclosure introduce a new data transmission protocol referred to as a Fabric Control Protocol (FCP) that may be used by the different operational networking components of access node 17. FCP is an end-to-end admission control protocol in which a sender explicitly requests a receiver with the intention to transfer a certain number of bytes of payload data. In response, the receiver issues a grant based on its buffer resources, QoS, and/or a measure of fabric congestion.

For example, the FCP includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth. In addition, instead of the flow-based switching and ECMP forwarding used to send all packets of a TCP flow on the same path to avoid packet reordering, the FCP enables packets of an individual packet flow to be sprayed to all available links between a source node and a destination node. The source node assigns a packet sequence number to each packet of the flow, and the destination node may use the packet sequence numbers to put the incoming packets of the same flow in order.

SF component 30 of access node 17 is considered a source node of the fabric. According to the disclosed techniques, for FCP traffic, SF component 30 is configured to spray its input bandwidth (e.g., 200 Gbps) over links to multiple SX components of access nodes within a logical rack. For example, as described in more detail with respect to FIG. 7B, SF component 30 may spray packets of the same flow across eight links to SX component 32 and seven other SX components of other access nodes within a logical rack. For non-FCP traffic, SF component 30 is configured to select one of the connected SX components to which to send packets of the same flow.

SX component 32 of access node 17 may receive incoming packets from multiple SF components of access nodes within the logical rack, e.g., SF component 30 and seven other SF components of other access nodes within the logical rack. For FCP traffic, SX component 32 is also configured to spray its incoming bandwidth over links to multiple core switches in the fabric. For example, as described in more detail with respect to FIG. 8, SX component 32 may spray its bandwidth across eight links to eight core switches. In some cases, SX component 32 may spray its bandwidth across eight links to four or eight intermediate devices, e.g., TOR Ethernet switches, electrical permutation devices, or optical permutation devices, which in turn forward traffic to the core switches. For non-FCP traffic, SX component 32 is configured to select one of the core switches to which to send packets of the same packet flow. Since the incoming bandwidth to SX component 32 and the outgoing bandwidth from SX component 32 is same (e.g., 200 Gbps), congestion should not occur at the SX stage even for a large number of packet flows.

DX component 34 of access node 17 may receive incoming packets from multiple core switches either directly or via one or more intermediate devices, e.g., TOR Ethernet switches, electrical permutation devices, or optical permutation devices. For example, DX component 34 may receive incoming packets from eight core switches, or four or eight intermediate devices. DX component 34 is configured to select a DF component to which to send the received packets. For example, DX component 34 may be connected to DF component 36 and seven other DF components of other access nodes within the logical rack. In some case, DX component 34 may become a congestion point because DX component 34 may receive a large amount of bandwidth (e.g., 200 Gbps) that is all to be sent to the same DF component. In the case of FCP traffic, DX component 34 may avoid long term congestion using the admission control mechanisms of FCP.

DF component 36 of access node 17 may receive incoming packets from multiple DX components of access nodes within the logical rack, e.g., DX component 34 and seven other DX components of other access nodes within the logical rack. DF component 36 is considered a destination node of the fabric. For FCP traffic, DF component 36 is configured to recorder packets of the same flow prior to transmitting the flow to a destination server 12.

In some examples, SX component 32 and DX component 34 of access node 17 may use the same forwarding table to perform packet switching. In this example, the personality of access node 17 and the nexthop identified by the forwarding table for the same destination IP address may depend on a source port type of the received data packet. For example, if a source packet is received from a SF component, access node 17 operates as SX component 32 and determines a nexthop to forward the source packet over the fabric toward a destination node. If a packet is received from a fabric-facing port, access node 17 operates as DX component 34 and determines a final nexthop to forward the incoming packet directly to a destination node. In some examples, the received packet may include an input tag that specifies its source port type.

Figure 7B:
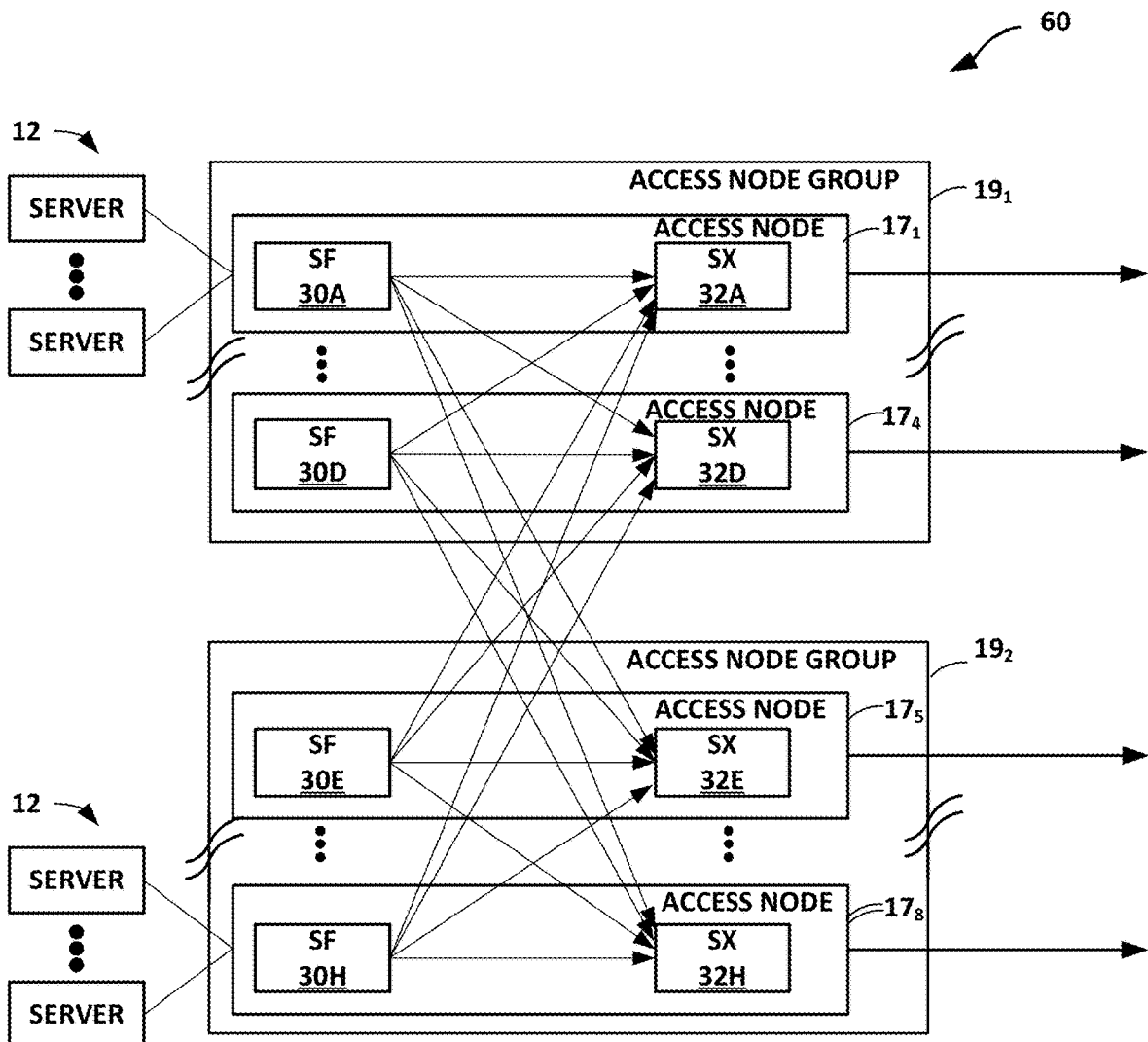
FIG. 7B is a block diagram illustrating an example first-level network fanout achieved between a set of access nodes within a logical rack.

FIG. 7B is a block diagram illustrating an example first-level network fanout achieved between a set of access nodes $17_1$-$17_8$ within a logical rack 60. In the illustrated example of FIG. 7B, logical rack 60 includes two access node groups $19_1$ and $19_2$ containing eight access nodes $17_1$-$17_8$ and server nodes 12 supported by each of the access nodes.

As shown in FIG. 7B, SF components 30A-30H and SX components 32A-32H of access nodes 17 within logical rack 60 have full mesh connectivity in that each SF component 30 is connected to all of the SX components 32 of the eight access nodes 17 within logical rack 60. As described above, the eight access nodes 17 within logical rack 60 may be connected to each other by an 8-way mesh of electrical Ethernet connections. In the case of FCP traffic, SF components 30 of access nodes 17 within logical rack 60 apply spraying algorithms to spray packets for any given packet flow across all available links to SX components 32. In this way, SF components 30 need not necessarily perform a full lookup operation for L2/L3 switching of outbound packets of packet flows originating from servers 12. In other words, packets for a given packet flow may be received by an SF component 30, such as SF component 30A, and sprayed across some or all of the links to SX components 32 for the logical rack 60. In this way, access nodes 17 for a logical rack achieve a first-level fan out of, in this example, 1:8 and may do so, in some examples, without incurring any L2/L3 forwarding lookup relative to keying information in the packet headers. As such, packets for a single packet flow need not follow the same path when sprayed by a given SF component 30.

Thus, according to the disclosed techniques, upon receiving source traffic from one of servers 12, SF component 30A implemented by access node $17_1$, for example, performs an 8-way spray of packets of the same flow across all available links to SX components 32 implemented by access nodes 17 included in logical rack 60. More specifically, SF component 30A sprays across one internal SX component 32A of the same access node $17_1$ and seven external SX components 32B-32H of the other access nodes $17_2$-$17_8$ within logical rack 60. In some implementations, this 8-way spray between SFs 30 and SXs 32 within logical rack 60 may be referred to as a first-stage spray. As described in other portions of this disclosure, a second-stage spray may be performed over a second-level network fanout within the switch fabric between access nodes 17 and core switches 22. For example, the second-stage spray may be performed through an intermediate device, such as a TOR Ethernet switch, an electric permutation device, or an optical permutation device.

In some examples, as described in more detail above, the first four access nodes $17_1$-$17_4$ may be included in a first access node group $19_1$ and the second four access nodes $17_4$-$17_8$ may be included in a second access node group $19_2$. The access nodes 17 within the first and second access node groups 19 may be connected to each other via a full-mesh in order to allow the 8-way spray between SFs 30 and SXs 32 within logical rack 60. In some examples, logical rack 60 including the two access nodes groups together with their supported servers 12 may be referred to as a half-rack or a half physical rack. In other examples, more or fewer access nodes may be connected together using full-mesh connectivity. In one example, sixteen access nodes 17 may be connected together in a full-mesh to enable a first-stage 16-way spray within a full physical rack.

Figure 8:
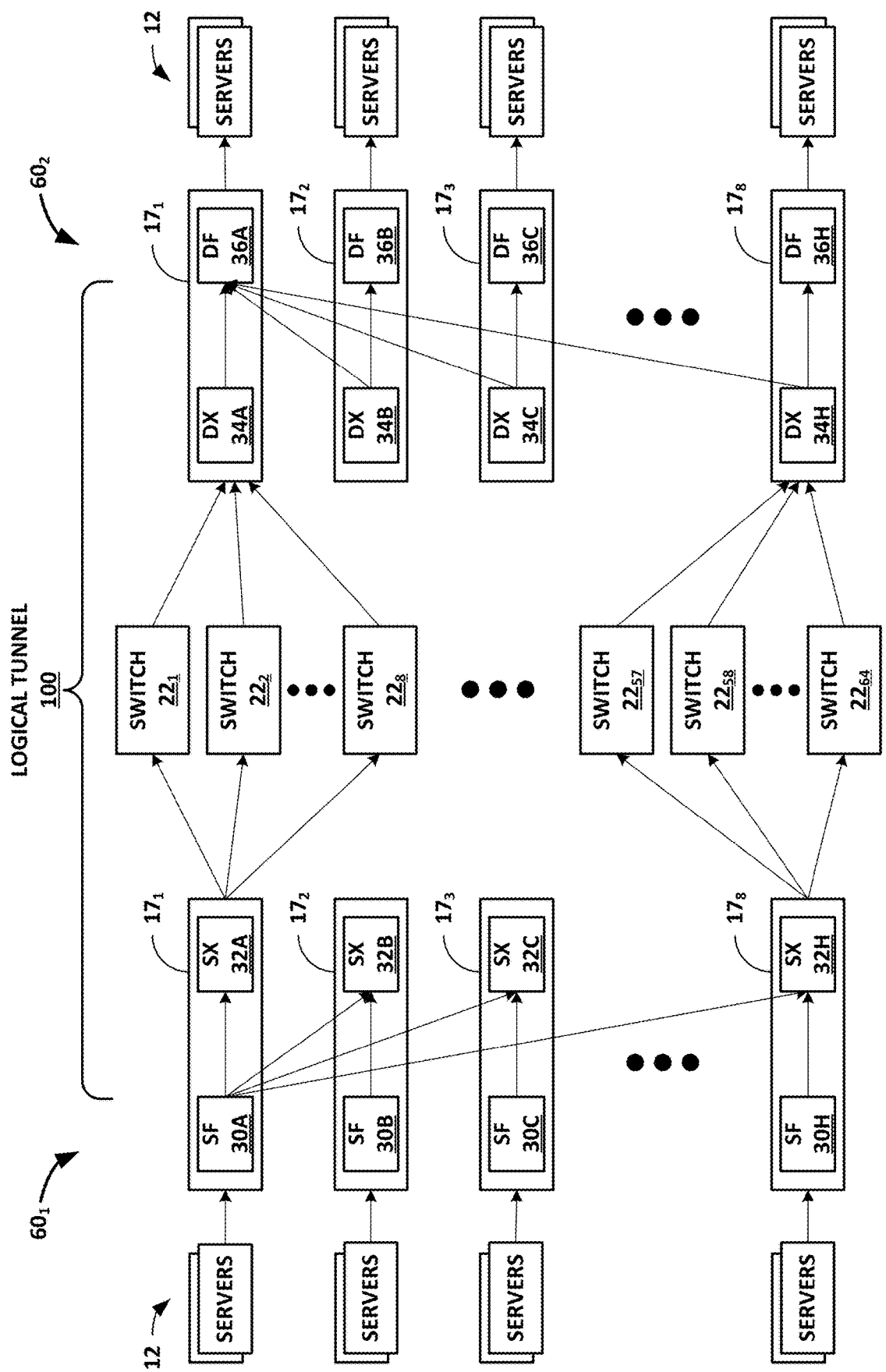
FIG. 8 is a block diagram illustrating an example multi-level network fanout across a data center switch fabric between access nodes.

FIG. 8 is a block diagram illustrating an example multi-level network fanout across a data center switch fabric between access nodes 17. In the illustrated example of FIG. 8, each of the logical racks 60 includes eight access nodes $17_1$-$17_8$ and server nodes 12 supported by each of the access nodes. The first logical rack $60_1$ is connected to the second logical rack $60_2$ through core switches 22 within the switch fabric. In some examples, the first logical rack $60_1$ and the second logical rack $60_2$ may be the same logical rack.

According to the disclosed techniques, the switch fabric comprises FCP-based flow control and network communication within a network fabric. The network fabric may be visualized as including multiple channels, e.g., a request channel, a grant channel, an FCP data channel, and a non-FCP data channel, as described in more detail with respect to FIG. 11. As illustrated in FIG. 8, the FCP data channel carries data packets via a logical tunnel 100 that includes all paths between a source node, e.g., SF component 30A of access node $17_1$, in a first logical rack 601 and a destination node, e.g., DF component 36A of access node $17_1$, in a second logical rack 602. The FCP data channel carries the data packets using the FCP protocol. The FCP packets are sprayed over the fabric from the source node to the destination node through a suitable load balancing scheme. The FCP packets are not expected to be delivered in order, but the destination node may perform packet reordering. For example, packets of a traffic flow received from a source server 12 by SF component 30A of access node $17_1$ may be sprayed over some or all possible links within logical tunnel 100 toward DF component 36A of access node $17_1$.

In some examples, DF component 36A is configured to reorder the received packets to recreate the original sequence of the packet flow prior to transmitting the packet flow to the destination server 12. In other examples, DF component 36A may not need to reorder the received packets of the packet flow prior to transmitting the packet flow to the destination server 12. In these examples, DF component 36A may instead deliver the packets to the destination server 12 in the order in which the packets arrive. For example, packets that comprise storage access requests or responses to a destination storage appliance may not need to be reordered into the original sequence in which they were sent.

The request channel within the network fabric may be used to carry FCP request messages from the source node to the destination node. Similar to the FCP data packets, the FCP request messages may be sprayed over all available paths toward the destination node, but the request messages do not need to be reordered. In response, the grant channel within the network fabric may be used to carry FCP grant messages from the destination node to source node. The FCP grant messages may also be sprayed over all available paths toward the source node, and the grant messages do not need to be reordered. The non-FCP data channel within the network fabric carries data packets that do not use the FCP protocol. The non-FCP data packets may be forwarded or routed using ECMP based load balancing and, for a given flow identified by a five tuple, the packets are expected to be delivered in order to the destination node.

The example of FIG. 8 illustrates both the first-level network fanout between the access nodes 17 within first logical rack $60_1$, as described above with respect to FIG. 7B, and a second-level network fanout between the access nodes 17 and the core switches 22. As described above with respect to FIGS. 3-4, the eight access nodes 17 within first logical rack $60_1$ are connected to core switches 22 using either electrical or optical Ethernet connections. The eight access nodes 17 within second logical rack $60_2$ are similarly connected to the core switches 22. In some examples, each of access nodes 17 may connect to eight of core switches 22. In the case of FCP traffic, SX components 32 of access nodes 17 within first logical rack $60_1$ apply spraying algorithms to spray packets for any given packet flow across all available paths to the core switches 22. In this way, the SX components 32 may not perform a full lookup operation for L2/L3 switching of received packets.

Upon receiving source traffic from one of the servers 12, an SF component 30A of access node $17_1$ in the first logical rack $60_1$ performs an 8-way spray of FCP packets of the traffic flow across all available paths to SX components 32 implemented by the access nodes 17 in the first logical rack $60_1$. As further illustrated in FIG. 8, each of the SX components 32 then sprays the FCP packets of the traffic flow across all available paths to the core switches 22. In the illustrated example, the multi-level fanout is 8-by-8 and, therefore, supports up to sixty-four core switches $22_1$-$22_{64}$. In other examples, in which the first-level fanout is 1:16 within a full physical rack, the multi-level fanout may be 16-by-16 and support up to 256 core switches.

Although illustrated in FIG. 8 as occurring directly between the access nodes 17 and the core switches 22, the second-level fanout may be performed through one or more TOR devices, such as top of rack Ethernet switches, optical permutation devices, or electrical permutation devices. The multi-level network fanout enables packets of a traffic flow received at any of the access nodes 17 within the first logical rack $60_1$ to reach core switches 22 for further forwarding to any of the access nodes 17 within the second logical rack $60_2$.

According to the disclosed techniques, in one example implementation, each of SF components 30 and SX components 32 uses an FCP spray engine configured to apply a suitable load balancing scheme to spray the packets of a given FCP packet flow across all available paths to a destination node. In some examples, the load balancing scheme may direct each of the FCP packets of the packet flow to one of the parallel data paths selected based on available bandwidth (i.e., least loaded path). In other examples, the load balancing scheme may direct each of the FCP packets of the packet flow to a randomly, pseudo-randomly, or round-robin selected one of the parallel data paths. In a further example, the load balancing scheme may direct each of the FCP packets of the packet flow to a weighted randomly selected one of the parallel data paths in proportion to available bandwidth in the switch fabric.

In the example of the least loaded path selection, the FCP spray engine may track a number of bytes transmitted on each path in order to select a least loaded path on which to forward a packet. In addition, in the example of the weighted random path selection, the FCP spray engine may track path failures downstream to provide flow fairness by spraying packets in proportion to bandwidth weight on each active path. For example, if one of core switches $22_1$-$22_8$ connected to SX component 32A fails, then the path weights between SF component 30A and SX components 32 change to reflect the smaller proportion of switch fabric bandwidth available behind access node $17_1$ within first logical rack $60_1$. In this example, SF component 30A will spray to SX components 32 in proportion to the available bandwidth behind access nodes 17 within first logical rack $60_1$. More specifically, SF component 30A will spray fewer packets to SX component 32A then the other SX components 32 based on the reduced switch fabric bandwidth behind access node $17_1$ within first logical rack $60_1$ due to the failure of one of the connected core switches $22_1$-$22_8$. In this way, the spray of packets may not be uniform across the available paths toward the destination node, but bandwidth will be balanced across the active paths even over relatively short periods.

In this example, the source node, e.g., SF component 30A of access node $17_1$, within first logical rack $60_1$ sends a request message to the destination node, e.g., DF component 36A of access node $17_1$, within second logical rack $60_2$ requesting a certain weight or bandwidth and the destination node sends a grant message to the source node after reserving the egress bandwidth. The source node also determines whether any link failures have occurred between core switches 22 and logical rack $60_2$ that includes the destination node. The source node may then use all active links in proportion to the source and destination bandwidths. As an example, assume there are N links between the source node and the destination node each with source bandwidth $Sb_i$ and destination bandwidth $Db_i$, where i=1 . . . N. The actual bandwidth from the source nodes to the destination node is equal to min(Sb, Db) determined on a link-by-link basis in order to take failures into account. More specifically, the source bandwidth (Sb) is equal to $\Sigma_{i=1}^{N} Sb_i$, and destination bandwidth (Db) is equal to $\Sigma_{i=1}^{N} Db_i$, and the bandwidth ($b_i$) of each link is equal to min($Sb_i$, $Db_i$). The weight of the bandwidth used on each link is equal to $b_i/\Sigma_{i=1}^{N} b_i$.

In the case of FCP traffic, SF components 30 and SX components 32 use the FCP spray engine to distribute FCP packets of the traffic flow based on the load on each link toward the destination node, proportion to its weight. The spray engine maintains credit memory to keep track of credits (i.e., available bandwidth) per nexthop member link, uses packet length included in an FCP header to deduct credits (i.e., reduce available bandwidth), and associates a given packet to the one of the active links having the most credits (i.e., the least loaded link). In this way, for FCP packets, the SF components 30 and SX components 32 spray packets across member links of a nexthop for a destination node in proportion to the member links' bandwidth weights. More details on fabric failure resiliency is available in U.S. Provisional Patent Application No. 62/638,725, filed Mar. 5, 2018, entitled "Resilient Network Communication Using Selective Multipath Packet Flow Spraying," the entire content of which is incorporated herein by reference.

In another example implementation, each of SF components 30 or SX components 32 modifies a UDP portion of a header for each of the FCP packets of a packet flow in order to force the packet spraying downstream to core switches 22. More specifically, each of SF components 30 or SX components 32 is configured to randomly set a different UDP source port in the UDP portion of the header for each of the FCP packets of the packet flow. Each of core switches 22 computes a hash of N-fields from the UDP portion of the header for each of the FCP packets and, based on the randomly set UDP source port for each of the FCP packets, selects one of the parallel data paths on which to spray the FCP packet. This example implementation enables spraying by core switches 22 without modifying core switches 22 to understand the FCP.

Core switches 22 operate as the single hop along logical tunnel 100 between the source node, e.g., SF component 30A of access node $17_1$, in first logical rack $60_1$ and the destination node, e.g., DF component 36A of access node $17_1$, in the second logical rack $60_2$. Core switches 22 perform a full lookup operation for L2/L3 switching of the received packets. In this way, core switches 22 may forward all the packets for the same traffic flow toward the destination node, e.g., DF component 36A of access node $17_1$, in the second logical rack $60_2$ that supports the destination server 12. Although illustrated in FIG. 8 as occurring directly between the core switches 22 and destination access node $17_1$ of second logical rack $60_2$, the core switches 22 may forward all the packets for the same traffic flow to an intermediate TOR device that has connectivity to the destination node. In some examples, the intermediate TOR device may forward all the packet for the traffic flow directly to DX component 34A implemented by access node $17_1$ of second logical rack $60_2$. In other examples, the intermediate TOR device may be an optical or electrical permutation device configured to provide another fanout over which the packets can be sprayed between input and output ports of the permutation device. In this example, all or some portion of the DX components 34 of access nodes 17 of second logical rack $60_2$ may receive sprayed packets of the same traffic flow.

DX components 34 and DF components 36 of access nodes 17 within second logical rack $60_2$ also have full mesh connectivity in that each DX component 34 is connected to all of the DF components 36 within second logical rack $60_2$. When any of DX components 34 receive the packets of the traffic flow from core switches 22, the DX components 34 forward the packets on a direct path to DF component 36A of access node $17_1$. DF component 36A may perform a limited lookup necessary only to select the proper output port for forwarding the packets to the destination server 12. In response to receiving the packets of the traffic flow, DF component 36A of access node $17_1$ within second logical rack $60_2$ may reorder the packets of the traffic flow based on sequence numbers of the packets. As such, with respect to full routing tables for the data center, only the core switches 22 may need to perform full lookup operations. Thus, the switch fabric provides a highly-scalable, flat, high-speed interconnect in which servers are effectively one L2/L3 hop from any other server 12 within the data center.

More details on the data center network architecture and interconnected access node illustrated in FIGS. 1-8B are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

A brief description of FCP and one example of its operation with respect to FIG. 8 is included here. In the example of FIG. 8, access nodes 17 are fabric end points (FEPs) to the network fabric, which is made up of switching elements, e.g., core switches 22, arranged in a leaf-spine topology. The network fabric allows one access node 17 to communicate with another one through multiple paths. Core switches 22 inside the network fabric have shallow packet buffers. The cross-sectional bandwidth of the network fabric is equal to or greater than the sum of all end point bandwidths. In this way, if each access node 17 limits the incoming data rate to the network fabric, none of the paths inside the network fabric should be congested long term with very high probability.

As described above, FCP data packets are sent from a source node, e.g., SF component 30A of access node $17_1$ within first logical rack $60_1$, to a destination node, e.g., DF component 36A of access node $17_2$ within second logical rack $60_2$, via logical tunnel 100. Before any traffic is sent over tunnel 100 using FCP, the connection must be established between the end points. A control plane protocol executed by access nodes 17 may be used to set up a pair of tunnels, one in each direction, between the two FCP end points. The FCP tunnels are optionally secured (e.g., encrypted and authenticated). Tunnel 100 is considered to be unidirectional from the source node to the destination node, and an FCP partner tunnel may be established in the other direction from the destination node to the source node. The control plane protocol negotiates the capabilities (e.g., block size, maximum transmission unit (MTU) size, etc.) of both end points, and establishes the FCP connection between the end points by setting up tunnel 100 and its partner tunnel and an initializing queue state context for each tunnel.

Each of the end points is assigned a source tunnel ID and a corresponding destination tunnel ID. At each end point, a queue ID for a given tunnel queue is derived based on the assigned tunnel ID and priority. For example, each FCP end point may allocate a local tunnel handle from a pool of handles and communicate the handle to its FCP connection partner end point. The FCP partner tunnel handle is stored in a lookup table and referenced from the local tunnel handle. For the source end point, e.g., access node $17_1$ within first logical rack $60_1$, a source queue is identified by the local tunnel ID and priority, and a destination tunnel ID is identified from the lookup table based on the local tunnel ID. Similarly, for the destination end point, e.g., access node $17_1$ within second logical rack $60_2$, a destination queue is identified by the local tunnel ID and priority, and a source tunnel ID is identified from the lookup table based on the local tunnel ID.

FCP tunnel queues are defined as buckets of independent traffic streams that use FCP to transport payload across the network fabric. An FCP queue for a given tunnel is identified by the tunnel ID and priority, and the tunnel ID is identified by the source/destination end point pair for the given tunnel. Alternatively, the end points may use a mapping table to derive the tunnel ID and priority based on an internal FCP queue ID for the given tunnel. In some examples, a fabric tunnel, e.g., logical tunnel 100, may support 1, 2, 4, or 8 queues per tunnel. The number of queues per tunnel is a network fabric property and may be configured at the time of deployment. All tunnels within the network fabric may support the same number of queues per tunnel. Each end point may support a maximum of 16,000 queues.

When the source node is communicating with the destination node, the source node encapsulates the packets using an FCP over UDP encapsulation. The FCP header carries fields identifying tunnel IDs, queue IDs, packet sequence numbers (PSNs) for packets, and request, grant, and data block sequence numbers between the two end points. At the destination node, the incoming tunnel ID is unique for all packets from the specific source node. The tunnel encapsulation carries the packet forwarding as well as the reordering information used by the destination node. A single tunnel carries packets for one or multiple queues between the source and destination nodes. Only the packets within the single tunnel are reordered based on sequence number tags that span across the queues of the same tunnel. The source node tags the packets with tunnel PSNs when they are sent over the tunnel toward the destination node. The destination node may reorder the packets based on the tunnel ID and the PSNs. At the end of the reorder, the destination node strips the tunnel encapsulation and forwards the packets to the respective destination queues.

An example of how an IP packet entering FCP tunnel 100 at a source end point is transmitted to a destination end point is described here. A source server 12 having an IP address of A0 sends an IP packet for a destination server 12 having an IP address of B0. The source FCP endpoint, e.g., access node $17_1$ within first logical rack $60_1$, transmits an FCP request packet with source IP address A and destination IP address B. The FCP request packet has an FCP header to carry the Request Block Number (RBN) and other fields. The FCP request packet is transmitted over UDP over IP. The destination FCP end point, e.g., access node $17_1$ within second logical rack $60_2$, sends an FCP grant packet back to the source FCP end point. The FCP grant packet has an FCP header to carry the Grant Block Number (GBN) and other fields. The FCP grant packet is transmitted over UDP over IP. The source end point transmits the FCP data packet after receiving the FCP grant packet. The source end point appends a new (IP+UDP+FCP) data header on the input data packet. The destination end point removes the appended (IP+UDP+FCP) data header before delivering the packet to the destination host server.

Figure 9:
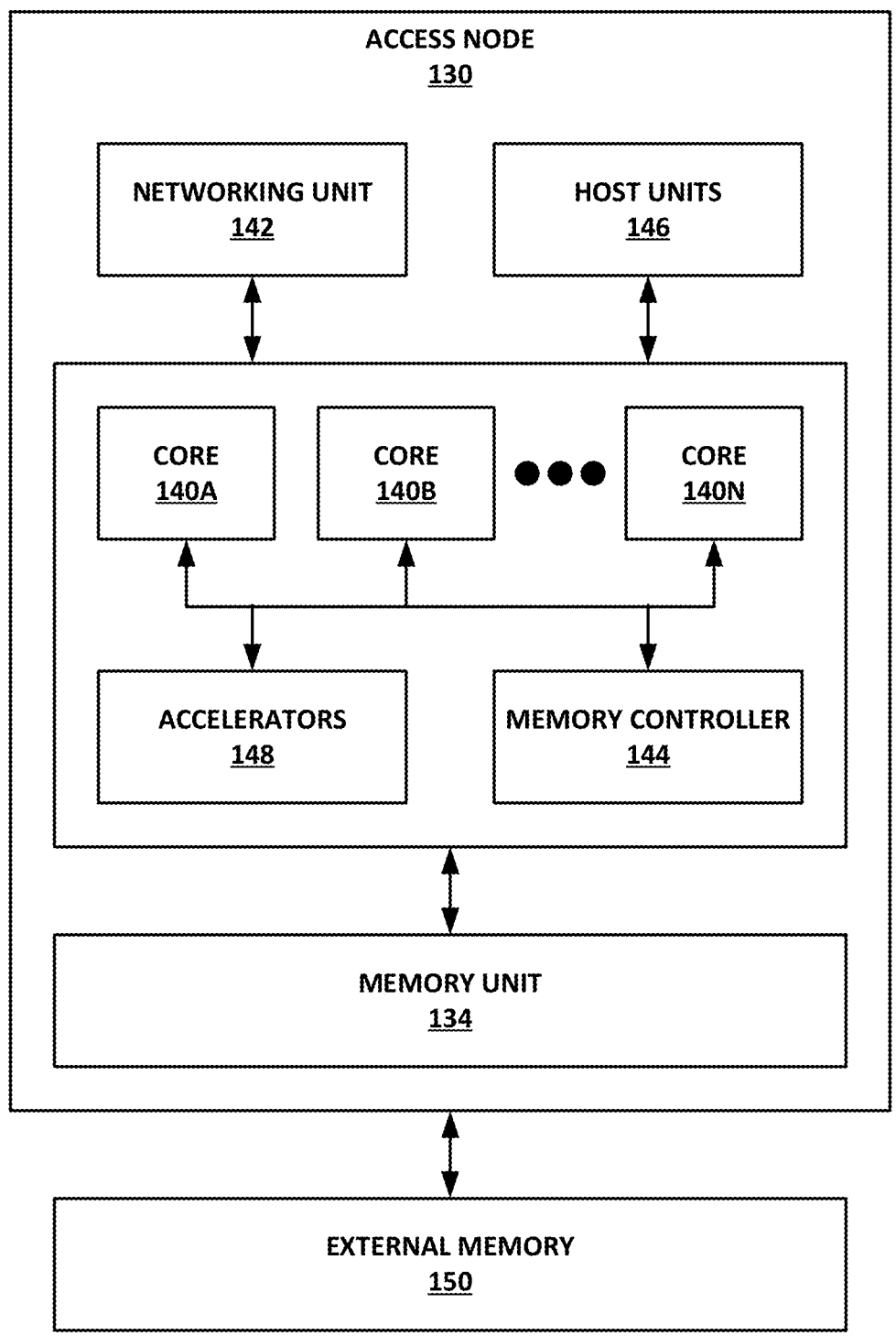
FIG. 9 is a block diagram illustrating an example access node including a networking unit and two or more processing cores.

FIG. 9 is a block diagram illustrating an example access node 130 including a networking unit 142 and two or more processing cores 140A-140N (collectively "cores 140"). Access node 130 generally represents a hardware chip implemented in digital logic circuitry. As various examples, access node 130 may be provided as an integrated circuit mounted on a motherboard of a computing device or installed on a card connected to the motherboard of the computing device via PCIe, or the like. In some examples, access node 130 may be an integrated circuit within an access node group (e.g., one of access node groups 19) configured as a standalone network device for installation within a compute rack, a storage rack, or a converged rack.

Access node 130 may operate substantially similar to any of the access nodes 17 of FIGS. 1-8. Thus, access node 130 may be communicatively coupled to a data center fabric (e.g., switch fabric 14), one or more server devices (e.g., server nodes 12 or servers 52), storage media (e.g., solid state storage 41 of FIG. 3), one or more network devices, random access memory, or the like, e.g., via PCIe, Ethernet (wired or wireless), or other such communication media in order to interconnect each of these various elements.

In the illustrated example of FIG. 9, access node 130 includes a plurality of cores 140 coupled to an on-chip memory unit 134. In some examples, memory unit 134 may include a cache memory. In other examples, memory unit 134 may include two types of memory or memory devices, namely coherent cache memory and non-coherent buffer memory. More details on the bifurcated memory system are available in U.S. patent application Ser. No. 15/949,892, filed Apr. 10, 2018, and titled "Relay Consistent Memory Management in a Multiple Processor System," the entire content of which is incorporated herein by reference.

In some examples, the plurality of cores 140 may include at least two processing cores. In one specific example, the plurality of cores 140 may include six processing cores 140. Access node 130 also includes a networking unit 142, one or more host units 146, a memory controller 144, and one or more accelerators 148. As illustrated in FIG. 9, each of cores 140, networking unit 142, memory controller 144, host units 146, accelerators 148, and memory unit 134 are communicatively coupled to each other. In addition, access node 130 is coupled to an off-chip external memory 150. External memory 150 may comprise random access memory (RAM) or dynamic random access memory (DRAM).

In this example, access node 130 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing access node 130 may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or host units 146, in a sequential manner using one or more "work units." In general, work units are sets of data exchanged between cores 140 and networking unit 142 and/or host units 146 where each work unit may represent one or more of the events related to a given data packet of a stream. As one example, a work unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores 40 of access node 130 may be configured to execute program instructions using a work unit (WU) stack.

In some examples, in processing the plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Access node 130 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. In this way, access node 130 supports one or more high-speed network interfaces, e.g., Ethernet ports, without the need for a separate network interface card (NIC). Each of host units 146 may support one or more host interfaces, e.g., PCI-e ports, for connectivity to an application processor (e.g., an x86 processor of a server device) or a storage device (e.g., an SSD). Access node 130 may also include one or more high bandwidth interfaces for connectivity to off-chip external memory 150. Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to a coherent cache memory or a non-coherent buffer memory of memory unit 134. In some examples, memory controller 144 may map the accesses based on one or more of an address range, an instruction or an operation code within the instruction, a special access, or a combination thereof.

More details on access nodes, including their operation and example architectures, are available in U.S. patent application Ser. No. 16/031,676, filed Jul. 10, 2018, entitled "Access Node for Data Centers," the entire content of which is incorporated herein by reference.

Figure 10:
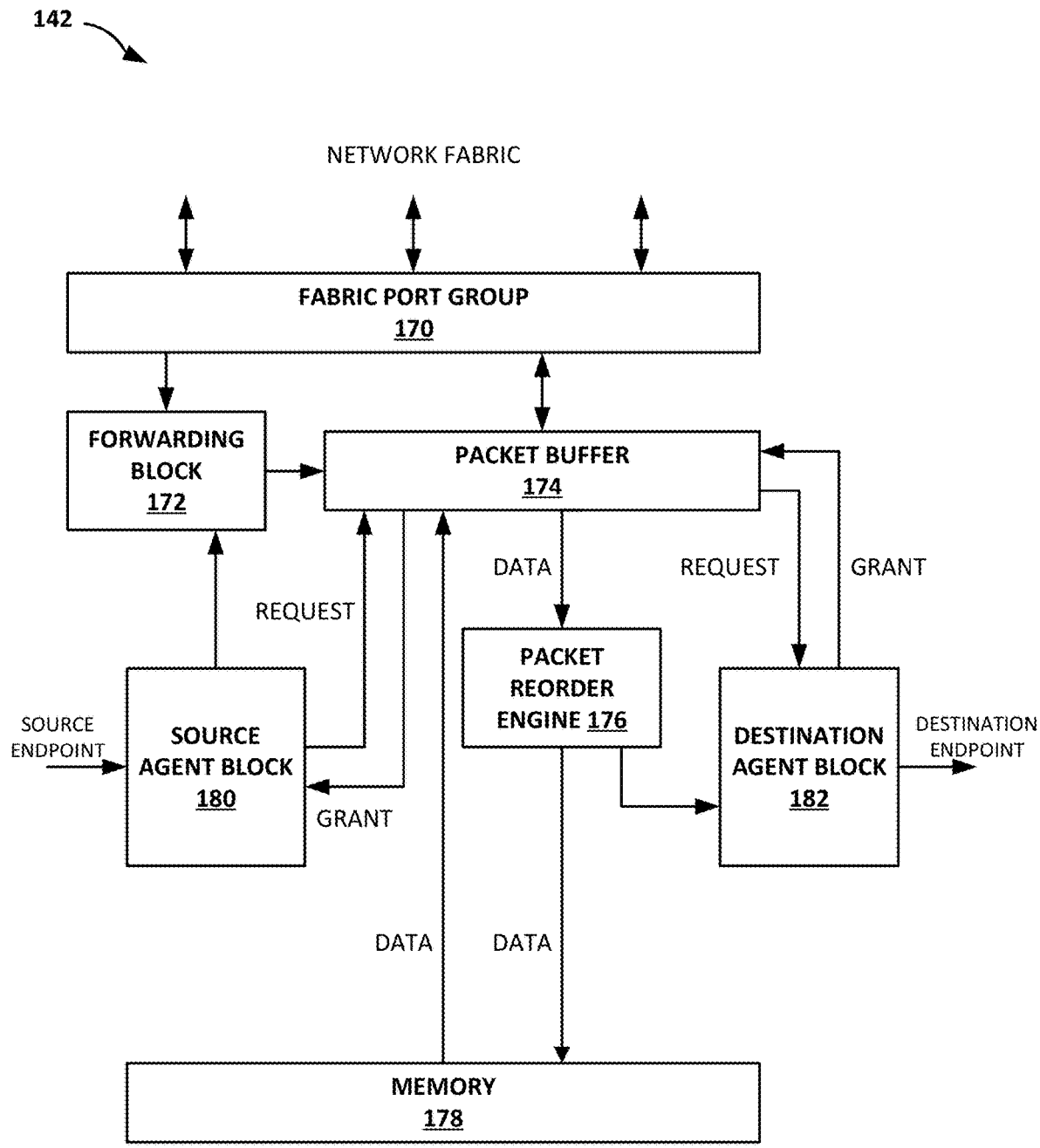
FIG. 10 is a block diagram illustrating an example networking unit of an access node.

FIG. 10 is a block diagram illustrating an example networking unit 142 of access node 130 from FIG. 9, in more detail. Networking unit (NU) 142 exposes Ethernet ports, also referred to herein as fabric ports, to connect access node 130 to the switch fabric. NU 142 connects to processing cores 140 and external servers and/or storage devices, such as SSD devices, via endpoint ports. NU 142 supports switching packets from one fabric port to another fabric port without storing the complete packet (i.e., transit switching), which helps to achieve low latency for transit traffic. In this way, NU 142 enables creation of a fabric of access nodes with or without external switching elements. NU 142 may fulfill the following roles: (1) transmit packets from PCIe devices (servers and/or SSDs) to the switch fabric, and receive packets from the switch fabric and send them to the PCIe devices; (2) support switching packets from one fabric port to another fabric port; (3) support sending network control packets to an access node controller; and (4) implement FCP tunneling.

As illustrated in FIG. 10, NU 142 includes a fabric port group (FPG) 170. In other examples, NU 142 may include multiple FPGs 170. FPG 170 includes two or more fabric ports connected to the switch network. FPG 170 is configured to receive Ethernet packets from the switch fabric and transmit packets to the switch fabric. FPG 170 may be responsible for generating and receiving link pause and priority flow control (PFC) frames. In the receive direction, FPG 170 may have a flexible parser to parse incoming bytes and generate a parsed result vector (PRV). In the transmit direction, FPG 170 may have a packet rewrite sub-unit to modify the outgoing packets based on the rewrite instructions stored with the packet.

NU 142 has a single forwarding block 172 to forward the packets coming from the fabric ports of FPG 170 and from the endpoint ports of source agent block 180. Forwarding block 172 has a fixed pipeline that is configured to process one PRV, received from FPG 170 and/or source agent block 180, every cycle. The forwarding pipeline of forwarding block 172 may include the following processing sections: attributes, ingress filter, packet lookup, nexthop resolution, egress filter, packet replication, and statistics.

In the attributes processing section, different forwarding attributes, such as virtual layer 2 interface, virtual routing interface, and traffic class, are determined. These forwarding attributes are passed to further processing sections in the pipeline. In the ingress filter processing section, a search key can be prepared from different fields of a PRV and searched against programmed rules. The ingress filter block can be used to modify the normal forwarding behavior using the set of rules. In the packet lookup processing section, certain fields of the PRV are looked up in tables to determine the nexthop index. The packet lookup block supports exact match and longest prefix match lookups.

In the nexthop resolution processing section, nexthop instructions are resolved and the destination egress port and the egress queue are determined. The nexthop resolution block supports different nexthops such as final nexthop, indirect nexthop, equal cost multi-path (ECMP) nexthop, and weighted cost multi-path (WCMP) nexthop. The final nexthop stores the information of the egress stream and how egress packets should be rewritten. The indirect nexthop may be used by software to embed an address of the nexthop in memory, which can be used to perform an atomic nexthop update.

The WECMP nexthop may have multiple members and be used to spray packets over all links between SF components and SX components of access nodes (see, e.g., SF components 30 and SX components 32 of FIG. 8). Due to failure of links between rack and spine switches, SFs may need to spray among SXs based on the active links for a destination rack IP address. For FCP traffic, the FCP spray engine sprays packets based on the load on each link proportional to its weight. The WECMP nexthop stores an address of the credits memory, and the FCP spray engine selects the link with the most credits and deducts its credits based on packet length. The ECMP nexthop may have multiple members and be used to spray packets over all links connected to spine switches of access nodes (see, e.g., core switches 22 of FIG. 8). For FCP traffic, the FCP spray engine again sprays packets based on the load on each link proportional to its weight. The ECMP nexthop stores an address of the credits memory, and the FCP spray engine selects the link with the most credits and deducts its credits based on packet length.

In the egress filter processing section, packets are filtered based on the egress port and the egress queue. The egress filter block cannot change the egress destination or egress queue, but can sample or mirror packets using the rule sets. If any of the processing stages has determined to create a copy of a packet, the packet replication block generates its associated data. NU 142 can create only one extra copy of the incoming packet. The statistics processing section has a set of counters to collect statistics for network management purpose. The statistics block also supports metering to control packet rate to some of the ports or queues.

NU 142 also includes a packet buffer 174 to store packets for port bandwidth oversubscription. Packet buffer 174 may be used to store three kinds of packets: (1) transmit packets received from processing cores 140 on the endpoint ports of source agent block 180 to be transmitted to the fabric ports of FPG 170; (2) receive packets received from the fabric ports of FPG 170 to be transmitted to the processing cores 140 via the endpoint ports of destination agent block 182; and (3) transit packets coming on the fabric ports of FPG 170 and leaving on the fabric ports of FPG 170.

Packet buffer 174 keeps track of memory usage for traffic in different directions and priority. Based on a programmed profile, packet buffer 174 may decide to drop a packet if an egress port or queue is very congested, assert flow control to a work unit scheduler, or send pause frames to the other end. The key features supported by packet buffer 174 may include: cut-through for transit packets, weighted random early detection (WRED) drops for non-explicit congestion notification (ECN)-aware packets, ECN marking for ECN aware packets, input and output based buffer resource management, and PFC support.

Packet buffer 174 may have the following sub-units: packet writer, packet memory, cell link list manager, packet queue manager, packet scheduler, packet reader, resource manager, and cell free pool. The packet writer sub-unit collects flow control units (flits) coming from FPG 170, creates cells and writes to the packet memory. The packet writer sub-unit gets a Forwarding Result Vector (FRV) from forwarding block 172. The packet memory sub-unit is a collection of memory banks. In one example, the packet memory is made of 16K cells with each cell having a size of 256 bytes made of four microcells each having a size of 64 bytes. Banks inside the packet memory may be of 2 pp (1 write port and 1 read port) type. The packet memory may have raw bandwidth of 1 Tbps write and 1 Tbps read bandwidth. FPG 170 has guaranteed slots to write and to read packets from the packet memory. The endpoint ports of source agent block 180 and destination agent block 182 may use the remaining bandwidth.

The cell link list manager sub-unit maintains a list of cells to represent packets. The cell link list manager may be built of 1 write and 1 read port memory. The packet queue manager sub-unit maintains a queue of packet descriptors for egress nodes. The packet scheduler sub-unit schedules a packet based on different priorities among the queues. For example, the packet scheduler may be a three-level scheduler: Port, Channel, Queues. In one example, each FPG port of FPG 170 has sixteen queues, and each endpoint port of source agent block 180 and destination agent block 182 has eight queues.

For scheduled packets, the packet reader sub-unit reads cells from packet memory and sends them to FPG 170. In some examples, the first 64 bytes of the packet may carry rewrite information. The resource manager sub-unit keeps track of usage of packet memory for different pools and queues. The packet writer block consults the resource manager block to determine if a packet should be dropped. The resource manager block may be responsible to assert flow control to a work unit scheduler or send PFC frames to the ports. The cell free pool sub-unit manages a free pool of packet buffer cell pointers. The cell free pool allocates cell pointers when the packet writer block wants to write a new cell to the packet buffer memory, and deallocates cell pointers when the packet reader block dequeues a cell from the packet buffer memory.

NU 142 includes source agent control block 180 and destination agent control block 182 that, collectively, are responsible for FCP control packets. In other examples, source agent control block 180 and destination control block 182 may comprise a single control block. Source agent control block 180 generates FCP request messages for every tunnel. In response to FCP grant messages received in response to the FCP request messages, source agent block 180 instructs packet buffer 174 to send FCP data packets based on the amount of bandwidth allocated by the FCP grant messages. In some examples, NU 142 includes an endpoint transmit pipe (not shown) that sends packets to packet buffer 174. The endpoint transmit pipe may perform the following functions: packet spraying, packet fetching from memory 178, packet segmentation based on programmed MTU size, packet encapsulation, packet encryption, and packet parsing to create a PRV. In some examples, the endpoint transmit pipe may be included in source agent block 180 or packet buffer 174.

Destination agent control block 182 generates FCP grant messages for every tunnel. In response to received FCP request messages, destination agent block 182 updates a state of the tunnel and sends FCP grant messages allocating bandwidth on the tunnel, as appropriate. In response to FCP data packets received in response to the FCP grant messages, packet buffer 174 sends the received data packets to packet reorder engine 176 for reordering and reassembly before storage in memory 178. Memory 178 may comprise an on-chip memory or an external, off-chip memory. Memory 178 may comprise RAM or DRAM. In some examples, NU 142 includes an endpoint receive pipe (not shown) that receives packets from packet buffer 174. The endpoint receive pipe may perform the following functions: packet decryption, packet parsing to create a PRV, flow key generation based on the PRV, determination of one of processing cores 140 for the incoming packet and allocation of a buffer handle in buffer memory, send the incoming FCP request and grant packets to destination agent block 182, and write the incoming data packets to buffer memory with the allocated buffer handle.

Figure 11:
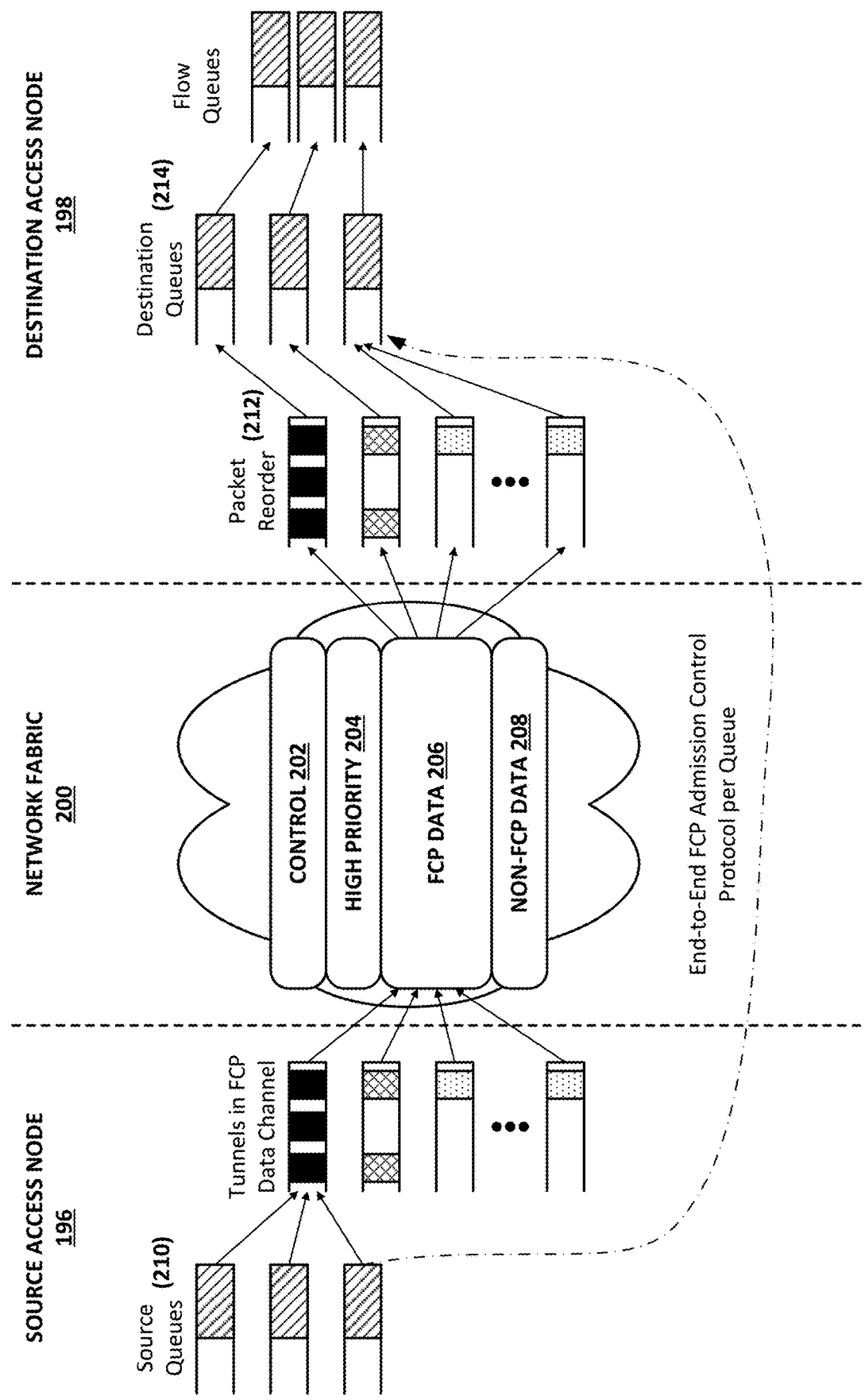
FIG. 11 is a conceptual diagram illustrating an example network fabric between a source access node and a destination access node.

FIG. 11 is a conceptual diagram illustrating an example FCP-based flow control and network communication within a network fabric 200, such as a date center switch fabric or other packet-based network. As illustrated, when using FCP, network fabric 200 is visualized as a fabric with multiple channels between a source access node 196 and a destination access node 198. The FCP data channel 206 carries traffic for multiple tunnels and for multiple queues within each tunnel. Each channel is designated for specific type of traffic. The various channels and their attributes are described below.

The control channel 202 has a strict priority over all other channels. The expected use for this channel is to carry grant messages. The grant messages are sprayed over all available paths towards the requesting or source node, e.g., source access node 196. They are not expected to arrive at the requesting node in order. The control channel 202 is rate limited to minimize overhead on network fabric 200. The high priority channel 204 has a higher priority over data and non-FCP channels. The high priority channel 204 is used to carry FCP request messages. The messages are sprayed over all available paths towards the granting or destination node, e.g., destination access node 198, and are not expected to arrive at the granting node in order. The high priority channel 204 is rate limited to minimize overhead on the fabric.

The FCP data channel 206 carries data packets using FCP. The data channel 206 has a higher priority over a non-FCP data channel. The FCP packets are sprayed over network fabric 200 through a suitable load balancing scheme. The FCP packets are not expected to be delivered at destination access node 198 in order and destination access node 198 is expected to have a packet reorder implementation. The non-FCP data channel 208 carries data packets that do not use FCP. The non-FCP data channel 208 has the lowest priority over all other channels. The FCP data channel 206 carries a strict priority over the non-FCP data channel 208. The non-FCP packets, therefore, use opportunistic bandwidth in the network and, depending upon the requirements, the FCP data rate can be controlled through request/grant pacing schemes allowing non-FCP traffic to gain a required share of the bandwidth. The non-FCP data packets are forwarded/routed using ECMP based load balancing and for a given flow (identified by a five tuple) the packets are expected to be always delivered in order at destination access node 198. The non-FCP data channel 208 may have multiple queues with any prioritization/QoS applied at the time of scheduling the packets to the fabric. The non-FCP data channel 208 may support 8-queues per link-port based on priority of the packet flow.

The FCP data packets are sent between source access node 196 and destination access node 198 via a logical tunnel. The tunnel is considered unidirectional and, for a destination, the incoming tunnel identifier (ID) is unique for all packets from a specific source node. The tunnel encapsulation carries the packet forwarding as well as the reordering information. A single tunnel carries packets for one or multiple source queues (210) between source access node 196 and destination access node 198. Only the packets within a tunnel are reordered based on sequence number tags that span across queues of the same tunnel. The packets are tagged with a tunnel packet sequence number (PSN) when they are sent from the source access node 196. The destination access node 198 reorders the packets based on the tunnel ID and PSN (212). The tunnel encapsulation is stripped at the end of reorder and packets are forwarded to respective destination queues (214).

The queues are defined as buckets of independent traffic streams that use FCP to transport payload across network fabric 200. An FCP queue is identified by the [Tunnel-ID, Priority] whereas the Tunnel ID is identified by the source/destination access node pair. Alternatively, the access nodes 196, 198 may use a mapping table to derive Tunnel ID, and queue/priority pair based on internal FCP queue ID. A fabric tunnel may support 1, 2, 4, or 8 queues per tunnel. The number of queues per tunnel is a network fabric property and should be configured at the time of deployment. An access node may support a maximum of 16K queues. All tunnels within the network fabric 200 may support the same number of queues per tunnel.

As indicated above, the FCP messages include request, grant, and data messages. The request message is generated when source access node 196 wishes to transfer a certain amount of data to destination access node 198. The request message carries a destination tunnel ID, queue ID, request block number (RBN) of the queue, and metadata. The request message is sent over high priority channel 204 on the network fabric 200 and the message is sprayed over all available paths. The metadata may be used to indicate a request retry among other things. The grant message is generated when destination access node 198 responds to a request from source access node 196 to transfer a certain amount of data. The grant message carries the source tunnel ID, queue ID, grant block number (GBN) of the queue, metadata (scale factor, etc.), and timestamp. The grant message is sent over control channel 202 on network fabric 200 and the message is sprayed over all available paths. The control packet structure of request and grant messages is described below with respect to FIG. 18. FCP data packets carry an FCP header containing the destination tunnel ID, queue ID, packet sequence number (PSN) and data block number (DBN), and metadata. The FCP data packets may have an average size of ~800 B. The maximum transmission unit (MTU) for FCP may be ~1.6 KB-2 KB to minimize packet latency jitter in the fabric. The FCP data packet structure is described below with respect to FIG. 19.

Figure 12:
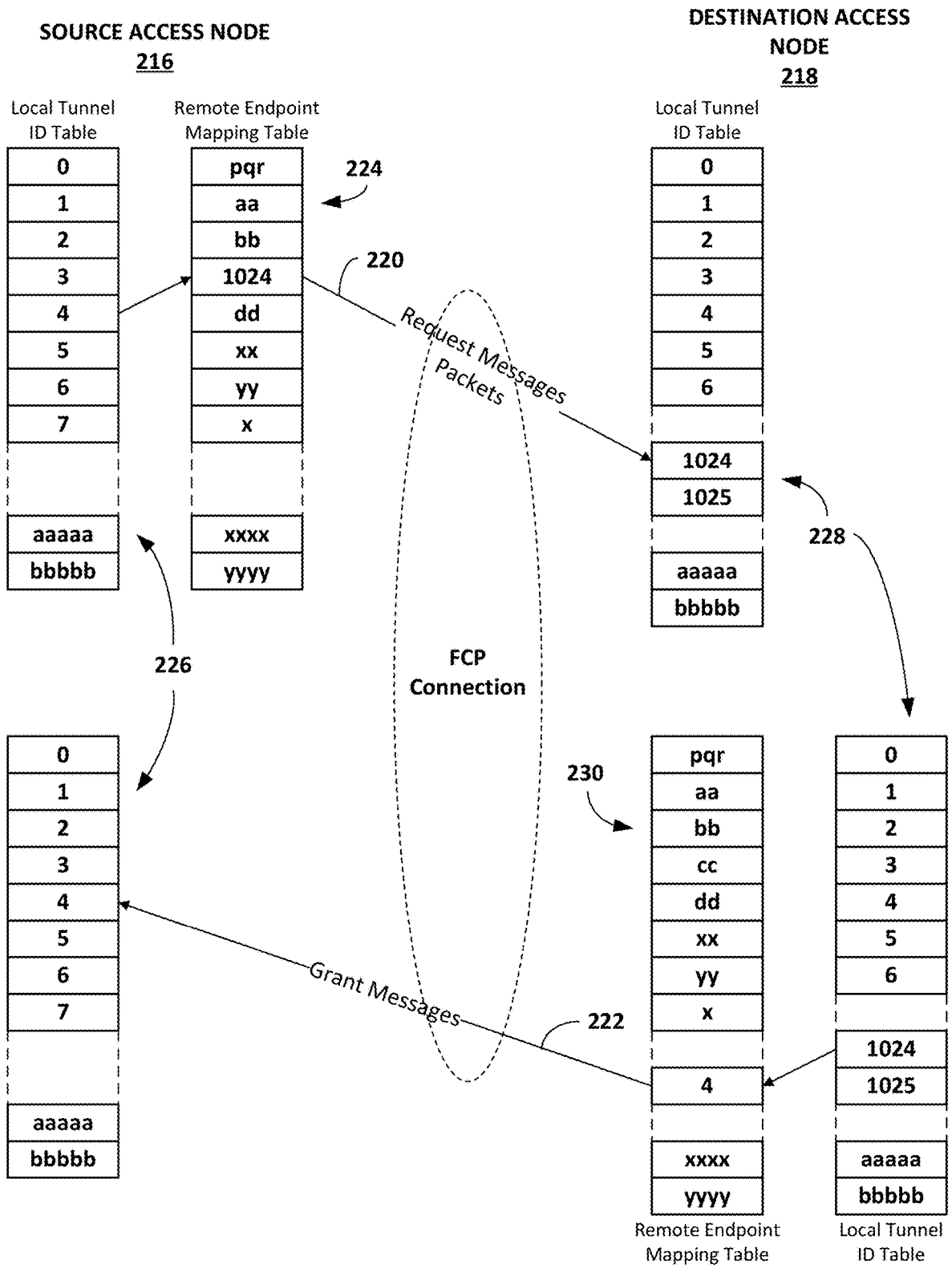
FIG. 12 is a conceptual diagram illustrating an example fabric control protocol queue pair structure between source and destination access nodes.

FIG. 12 is a conceptual diagram illustrating an example FCP queue pair structure between source and destination access nodes. FCP is an end-to-end admission control protocol. The sender explicitly requests the receiver with intention to transfer a certain number of payload data. The receiver issues a grant based on its buffer resources, QoS, and a measure of fabric congestion. A fabric endpoint (FEP) node is a node that connects to the fabric made of switching elements (leaf-spine topology). The fabric allows one endpoint to communicate with the other one through multiple paths. Switching elements inside the fabric have shallow packet buffers. The cross-section bandwidth of the fabric is equal or more to the sum of all fabric endpoints' bandwidth. If each fabric endpoint limits the incoming data rate to the fabric, none of the paths inside fabric should be congested for long term with high probability.

As illustrated in FIG. 12, FCP sets up a pair of tunnels 220, 222 between two FCP endpoints (i.e., source access node 216 and destination access node 218) as each tunnel 220, 222 is considered to be uni-directional. Each node 216, 218 has been assigned a source tunnel ID and a corresponding destination tunnel ID. The queue ID is derived based on assigned Tunnel-ID, priority at each of the endpoints. When one endpoint is communicating with the other endpoint, it encapsulates the packets using a UDP+FCP encapsulation. Each node 216, 218 communicates from a local queue to a remote queue through the set of tunnels 220, 222. The FCP header carries fields identifying tunnel IDs, queue-ID, packet sequence numbers for packets, and request, grant, and data block sequence numbers between source access node 216 and destination access node 218.

Before any traffic may be sent using FCP, a connection must be established between the two endpoints 216, 218. A control plane protocol negotiates the capabilities of both the endpoints (e.g., block size, MTU size, etc.) and establishes an FCP connection between them by setting up tunnels 220, 222 and initializing queue state context. Each endpoint 216, 218 allocates a local tunnel handle from a pool of handles and communicates the handle to its FCP connection partner (e.g., in FIG. 12, destination access node 218 is the FCP connection partner of the source access node 216). The local tunnel handle may be stored in a local tunnel ID table (e.g., local tunnel ID table 226 of source access node 216 and local tunnel ID table 228 of destination access node 218). The FCP partner tunnel handle is stored in a lookup table (e.g., mapping table 224 of source access node 216, and mapping table 230 of destination access node 218) and referenced from the local tunnel handle.

For the sender, the source queue is identified by [local Tunnel-ID, Priority], and the destination tunnel ID is identified by the MAP[local Tunnel ID]. For the receiver, the queue is identified by [local Tunnel ID, priority]. As illustrated in FIG. 12, source access node 216 has a source or local tunnel ID of "4" in local tunnel ID table 226, which maps to a remote or destination tunnel ID of "1024" in mapping table 224. Conversely, destination access node 218 has a source or local tunnel ID of "1024" in local tunnel ID table 228, which maps to a remote or destination tunnel ID of "4" in mapping table 230.

Figure 13:
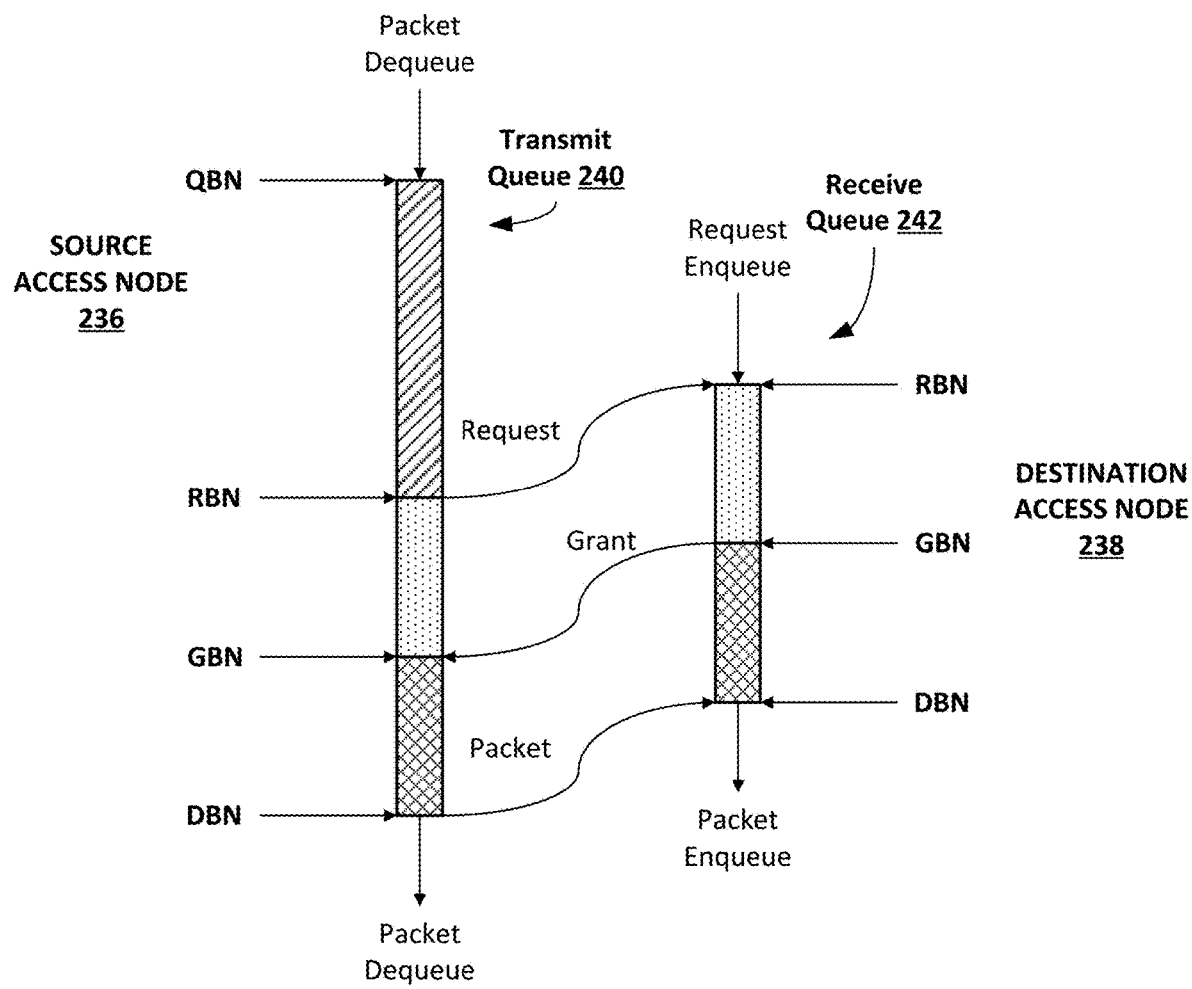
FIG. 13 is a conceptual diagram illustrating an example of fabric control protocol queue states at source and destination access nodes.

FIG. 13 is a conceptual diagram illustrating an example of FCP queue states at source and destination access nodes. Each FCP queue at an access node endpoint maintains a set of block sequence numbers for respective sender/receiver queues to track the queue state. The sequence numbers indicate the amount of data that has flown through the queue at any given time. The sequence numbers may be in units of bytes (similar to TCP), or in units of blocks (to reduce FCP header overheads). The block size may be 64, 128, or 256 Bytes, and may be negotiated at the time of FCP connection setup. As one example, the FCP header may carry a 16-bit block sequence number and span over 8 MBytes of data (128 B) before wrapping around. In this example, the assumption is that the round trip time (RTT) or network delay is too low for the sequence number to wrap around in one RTT.

Each access node endpoint maintains the following set of block sequence numbers to track enqueued blocks, pending requests, or pending/ungranted blocks. A queue tail block number (QBN) represents the tail block in the transmit queue 240 at the source access node 236. Fabric transmit/output queue 240 keeps track of incoming packets (WUs) available for transmission to the destination access node 238 in units of blocks. Once a WU is added to the queue 240, the QBN is incremented as follows: QBN+=WU_size/block_size. The transmit queue 240 only keeps track of WU boundaries at the time of dequeue, which guarantees never to transmit partial WUs on the fabric. A WU however may be split into multiple MTU size packets at the time of transmission.

At the source access node 236, request block number (RBN) indicates the last block for which a request has been sent over the fabric by the source access node 236. The difference between QBN and RBN at the source access node 236 represents the number of unrequested blocks in the transmit queue 240. If QBN is larger than RBN, the source access node 236 can send a request message for the unrequested blocks through a local request scheduler. The local request scheduler may rate limit the outgoing request messages. It may also throttle down overall requested bandwidth throughput via a request rate limiter as a function of long term "near" fabric congestion. The near fabric congestion is termed as a local phenomenon at the sender access node 236 due to spine link loss. RBN is incremented based on the maximum allowed/configured request size. The outgoing request message carries the updated RBN value. At the destination access node 238, RBN indicates the last block for which a request is received from the fabric by the destination access node 238.

When a request message arrives out of order at destination access node 238, destination access node 238 updates its RBN with the message RBN if the request message RBN is newer compared to previously accepted RBN. Out of order request messages are discarded if they carry RBN older than the accepted RBN. When a request message is lost, the subsequent request message carrying a newer RBN successfully updates the RBN at destination access node 238, thus recovering from the lost request message.

If the source access node 236 sends its last request message and the request message gets lost, destination access node 238 is not aware of the request message loss since it was the last request from the source access node 236. The source access node 236 may maintain a request retry timer and if, at the end of timeout, source access node 236 has not received a grant message, source access node 236 may retransmit the request again in an attempt to recover from presumed loss.

At the destination access node 238, grant block number (GBN) indicates the last granted block in the receive queue 242. The distance between RBN and GBN represents the number of ungranted blocks at the receive queue 242. An egress grant scheduler may move GBN forward after grant is issued for the receive queue 242. The GBN is updated by the minimum of an allowed grant size or the difference between RBN and GBN. At the source access node 236, GBN indicates the last block number that is granted by the destination access node 238. GBN, like RBN, may not conform to a WU boundary in the output queue 240. The distance between RBN and GBN represents the number of ungranted blocks at the transmit queue 240. The transmitter is allowed to go over the GBN to complete the current WU processing.

When grant messages arrive out of order at source access node 236, source access node 236 updates its GBN with the newest GBN compared to previously accepted GBN. Out of order grant messages are discarded if they carry GBN older than the accepted GBN. When a grant message is lost, the subsequent grant message successfully updates the GBN at source access node 236, thus recovering from the lost grant message.

When the destination access node 238 sends a last grant message and the grant message is lost or when source access node 236 receives the grant and sends the packet that is dropped in the fabric, destination access node 238 is not aware of the grant message loss or the packet loss since it only knows that it sent the grant and failed to get a packet back. If there are more packets in the tunnel, the tunnel will recover from the loss due to reorder timeout. The destination access node 238 may maintain a timeout and if, at the end of timeout, destination access node 238 has not received a packet, destination access node 238 retransmits the grant again in an attempt to recover from the grant/packet loss. In response to the timeout grant, if source access node 236 has already sent the packet, source access node 236 may send a packet with zero payload, only carrying the DBN. The zero length packet travels through regular data channel and updates the receiver state for the packet loss. In response to the timeout grant, if source access node 236 did not receive the earlier grant, source access node 236 responds to the timeout grant with a regular packet transmission.

At the source access node 236, data block number (DBN) indicates the last block that was transmitted from the transmit queue 240. The distance between the GBN and DBN represents the number of granted blocks to be transmitted. The transmitter is allowed to transmit blocks till the end of a current WU segment. At the destination access node 238, DBN indicates the last block that has been received after the reorder processing is complete. The DBN is updated when the packet received from the fabric. The distance between GBN and DBN represents pending number of granted blocks not yet received or awaiting reorder at receive queue 242.

When a data packet arrives out of order at destination access node 238, it goes through a packet reorder engine. At the end of reorder process, the packets are sent to one of the processing cores (e.g., cores 140 from FIG. 9). If a packet is lost in the fabric, the reorder engine times out and moves on to the next packet provided there are more packets in the tunnel after the lost packet. If the packet is the last packet in the sender queue at source access node 236, the loss may be detected after a timeout grant described above. The source access node 236 may send a zero length packet in response to the timeout grant and destination access node 238 updates its state when the zero length packet is received. The lost packet is recovered through upper layer protocols.

Figure 14:
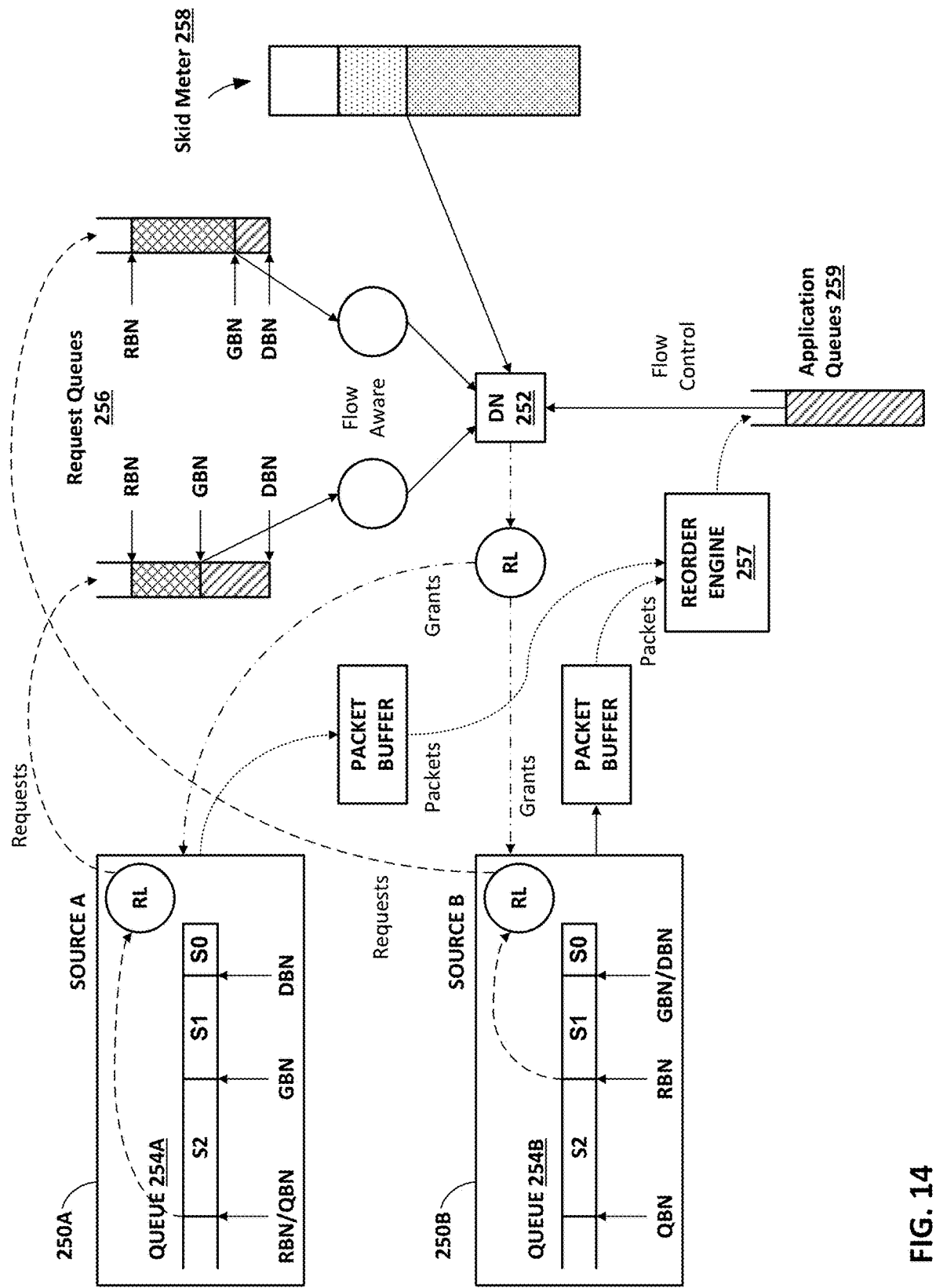
FIG. 14 is a conceptual diagram illustrating an example fabric control protocol operation to transfer an input packet stream from a source access node to a destination access node.

FIG. 14 is a conceptual diagram illustrating an example FCP operation to transfer an input packet stream from a source access node to a destination access node. The main goal of the FCP protocol is to transfer an input packet stream from one endpoint to another endpoint in an efficient manner with predictable latency maximizing fabric utilization. The source endpoint sprays packets among available paths. The destination endpoint reorders the packets of a queue-pair based on packet sequence numbers. Conceptually, FIG. 14 describes the handshake between source/destination queues.

The example of FIG. 14 includes two source access nodes 250A and 250B (collectively "source nodes 250"), each has a queue 254A, 254B of packets to be transmitted to the same destination access node ("DN") 252. Destination access node 252 maintains request queues 256. Source access nodes 250 request bandwidth for the packets within queues 254A, 254B by sending the request messages (shown as dashed lines) to respective request queues 256 at destination access node 252. The requests are paced using rate limiters (RLs) of source access nodes 250.

Destination access node 252 distributes bandwidth in response to the request messages by sending the grant messages (shown as dot-and-dashed lines) to the source nodes 250. Distribution of egress bandwidth is traffic flow weight aware (more details discussed later in the receiver node operation with respect to FIGS. 17A-17B). Destination access node 252 keeps track of buffer occupancy, pending grants based on skid meter 258, and tracks long term fabric congestion to pace out grant messages. The grants are paced by a rate limiter (RL) of destination access node 252 at slightly lower than maximum rate to make sure that the fabric buffering is minimal or the fabric latency jitter is low. The level of skid meter 258 can be used to control the number of pending bytes on the fabric. The skid meter 258 is incremented on the grant transmit time and decremented on the packet arrival time. The destination access node 252 recovers from a request loss or an out of order request arrival based on the request number in the message. The lost request messages are recovered by a next incoming request message.

In response to the grant messages, source nodes 250 transmit packets (illustrated as dotted lines) from queues 254A, 254B to destination access node 252. At a packet reorder engine 257 of destination access node 252, the packets are reordered on a per tunnel context before they are pushed to application queues 259. The example of FIG. 14 shows that the destination access node 252 is performing packet reordering and enqueuing a packet after the reorder is complete. Due to packet loss, the reorder engine times out and enqueues the next packet in order for processing.

To reduce the amount of reorder resources required to support the protocol, the request/grant messages are not reordered when received by the endpoint node. Instead, the sliding window queue block sequence numbers are cumulative. Due to the sliding window nature of request/grant handshake, each new message provides updated information about the window. The receiver, hence, only needs to pay attention to the message that updates the window going forward. The block sequence numbers are used such that the endpoint node only needs to remember the highest sequence number received for each type of message that updates the forward window movement.

Figure 15:
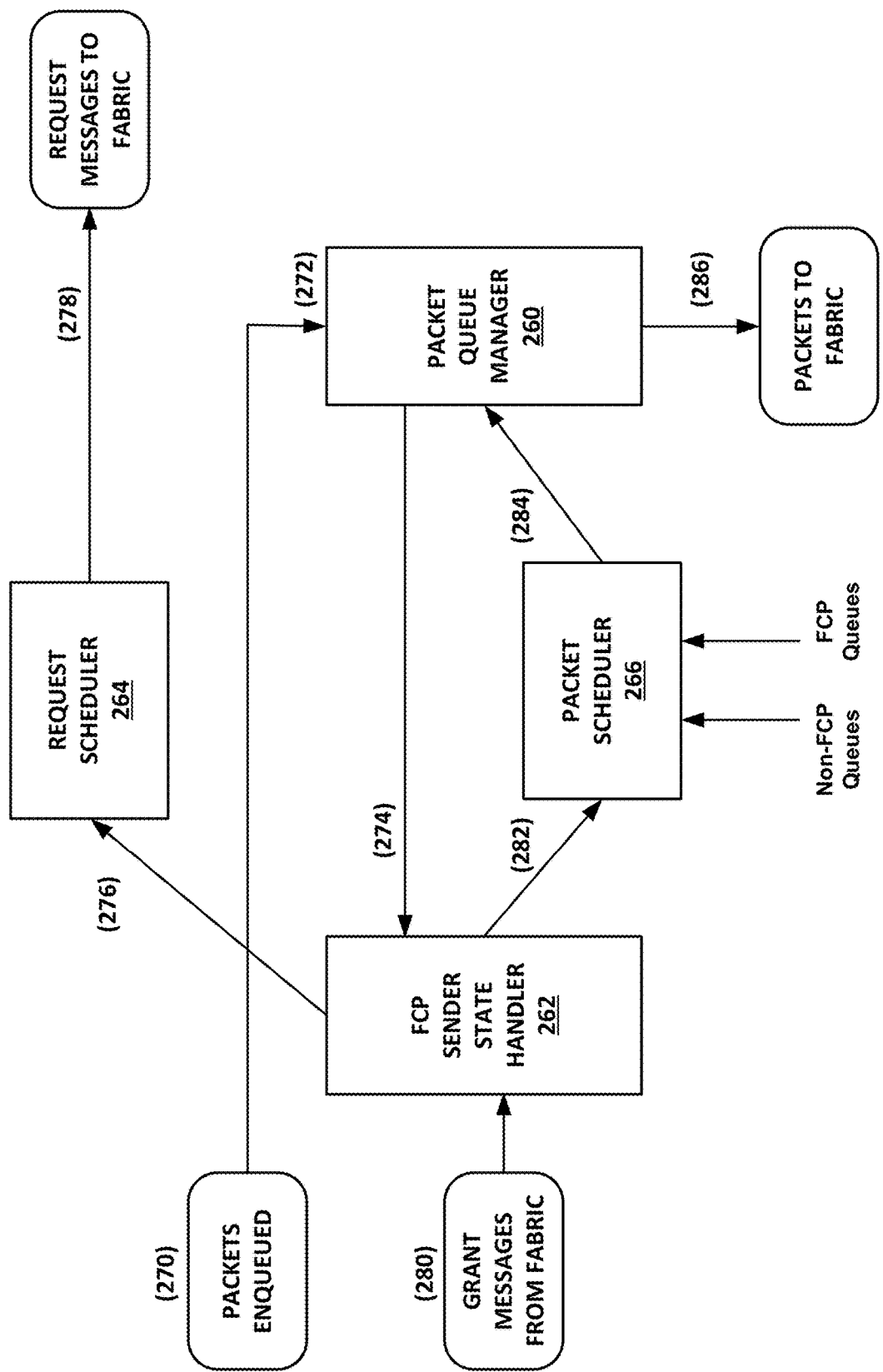
FIG. 15 is a conceptual diagram illustrating an example fabric control protocol source access node operation flow.

FIG. 15 is a conceptual diagram illustrating an example FCP source access node operation flow. Packets/payload to be transported across a network fabric are first enqueued in packet queues awaiting grant for transmitting the packets/payload to a destination access node (270), (272). Packet queue manager 260 maintains the queues for both FCP and non-FCP traffic flows (272). The packets for FCP and non-FCP should be pushed into separate queues.

The packet queue manager 260 sends information about enqueued packet/payload size to update FCP source queue state at FCP sender state handler 262 (274). FCP sender state handler 262 maintains per queue FCP state used to generate a request message to send to the destination access node (276), (278). For non-FCP queues, FCP sender state handler 262 may operate in infinite grant mode where the grant is internally generated as if grant was received from the fabric. The non-FCP queues get leftover bandwidth after FCP bandwidth demands are met. The FCP demands include request messages, grant messages, and FCP data packets.

Based on FCP source queue state of a non-empty FCP queue (QBN>RBN), FCP sender state handler 262 participates in a request generation by generating a request to a request scheduler 264 (276). The request scheduler 264 may include up to eight priority-based request queues to schedule request messages for transmission over the network fabric to the destination access node (278). The request messages are rate limited (mmps) and paced (bandwidth rate controlled) based on requested payload size to manage fabric congestion.

For non-FCP queues as well as unsolicited decision queues (i.e., queues where QBN−GBN<Unsolicited_Threshold), the FCP sender state handler 262 generates internal grants. The non-FCP internal grants, unsolicited internal grants, and fabric grants are enqueued in separate queues of packet scheduler 266 (282). FCP sender state handler 262 parses the incoming fabric grants (280) against the FCP source queue state as the arrivals could be out of order. The accepted FCP grants are queued in separate queues of packet scheduler 266 (282).

The packet scheduler 266 maintains two sets of queues, one for non-FCP and one for FCP (grant message based). The packet scheduler 266 can be viewed as a hierarchical scheduler with strict priority for FCP packets that allows the non-FCP packets to use leftover bandwidth. Alternatively, the packets can be scheduled between FCP/non-FCP flows based on weighted round-robin (WRR). A global rate limiter on an aggregate basis should be used to limit overall bandwidth going out of the source node. The FCP packet queues may be served on an SRR (strict round-robin) basis and a winning packet is sent to packet queue manager 260 (284) to dequeue and send the packet descriptor for transmission processing and queuing (286). The non-FCP packet queues may be served based on WRR scheduling.

Packet queue manager 260, upon dequeuing the packet/payload (286), sends a size update to the FCP source queue state at FCP sender state handler 262 (274) and the request pacer. The packet, in case of payload dequeue, could result in one or more packets due to MTU segmentation of the payload in response to grant messages. Each new packet on a tunnel is tagged with a running per tunnel packet sequence number. The packet buffer stores all the outgoing FCP packets along with the packet handles containing Tunnel-ID and Packet Sequence Number.

The FCP Source node operation can be split into following main sections: transmit buffer management, request generation, and packet scheduler.

Transmit buffer management at the source access node is described. The FCP queues store packet descriptors to be transmitted. The packet descriptor has size and address of the payload stored in the transmit buffer. The term payload is used to indicate packets or large segments to be transported. The transmit buffer may be kept in external memory (e.g., external memory 150 from FIG. 9), but it is also possible to use on-chip memory (buffer memory) as the transmit buffer (e.g., on-chip memory unit 134 from FIG. 9). At the source access node, processors (e.g., within networking unit 142 of FIG. 9) are associated with flows, and are responsible to fetch payload from the host memory to the transmit buffer. A flow-processor may be associated with a connection in the server and have credit based flow-control. Flow-processors may prefetch allocated numbers of descriptors from the descriptor queues to avoid head-of-line blocking.

For each FCP queue, four block numbers are maintained as FCP queue state, as described above with respect to FIG. 13. The window from RBN to GBN indicates the "request window" requested over the fabric. The window from QBN to DBN indicates the "transmit window" and represents blocks stored in the transmit buffer. Assuming that most of the times DBN==GBN, the transmit window is equal to QBN−GBN. The window from QBN to RBN should be just large enough to bring the data from host memory and generate a work unit for the FCP queue. The RBN will eventually reach QBN in the process or request generation based on the request window based back pressure sent to the flow-processor of the source access node.

By default, the FCP limits the "request window" size up to a maximum request block size (MRBS) based on the maximum queue drain rate and round-trip time (FCP request to FCP grant) from the destination queue. The value of MRBS is software programmed based on the estimated maximum queue drain rate and RTT, also known as BDP or bandwidth delay product. After an FCP queue has reached its maximum allowed request window, it should assert flow control to flow-processors. The maximum allowed request window is a function of request window scale factor and MRBS. The scale down factor can be directly used to calculate the maximum allowed request window or could be derived based on a table lookup. The maximum allowed request window determines the back pressure to be sent back to the flow-processor based on the unrequested blocks in the queue.

The flow-processors calculate a flow weight based on an amount of data that needs to be transferred using a given FCP queue. The derived flow weight is a dynamic entity for the queue that is updated constantly based on the dynamics of transfer work requirements. The sender communicates the flow weight to the destination node through every outgoing FCP request message.

The destination estimates the source queue drain rate based on the source queue flow weights of all incast flows. In other words, it generates a scale down factor for a given source based on a ratio of the work required for a given source node and the total amount of work that needs to be processed for all the active source nodes seen by the destination. The destination node maintains the sum of all flow weights as and when the requests arrive by maintaining the individual per queue flow weight in its database. The grant scheduler at the destination access node computes a "scale down" value for the source access node and sends the factor with every FCP grant message.

When the queue becomes empty and the granted data is received, the queue is considered idle and the flow weight may be reset through an aging timer causing it not to participate in the total flow weight. The sender may reset the scale down through an aging timer once the queue becomes empty at the source similar to the destination. Software may also program the global transmit buffer size (GTBS). The value of GTBS represents size of the transmit buffer. Software should keep separate transmit buffer for different traffic priority class. The FCP asserts flow control if the total transmit buffer, across all FCP queues reaches the GTBS limit. The buffer may also be carved on a priority/class basis with separate GTBS pools or can be managed as a single entity with separate thresholds per class/priority Request message generation at the source access node is described. The request scheduler in FCP operation may be split in two functions: request scheduling and rate limiting, although this is one example implementation.

In the request scheduling function, each requesting FCP queue arbitrates through the request scheduler to send out requests. The FCP queues are grouped into priority-based groups (e.g., up to 8 priorities) for scheduling purposes. The request scheduler may select one of the priority groups through a hierarchical deficit weighted round-robin (DWRR) scheme. Once a priority group is selected, the FCP queues within the priority group are served in a round-robin (RR) manner.

When the queue schedules an FCP request, the request can carry up to a maximum configured request size worth of requested blocks or till the end of the queue. The FCP queue may only be allowed to participate for the request scheduler if it has more unrequested blocks (QBN>RBN). The assumption is that the flow-processor of the source access node will react to the request window scale down factor from the destination and cease to enqueue WUs in the source queue. The incoming grant carries the scale factor that may increase/reduce the allowed request window.

In the rate limiting function, the request rate is controlled so that the source access node does not make requests for data faster than it can transmit data. The rate, referred to as the request data rate limiter, should be software programmable. As one example, the source access node may be able to source more than 400 G of host bandwidth from its PCIe interfaces, but can only support a 200 G of outgoing network connectivity. If the source access node is allowed to send all of the ~400 G worth of requests to different destination access nodes and if the source access node receives an incast of grants (grant collisions), it will not be able to deliver the promised bandwidth to the destination access nodes. In this example, the source access node will cause a near-end congestion and thereby becoming the master controller of traffic admitted to the fabric. The destination grant scheduler will no longer be able to pull data from the source access node with a predictable latency or RTT.

According to the techniques described in this disclosure, the request data rate limiter paces out requests based on the capability of the transmitted data rate. The rate limiter uses block size carried in the request message to pace the request messages. The block sizes are rounded to the block boundary for every packet and a correction is performed for the request pacer when the actual packets are transmitted to the fabric. Similarly, the request data rate limiter is charged whenever a speculative or non-FCP packet is transmitted so that the source node transmit bandwidth is at no time oversubscribed. Returning to the above example in which the source access node supports 200 G of outgoing network connectivity, the outgoing requests may be paced to about 200 G of throughput (1-$\epsilon$) where $\epsilon$ is a small number between 0-1. By varying $\epsilon$, FCP can limit the rate at which the source access node can generate requests towards the fabric. In some examples, the source access node may also control bandwidth consumed by the request messages themselves. As a result, the source access node may include another rate limiter referred to as request control rate limiter.

Packet scheduler operation at the source access node is described. The source access node schedules FCP/non-FCP packets based on incoming grant messages (FCP) and based on scheduling criteria and buffer occupancy (non-FCP). The traffic streams from FCP/non-FCP queues may be optionally separately rate limited and subjected to DWRR arbitration or the FCP traffic can be configured with strict priority. The overall traffic is subjected to a global rate limiter to limit the outgoing traffic to max bandwidth throughput. The non-FCP scheduler may receive a per non-FCP queue back pressure from the per queue packet port buffer due to destination queue congestion. The non-FCP scheduler schedules packets to queues that are not being back pressured. The FCP packets, when not being rate limited or bandwidth share limited, may only be subjected to a temporary link level datapath back pressure from downstream modules. The overall bandwidth rate limiter controls the amount of bandwidth being injected in the network in case that FCP grants cause a temporary grant congestion at the source access node. As the overall grant and request rates are controlled to operate slightly less than the overall maximum bisection bandwidth, the source queue congestion will be only temporary. The share of FCP traffic and non-FCP traffic may be explicitly carved out. In addition, the network guarantees the delivery of FCP packets (i.e., data/request/grant) at a higher priority over non-FCP traffic. For example, if the non-FCP traffic experiences congestion, the network may drop the non-FCP packets. The FCP packets, however, should not be dropped as the congestion in the FCP traffic may be temporary due to end-to-end admission control.

Non-FCP packets/payload segments are scheduled whenever the non-FCP queues are non-empty. The outgoing non-FCP packets are enqueued with the packet scheduler where they are rate limited if the traffic needs to be shared between FCP/non-FCP queues. The regular FCP packets/payload segments are scheduled whenever a grant is received for the queue. The FCP packet queue has the highest priority and the it is served ahead of non-FCP. The source access node sends traffic until the current packet/segment boundary and updates the DBN based on the transferred packet size. Any additional bytes sent by the source access node due to the packet boundary transfer constraint are compensated at the grant pacer at the destination access node. The outgoing packets may not always end at block boundary. The rounding off error is compensated at the request pacer for every outgoing packet.

In this way, the techniques of this disclosure enable delayed packet segmentation at the source access node until the FCP grant message is received. Once the grant message is received, transport layer FCP packet segmentation may be performed on the data identified in the queue. The generated FCP packets may then include additional data received from the processing cores after the request message was sent but before the grant message was received for the queue.

Allowing a small flow to send packets without an explicit request grant handshake may reduce both the latency and the overhead on the network. The speculative bandwidth should be used very carefully, however, as it can cause a destination access node to be overwhelmed with unsolicited incast traffic. According to the disclosed techniques, every source access node may be allowed to use a certain share of its bandwidth (destination node buffer) for unsolicited traffic and, if the un-granted queue build-up is small and below a certain threshold, the queue may be allowed to send unsolicited packets without waiting for an explicit request/grant message exchange. The unsolicited packets may only be sent by the source access node provided the un-granted queue size is small, and the source access node has available bandwidth share for unsolicited traffic. The FCP packets are served in order of grant arrival, for scheduled packets due to the arrival of FCP grant, or in the order of enqueue, for unsolicited packets. The unsolicited packets potentially have lower latency as they avoid a round trip delay of request and grant message exchange.

Figure 16:
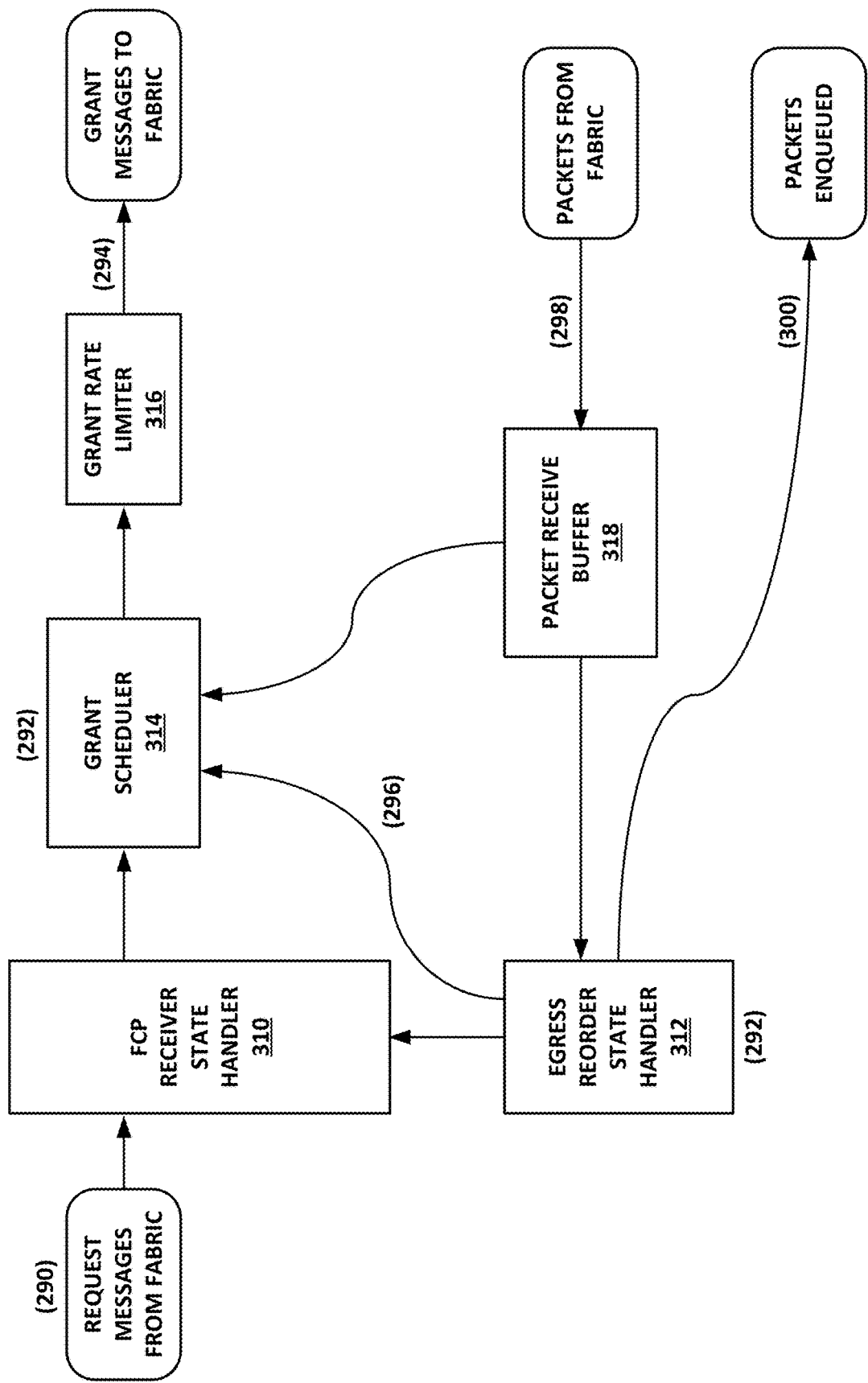
FIG. 16 is a conceptual diagram illustrating an example fabric control protocol destination access node operation flow.

FIG. 16 is a conceptual diagram illustrating an example FCP destination access node operation flow. An FCP receiver state handler 310 maintains a per queue FCP egress context such as RBN, GBN, DBN, etc. An egress reorder state handler 312 maintains a database of packet reorder contexts per tunnel. An FCP grant scheduler 314 may support two or more grant queues for high and low priority. Grants may be rate limited/paced by grant rate limiter 316 based on fabric congestion.

The FCP receiver state handler 310 receives request messages from the network fabric (290) and after the initial parsing (e.g., filtering of duplicates), the accepted request messages update the FCP egress per queue context at FCP receiver state handler 310. Once a request queue at FCP receiver state handler 310 is non-empty, it is scheduled for grant generation by the grant scheduler 314 (292). The winner queue is allowed to send a grant message when grant rate limiter 316 allows the next grant message to be generated (294). The grant scheduler 314 reacts to the reorder buffer state at egress reorder state handler 312 (296) and stops sending all the new grants if the reorder buffer state (out of order bytes, grants in flight, and buffer occupancy) reaches a limit. The grants may also react to fabric congestion and faults, and the grant rate may be modulated in reaction to measure of fabric congestion. The base grant rate is configured by software. The grant size per grant is based on a request queue size and limited up to a maximum allowed grant size.

The network fabric interface receives packets and they are stored in a packet receive buffer 318 awaiting reorder (298). The packets are enqueued to downstream blocks once the they are reordered (300). The egress reorder state handler 312 maintains a per tunnel reorder state context. The reorder engine at egress reorder state handler 312 performs a reorder based on packet arrival on a tunnel and maintains a reorder timer on a per tunnel basis. If a tunnel has out-of-order packets and an expected packet does not arrive in the reorder timer timeout period (~2×RTT), a timeout causes the reorder engine to skip the packet and search for the next packet.

The FCP destination node operation can be split into following main sections: grant generation, fabric load balancing, and receive buffer management.

Grant generation at the destination access node is described. The grant generation operation can be divided into a grant queue scheduler and a grant pacer. The grant scheduler provides flow fair bandwidth distribution for traffic delivered to the destination access node (described in more detail below with respect to FIGS. 17A-17B). The grant scheduler also limits the grants based on buffer usage, number of outstanding granted blocks, and the status of reorder buffer.

The FCP queues are split as tunnels and priorities. The FCP grant scheduler groups the queues based on their priority (e.g., up to 8 priorities) for scheduling purposes. The grant scheduler may select one of the priority groups through strict priority or a hierarchical deficit weighted round-robin (DWRR) scheme. On top of each priority group scheduling, a flow aware algorithm may be used to arbitrate among FCP queues that are part of the priority group. Incoming flow weights from FCP queues may be normalized and used by the DWRR grant scheduler for updating credits to the arbitrating FCP queues.

The grant pacer provides admission control and manages fabric congestion. The grant pacer may be implemented at as a leaky bucket that allows a grant to be sent whenever the bucket level falls below a certain threshold. When a grant is sent, the bucket is loaded with size granted blocks in the grant message. The bucket is leaked down at a certain rate (software programmed) that is a function of the incoming fabric rate and number of active fabric links connected to the rack. The grant pacer is compensated for corrections based on actual arriving packet size, and non-FCP packets so that the fabric remains un-congested in the long term.

The destination access node controls the rate of incoming data packets through pacing FCP grants using a grant data rate limiter and a grant control rate limiter, which are similar to the request data rate limiter and the request control rate limiter described above with respect to the source access node operation. In addition, the grant pacer keeps track of pending blocks over fabric by incrementing a granted block counter at the time of sending FCP grant messages and decrementing the counter with the data block count at the time of receiving FCP data packets. The grant pacer also keeps track of pending packets in the reorder buffer and stops generating new FCP grants if the pending packets in reorder are more than a threshold.

According to the techniques of this disclosure, the destination access node may perform explicit congestion notification (ECN) marking of FCP packets based on a global view of packet flows in the switch fabric. The grant scheduler provides a unique view of total load based on the sum total of all pending requests seen at the grant scheduler. The ECN marking based on a global load seen by the destination endpoint provides a major improvement over ECN marking based on local congestion seen by individual switches/paths through the fabric. With data center TCP implementations relying on extensive use of ECN to manage congestion, the ECN marking based on global view of output egress queue at the grant scheduler is a significant improvement compared to disjoint and localized view of some of the paths through the fabric and provides better congestion management at TCP level.

Fabric load balancing at the destination access node is described. FCP requires that all outgoing fabric links are balanced. One example scheme for implementation is to use a random shuffled DRR. SDRR is a regular deficit round robin scheduler that carries equal weights for all available links. The random shuffling of the RR pointer provides randomness in selection of a link and allows the fabric not to follow a set pattern.

Receive buffer management at the destination access node is described. The grant scheduler generates FCP grant message for a queue if its RBN is ahead of GBN and grant pacer credits are available. The source access node transmits data packets after it receives FCP grant messages for a queue. The destination access node stores incoming data packets in the buffer memory. The destination access node reorders work unit messages based on packet sequence number and sends a work unit to an associated flow-processor in the destination access node. The flow-processor may have descriptors (addresses of the host memory), and may move the data from the receiver buffer in on-chip buffer memory to the host memory in the server. If the flow-processor cannot move the data from buffer memory to host memory, it should move the data to the external memory (e.g., external memory 150 of FIG. 9).

Figure 17A:
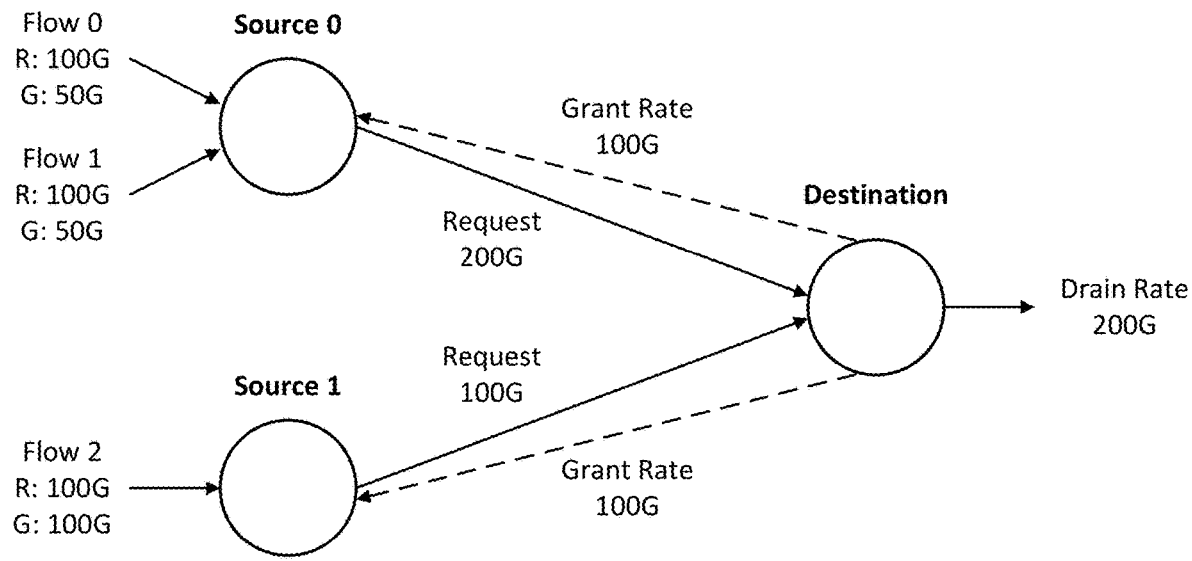
FIGS. 17A and 17B are conceptual diagrams illustrating an example of flow fairness achieved using a fabric control protocol grant scheduler at a destination access node.
Figure 17B:
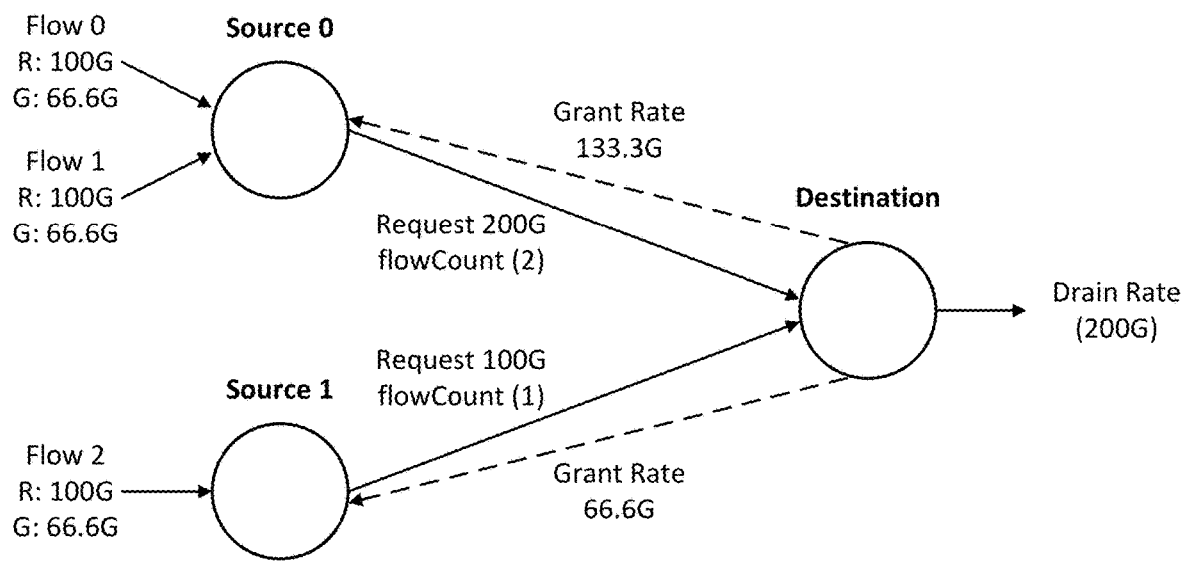

FIGS. 17A and 17B are conceptual diagrams illustrating an example of flow fairness achieved using an FCP grant scheduler at a destination access node. If the grant scheduler generates a grant without knowledge of the number of flows per source access node, it may divide the bandwidth unfairly among the flows. The following example with respect to FIG. 17A illustrates an unfair bandwidth distribution. The bandwidth numbers used in this example are purely exemplary and non-limiting. Two sources (source 0 and source 1) are sending traffic to the destination. Two flows (flow 0 and flow 1) are active at source 0 and one flow (flow 2) is active at source 1. Each flow would like to send traffic at 100 G rate such that source 0 sends a request message for 200 G and source 1 sends a request message for 100 G. The destination distributes bandwidth between the two sources, independent of the number of active flows at each of the sources. The destination drain rate is 200 G, and the destination divides the bandwidth by the number of sources (i.e., 2) and sends grant messages to source 0 at 100 G and source 1 at 100 G. Source 0 distributes its 100 G bandwidth among its two flows such that flow 0 and flow 1 are each granted a 50 G rate. Flow 2 active at source 1, however, is granted the full 100 G rate. As a result, flow 0 and flow 1 sent from source 0 experience a high end-to-end latency compared to flow 2 sent from source 1, which experiences a nominal or low end-to-end latency.

According to the techniques of this disclosure, as illustrated in FIG. 17B, the grant scheduler is configured to distribute bandwidth proportional to the number of flows active at each source and equalize the latency experienced by all the flows. Again, the bandwidth numbers used in this example are purely exemplary and non-limiting. To aid the grant scheduling in fair manner, each source (source 0 and source 1) sends its intended load to the destination through a flow weight carried in a request message. In this example, source 0 sends a request message for 200 G with flowCount (2) and source 1 sends a request message for 100 G with flowCount(1) (e.g., weight=number of flows since all flows are targeting the same bandwidth in this example). The destination grant scheduler schedules grants to the sources in accordance to the communicated weights. The destination drain rate is again 200 G, and the destination divides the bandwidth by the number of flows (i.e., 3) and sends grant messages to source 0 at 133.3 G and source 1 at 66.6 G. Source 0 distributes its 133.3 G bandwidth among its two flows such that flow 0 and flow 1 are each granted a 66.6 G rate, and flow 2 active at source 1 is also granted the 66.6 G rate.

By performing the flow fair grant scheduling, the destination provides fair bandwidth distribution to the incast sources in response to their intended load. With this modification, the techniques may achieve flow fairness. As shown in FIG. 17B, all flows (flow 0, flow 1, and flow 2) are granted similar bandwidth and experience similar latencies. The grant scheduler may constantly update the flow weights from incoming requests. The source may change its intended weight anytime and the grant scheduler may adjust the bandwidth distribution based on the new weight.

Figure 19:
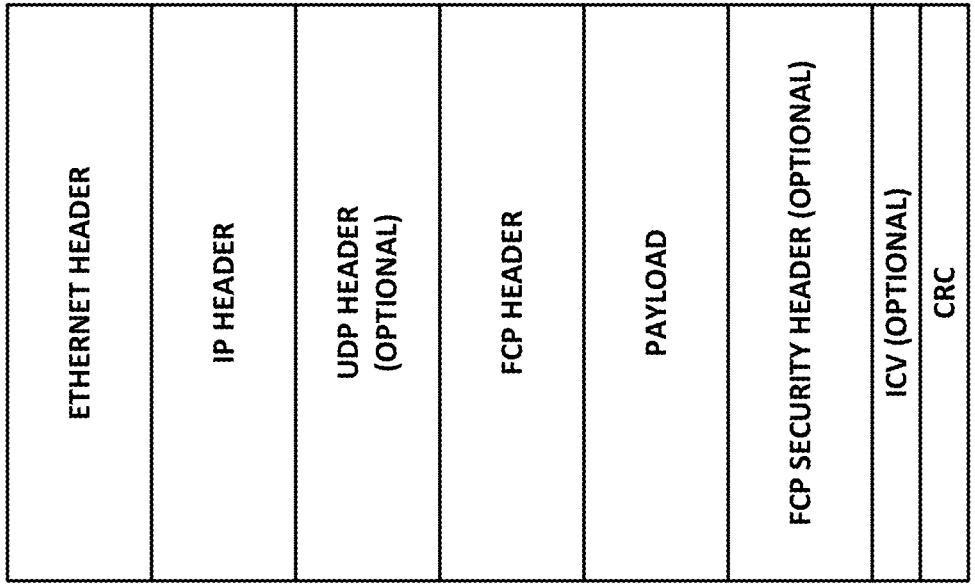
FIG. 19 is a conceptual diagram illustrating an example format of a fabric control protocol data packet.
Figure 18:
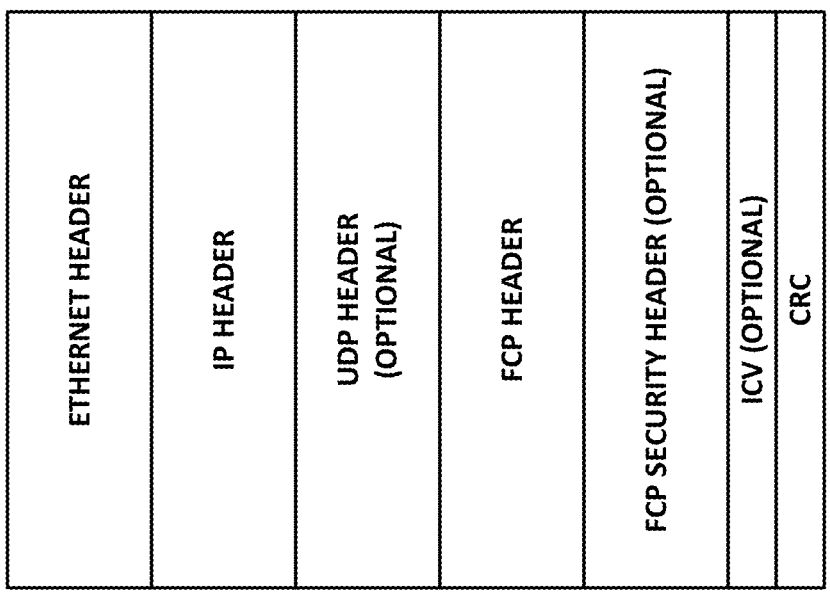
FIG. 18 is a conceptual diagram illustrating an example format of a fabric control protocol control packet for request messages or grant messages.

FIGS. 18-19 illustrate example formats of FCP packets. In these examples, each of the FCP packets includes at least an Ethernet header, an IP header, and an FCP header. The FCP data packet format of FIG. 19 also includes a data payload. Each of the FCP packets may include an optional UDP header, and option FCP security header, and/or an optional integrity check value (ICV). In some examples, FCP packets may be carried over UDP over IPv4 and, thus, include the optional UDP header. In other examples, FCP packets may be carried directly over IPv6.

Each of the example FCP packets includes the FCP header to carry information for the other side. The FCP header may be a multiple of 4 bytes and variable in size. The FCP header may generally include an FCP version field, an FCP packet type field (e.g., request, grant, data, or control), a next protocol field identifying the protocol following the FCP header (e.g., IPv4 or IPv6), FCP flags (e.g., global ports health (GPH) matrix size, timestamp present, FCP security header present), an FCP tunnel number that is local to the destination access node, FCP QoS level, one or more FCP block sequence numbers, and optional fields of GPH matrix, timestamp, and the FCP security header as indicted by the FCP flags. The FCP header fields may be protected with Ethernet frame cyclic redundancy check (CRC) or with the FCP security header (when present).

As described above, FCP control software establishes bidirectional tunnels between a source access node and destination access node. FCP tunnels are optionally secured (encrypted and authenticated). In examples where the FCP control software provides end-to-end encryption and authentication for tunnels, a control protocol may handle the creation and distributions of keys for use by the encryption algorithm. In these examples, the FCP frame format may include four distinct contiguous regions defined by whether the data is encrypted and/or authenticated. For example, the pre-FCP headers (e.g., the Ethernet header, the IP header except source address and destination address in the IP header, and the UDP header) are neither encrypted nor authenticated; the source address and destination address of the IP header, the FCP header, the FCP security header, and some payload (in the case of a data packet) are authenticated but not encrypted; the remaining payload is both encrypted and authenticated; and the ICV is appended to the frame. In this way, the block sequence numbers (e.g., RBN, GBN, DBN, and/or PSN) carried in the FCP header are authenticated but not encrypted. Authentication of the block sequence numbers avoids spoofing of request and grant messages, and protects the source/destination queue state machines. In addition, the spraying of FCP packets of a packet flow across all available data paths makes snooping or sniffing of encrypted data within the packet flow difficult if not impossible because the snooper or sniffer would need to gain access to the encrypted packets on each of the data paths.

FIG. 18 is a conceptual diagram illustrating an example format of an FCP control packet for request messages or grant messages. In the case of a request message, a source access node generates an FCP request packet. The FCP header of the FCP request packet carries a RBN (request block number) and an FCP request weight field that identifies the flow weight for the request packet. The grant scheduler at the destination access node may use the flow weight to fairly distribute the egress bandwidth for FCP grant generation. In the case of a grant message, a destination access node generates an FCP grant packet. The FCP header of the FCP grant packet carries a GBN (grant block number) and an FCP scale down field to request a scale down of the request window at the source access node.

FIG. 19 is a conceptual diagram illustrating an example format of an FCP data packet. A source access node sends FCP data packets in response to an FCP grant message. The FCP header of the FCP data packet includes a PSN (packet sequence number) and a DBN (data block number). The source access node may optionally send a null FCP data packet with zero payload bytes and a "next protocol" field programmed with "no payload."

Figure 20:
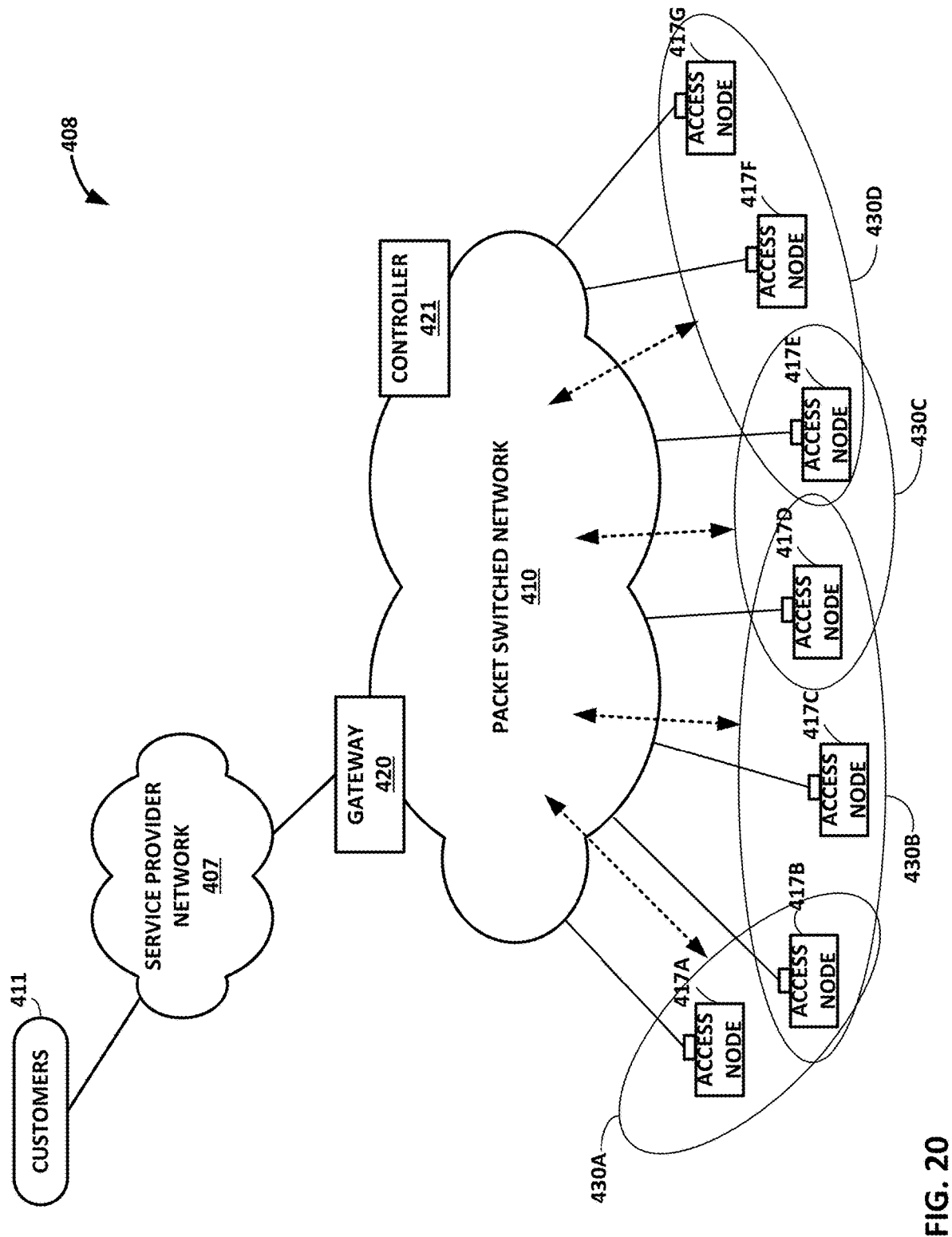
FIG. 20 is a block diagram illustrating an example system having a packet switched network with multiple network access node virtual fabrics dynamically configured over the packet switched network, in accordance with the techniques described herein.

FIG. 20 is a block diagram illustrating an example system having a packet switched network with multiple network access node virtual fabrics dynamically configured over the packet switched network, in accordance with the techniques described herein. As illustrated in FIG. 20, customers 411 are coupled to a packet switched network 410 by content/service provider network 407 and gateway device 420. Service provider network 407 and gateway device 420 may be substantially similar to service provider network 7 and gateway device 20 described with respect to FIG. 1. Access nodes 417A-417G (collectively "access nodes 417") are coupled to packet switched network 410 for processing streams of information, such as network packets or storage packets, between groups of servers (not shown in FIG. 20) connected to access nodes 417 that provide computation and storage facilities for applications and data associated with customers 411. Access nodes 417 may operate substantially similar to any of access nodes 17 or access node 132 described in detail above. Access nodes 417 may also be referred to as data processing units (DPUs), or devices including DPUs.

In the illustrated example of FIG. 20, software-defined networking (SDN) controller 421 provides a high-level, centralized controller for configuring and managing the routing and switching infrastructure of packet switched network 420. SDN controller 421 provides a logically and in some cases physically centralized controller for facilitating operation of one or more virtual networks within packet switched network 420. In some examples, SDN controller 421 may operate in response to configuration input received from a network administrator.

According to the described techniques, SDN controller 421 is configured to establish one or more virtual fabrics 430A-430D (collectively "virtual fabrics 430") as overlay networks on top of the physical underlay network of packet switched network 410. For example, SDN controller 421 learns and maintains knowledge of access nodes 417 coupled to packet switched network 410. SDN controller 421 then establishes a communication control channel with each of access nodes 417. SDN controller 421 uses its knowledge of access nodes 417 to define multiple sets (groups) of two of more access nodes 417 to establish different virtual fabrics 430 over packet switch network 420. More specifically, SDN controller 421 may use the communication control channels to notify each of access nodes 417 for a given set which other access nodes are included in the same set. In response, access nodes 417 dynamically setup FCP tunnels with the other access nodes included in the same set as a virtual fabric over packet switched network 410. In this way, SDN controller 421 defines the sets of access nodes 417 for each of virtual fabrics 430, and the access nodes are responsible for establishing the virtual fabrics 430. As such, packet switched network 410 may be unaware of virtual fabrics 430.

In general, access nodes 417 interface and utilize packet switched network 410 so as to provide full mesh (any-to-any) interconnectivity between access nodes of the same virtual fabric 430. In this way, the servers connected to any of the access nodes forming a given one of virtual fabrics 430 may communicate packet data for a given packet flow to any other of the servers coupled to the access nodes for that virtual fabric using any of a number of parallel data paths within packet switched network 410 that interconnect the access nodes of that virtual fabric. Packet switched network 410 may comprise a routing and switching fabric of one or more data centers, a local area network (LAN), a wide area network (WAN), or a collection of one or more networks. Packet switched network 410 may have any topology, e.g., flat or multi-tiered, as long as there is full connectivity between access nodes 417 of the same virtual fabric. Packet switched network 410 may use any technology, including IP over Ethernet as well as other technologies.

In the example illustrated in FIG. 20, SDN controller 421 defines four groups of access nodes for which respective virtual fabrics should be established. SDN controller 421 defines a first group as including access nodes 417A and 417B, and access nodes 417A and 417B setup FCP tunnels as virtual fabric 430A, where the FCP tunnels are configured to traverse any available path through packet switched network 410 between the two access nodes. In addition, SDN controller 421 defines a second group as including access nodes 417B-417D, and access nodes 417B-417D setup FCP tunnels as virtual fabric 430B, where the FCP tunnels are configured to similarly traverse any available path through packet switched network 410 between the access nodes. SDN controller 421 defines a third group as including access nodes 417D and 417E, and access nodes 417D and 417E setup FCP tunnels as virtual fabric 430C. SDN controller 421 also defines a fourth group as including access nodes 417E-417G, and access nodes 417E-417G setup FCP tunnels as virtual fabric 430D. Although generally shown in FIG. 20 as dashed arrows, the FCP tunnels for the four virtual fabrics 430 are configured by the access nodes 417 of each group to traverse any or a subset of the available paths through packet switched network 410 for the access nodes of the particular virtual fabric.

Access nodes 17 for a defined group use FCP control software to establish the FCP tunnels with the other access nodes for the same group to set up the virtual fabric, thereby supporting spraying of packets across the available paths. For example, for virtual fabric 430A, the FCP tunnel between access node 417A and access node 417B for virtual fabric 430A includes all or a subset of the paths through packet switched network 410 between access nodes 417A and 417B. Access node 417A may then spray individual packets for the same packet flows across some or all of the multiple parallel data paths in packet switched network 410 to access node 417B, and access node 417B may perform packet reordering so at to provide full mesh connectivity within virtual fabric 430A.

Each of virtual fabrics 430 may be isolated from the other virtual fabrics established over packet switched network 410. In this way, the access nodes for a given one of virtual fabrics 430, e.g., virtual fabric 430A, may be reset without impacting the other virtual fabrics 430 over packet switched network 410. In addition, different security parameters may be exchanged for the set of access nodes 417 defined for each of virtual fabrics 430. As described above, FCP supports end-to-end encryption for tunnels. In the case of virtual fabrics, SDN controller 421 may create and distribute different encryption keys for use by the access nodes within the defined set of access nodes for each of the different virtual fabrics 430. In this way, only the set of access nodes for a given one of virtual fabrics 430, e.g., virtual fabric 430A, may decrypt packets exchanged over virtual fabric 430A.

Figure 21:
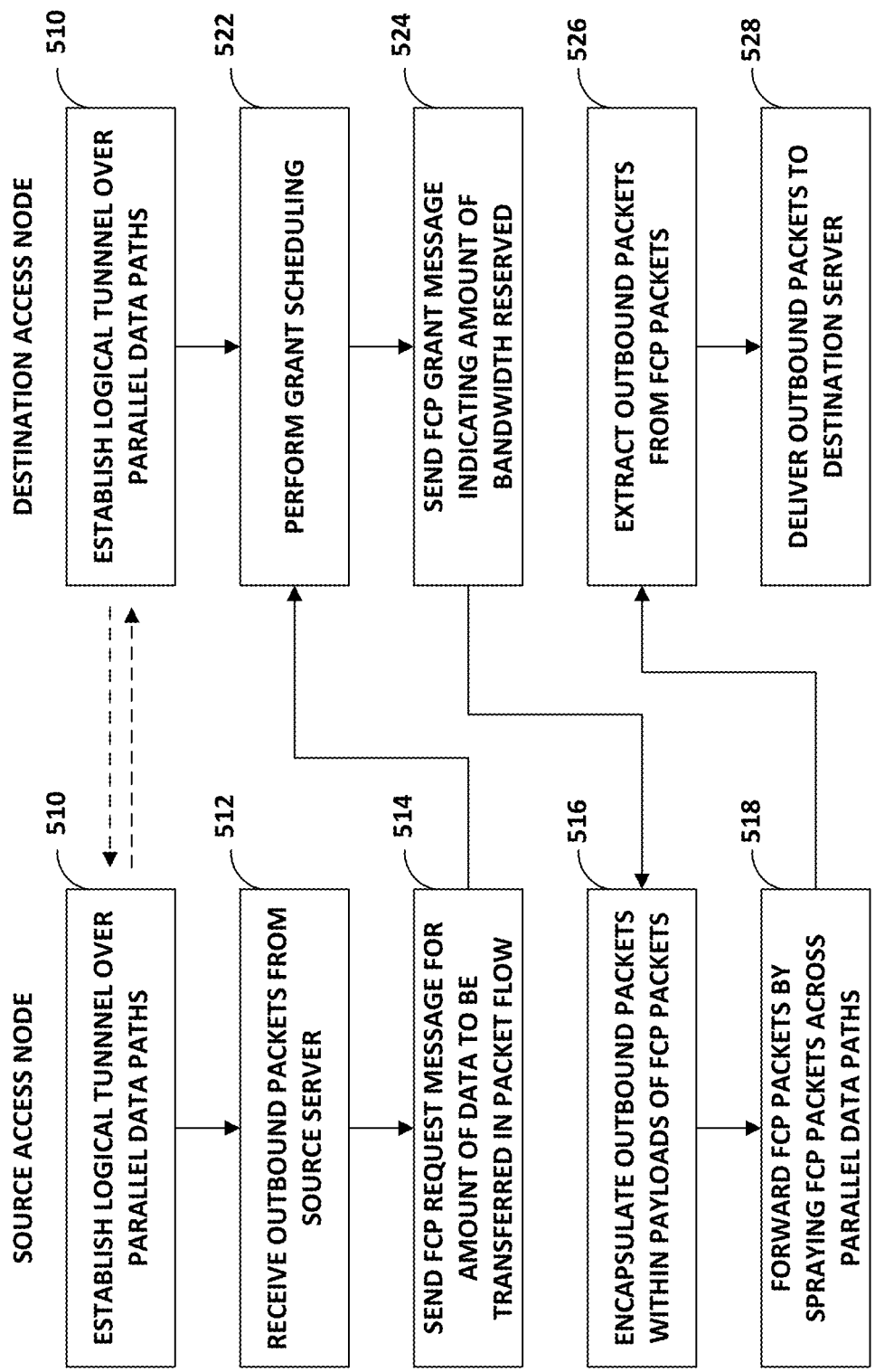
FIG. 21 is a flowchart illustrating an example of operation of a network system in accordance with the techniques described herein.

FIG. 21 is a flowchart illustrating an example of operation of a network system in accordance with the techniques described herein. For ease of illustration the flowchart of FIG. 21 is described with respect to network system 8 of FIG. 1, including servers 12, access nodes 17, and switch fabric 14 of data center 10. Nevertheless, the techniques illustrated by FIG. 21 are readily applicable to the other example network implementations described herein.

As shown in this example, a set of access nodes 17 exchange control plane messages to establish a logical tunnel over a plurality of parallel data paths that provide packet-based connectivity between the access nodes (510). For example, with respect to FIG. 1, switch fabric 14 may comprise one or more tiers of switches and/or routers that provide multiple paths for forwarding communications between access nodes 17. Respective pairs of access nodes 17, possibly in response to direction from SDN controller 21, exchange the control plane messages to negotiate a logical, end-to-end tunnel configured over multiple, parallel paths between the access nodes.

Once the logical tunnel is established, one of the access nodes (referred to as the 'source access node' in FIG. 21) may receive outbound packets associated with the same packet flow, e.g., from an application or storage source server 12 (512). In response, the source access node sends an FCP request message for an amount of data to be transferred in the packet flow (514). In response to receipt of the FCP request message, another one of the access nodes (referred to as the 'destination access node' in FIG. 21) performs grant scheduling (522) and sends an FCP grant message indicating an amount of bandwidth reserved for the packet flow (524).

Upon receipt of the FCP grant message from the destination access node, the source access node encapsulates the outbound packets within payloads of FCP packets, thereby forming each FCP packet to have a header for traversing the logical tunnel and a payload containing one or more of the outbound packets (516). The source access node then forwards the FCP packets by spraying the FCP packets across the parallel data paths through switch fabric 14 (518). In some example implementations, the source access node may, prior to forwarding the FCP packets across switch fabric 14, spray the FCP packets across a subset of access nodes that, for example, form one or more access node groups (e.g., within one or more logical rack groups proximate to the source access node), thereby providing a first-level fanout for distributing the FCP packets across the parallel data paths. In addition, as the FCP packets traverse the parallel data paths, each of the subset of access nodes may spray the FCP packets to a subset of core switches included in switch fabric 14, thereby providing a second-level fanout reaching additional parallel data paths so as to provide increased scalability of the network system while still providing a high-level of connectivity between access nodes.

Upon receipt of the FCP packets, the destination access node extracts the outbound packets that are encapsulated within the FCP packets (526), and delivers the outbound packets to the destination server (528). In some examples, prior to extracting and delivering the outbound packets, the destination access node first reorders the FCP packets into an original sequence of the packet flow sent by the source server. The source access node may assign a packet sequence number to each of the FCP packets of the packet flow, enabling the destination access node to reorder the FCP packets based on the packet sequence number of each of the FCP packets.

Figure 22:
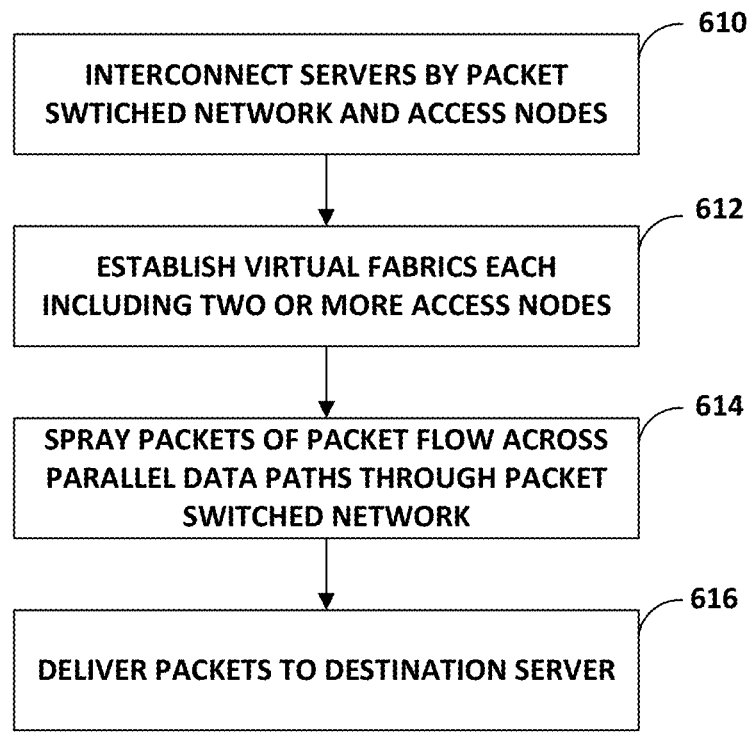
FIG. 22 is a flowchart illustrating another example of operation of a network system in accordance with the techniques described herein.

FIG. 22 is a flowchart illustrating another example of operation of a network system in accordance with the techniques described herein. For ease of illustration the flowchart of FIG. 22 is described with respect to network system 408 of FIG. 20, including packet switched network 410, access nodes 417, SDN controller 421, and virtual fabrics 430. Nevertheless, the techniques illustrated by FIG. 22 are readily applicable to the other example network implementations described herein.

In this example, groups of servers are interconnected by access nodes 417 and packet switched network 410 (610). SDN controller 421 of packet switched network 410 provides a high-level, centralized controller for configuring and managing the routing and switching infrastructure of packet switched network 420. SDN controller 421 provides a logically and in some cases physically centralized controller for facilitating operation of one or more virtual networks within packet switched network 420. SDN controller 421 establishes virtual fabrics 430 that each includes a set of two or more of access nodes 417 (612). Virtual fabrics 430 are established as overlay networks on top of the physical underlay network of packet switched network 410. More specifically, in response to notifications from SDN controller 421, the access nodes for a given set (e.g., access nodes 417B, 417C, and 417D) exchange control plane messages to establish logical tunnels between the access nodes for the given set as a virtual fabric (e.g., virtual fabric 430B) over packet switched network 410. The access nodes may use FCP to establish the tunnels as the virtual fabric.

A first one of the access nodes for virtual fabric 430B may receive a packet flow of packets from a source server coupled to the first one of the access nodes and directed to a destination server coupled to a second one of the access nodes for virtual fabric 430B. In response, the first one of the access nodes sprays the packets across parallel data paths through packet switched network 410 to the second one of the access nodes for virtual fabric 430B (614). Upon receipt of the packets, the second one of the access nodes for virtual fabric 430B delivers the packets to the destination server (616). In some examples, prior to delivering the packets, the second one of the access nodes reorders the packets into an original sequence of the packet flow sent by the source server.

Various examples have been described. These and other examples are within the scope of the following claims.

What is claimed is:

1. A network system comprising:
   a plurality of servers;
   a packet switched network comprising a centralized controller; and
   a plurality of access nodes, each of the access nodes coupled to the packet switched network, wherein the plurality of access nodes includes a first access node coupled to a source server included within the plurality of servers and a second access node coupled to a destination server included within the plurality of servers, wherein the first access node and the second access node are each executing a Fabric Control Protocol (FCP),
   wherein the centralized controller is configured to establish one or more virtual fabrics, wherein each of the virtual fabrics includes two or more of the access nodes, and wherein, to establish a first virtual fabric including the first access node and the second access node, the centralized controller is configured to notify each of the first access node and the second access node of other access nodes included in the first virtual fabric, and, in response, the first access node and the second access node are configured to establish a logical tunnel over a plurality of parallel data paths through the packet switched network between the first access node and the second access node, wherein, when communicating a packet flow of packets between the source server and the destination server, the first access node is configured to:

send an FCP request message for an amount of data to be transferred in a packet flow of packets from the source server to the destination server, and in response to receipt of an FCP grant message indicating an amount of bandwidth reserved for the packet flow, encapsulate the packets within payloads of FCP packets and send the FCP packets over the logical tunnel of the first virtual fabric by spraying the FCP packets of the packet flow across the plurality of parallel data paths through the packet switched network to the second access node in accordance with the reserved bandwidth by directing each of the FCP packets to one of the parallel data paths selected based on bandwidth characteristics of the one of the parallel data paths, and wherein the second access node is configured to:

in response to receipt of the FCP request message, perform grant scheduling and send the FCP grant message indicating the amount of bandwidth reserved for the packet flow, and in response to receiving the FCP packets of the packet flow from the first access node, extract the packets encapsulated within the FCP packets and deliver the packets to the destination server.

2. The network system of claim 1, wherein, to establish the first virtual fabric, the centralized controller is configured to define a set of two or more access nodes for the first virtual fabric that includes at least the first access node and the second access node, and notify each of the access nodes within the defined set of the other access nodes included in the defined set.

3. The network system of claim 2, wherein, to establish the first virtual fabric, the access nodes within the defined set each executing the FCP are configured to establish logical tunnels with the other access nodes included in the defined set as the first virtual fabric over the packet switched network, wherein the logical tunnels of the first virtual fabric include the plurality of parallel data paths through the packet switched network between the access nodes within the defined set.

4. The network system of claim 1, wherein, to deliver the packets to the destination server, the second access node is configured to reorder the packets into an original sequence of the packet flow and deliver the reordered packets to the destination server.

5. The network system of claim 1, wherein the centralized controller is configured to reset the access nodes for one of the virtual fabrics without impacting the other virtual fabrics established over the packet switched network.

6. The network system of claim 1, wherein the centralized controller is configured to exchange different security parameters for each of the different virtual fabrics established over the packet switched network.

7. The network system of claim 6, wherein the centralized controller is configured to distribute different encryption keys for each of the different virtual fabrics for use by the access nodes included in the virtual fabrics, such that only the access nodes for a given one of the virtual fabrics can decrypt packets exchanged over the given one of the virtual fabrics.

8. The network system of claim 1, wherein each of the virtual fabrics comprises an overlay network and the packet switched network comprises an underlay network.

9. The network system of claim 1, wherein, to spray the FCP packets of the packet flow across the plurality of parallel data paths, the first access node is configured to direct each of the FCP packets to a randomly, pseudo-randomly, or round-robin selected one of the parallel data paths.

10. The network system of claim 1, wherein, to spray the FCP packets of the packet flow across the plurality of parallel data paths, the first access node is configured to direct each of the FCP packets to a least loaded one of the parallel data paths selected based on a byte count per path.

11. The network system of claim 1, wherein, to spray the FCP packets of the packet flow across the plurality of parallel data paths, the first access node is configured to direct each of the FCP packets to a weighted randomly selected one of the parallel data paths in proportion to available bandwidth in the one of the virtual fabrics.

12. The network system of claim 1, wherein the access nodes for the one of the virtual fabrics are configured to provide full mesh connectivity through the packet switched network between any pairwise combination of the servers coupled to the access nodes for the one of the virtual fabrics.

13. The network system of claim 1, wherein the first access node has full mesh connectivity to a subset of the access nodes included in a logical rack as a first-level network fanout, and wherein the first one of the access nodes is configured to spray the FCP packets of the packet flow across the first-level network fanout to the subset of the access nodes included in the logical rack.

14. The network system of claim 13, wherein each of the access nodes has full mesh connectivity to a subset of core switches included in the packet switched network as a second-level network fanout, and wherein each of the subset of access nodes included in the logical rack is configured to spray the FCP packets of the packet flow across the second-level network fanout to the subset of core switches.

15. The network system of claim 1, wherein the packet switched network comprises a routing and switching fabric of one or more data centers, a local area network (LAN), a wide area network (WAN), or a collection of one or more networks.

16. A method comprising:

interconnecting a plurality of servers by a packet switched network and a plurality of access nodes, each of the access nodes coupled to the packet switched network, wherein the plurality of access nodes includes a first access node coupled to a source server included within the plurality of servers and a second access node coupled to a destination server included within the plurality of servers, wherein the first access node and the second access node are each executing a Fabric Control Protocol (FCP);

establishing, by a centralized controller of the packet switched network, one or more virtual fabrics, wherein each of the virtual fabrics includes two or more of the access nodes, wherein establishing a first virtual fabric including the first access node and the second access node comprises:
  notifying, by the centralized controller, each of the first access node and the second access node of other access nodes included in the first virtual fabric, and
  in response, establishing, by the first access node and the second access node, a logical tunnel over a plurality of parallel data paths through the packet switched network between the first access node and the second access node; and
communicating a packet flow of packets between the source server and the destination server including:
  sending, by the first access node, an FCP request message for an amount of data to be transferred in a packet flow of packets from the source server to the destination server,
  in response to receipt of the FCP request message, performing, by the second access node, grant scheduling and sending, by the second access node, an FCP grant message indicating the amount of bandwidth reserved for the packet flow,
  in response to receipt of the FCP grant message indicating the amount of bandwidth reserved for the packet flow, encapsulating, by the first access node, the packets within payloads of FCP packets,
  sending, by the first access node, the FCP packets over the logical tunnel of the first virtual fabric by spraying, by the first access node, the FCP packets of the packet flow across the plurality of parallel data paths through the packet switched network to the second access node in accordance with the reserved bandwidth by directing each of the FCP packets to one of the parallel data paths selected based on bandwidth characteristics of the one of the parallel data paths, and
  in response to receiving the FCP packets of the packet flow from the first access node, extracting, by the second access node, the packets encapsulated within the FCP packets and delivering, by the second access node, the packets to the destination server.

17. The method of claim 16, wherein establishing the first virtual fabric comprises defining, by the centralized controller, a set of two or more access nodes for the first virtual fabric that includes at least the first access node and the second access node, and notifying each of the access nodes within the defined set of the other access nodes included in the defined set.

18. The method of claim 17, wherein establishing the first virtual fabric further comprises establishing, by the access nodes within the defined set each executing the FCP, logical tunnels with the other access nodes included in the defined set as the first virtual fabric over the packet switched network, wherein the logical tunnels of the first virtual fabric include the plurality of parallel data paths through the packet switched network between the access nodes within the defined set.

19. The method of claim 16, wherein, to deliver the packets to the destination server, the second access node is configured to reorder the packets into an original sequence of the packet flow and deliver the reordered packets to the destination server.

20. The method of claim 16, wherein the first access node has full mesh connectivity to a subset of the access nodes included in a logical rack as a first-level network fanout, the method further comprising spraying, by the first one of the access nodes, the FCP packets of the packet flow across the first-level network fanout to the subset of the access nodes included in the logical rack.

21. The method of claim 20, wherein each of the access nodes has full mesh connectivity to a subset of core switches included in the packet switched network as a second-level network fanout, the method further comprising spraying, by each of the subset of access nodes included in the logical rack, the FCP packets of the packet flow across the second-level network fanout to the subset of core switches.

* * * * *